(12) United States Patent
Kumar et al.

(10) Patent No.: US 11,963,150 B2
(45) Date of Patent: Apr. 16, 2024

(54) POSITIONING ENHANCEMENTS FOR LOCATING A MOBILE DEVICE IN A WIRELESS NETWORK

(71) Applicant: QUALCOMM Incorporated, San Diego, CA (US)

(72) Inventors: Akash Kumar, Hyderabad (IN); Stephen William Edge, Escondido, CA (US); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/668,287

(22) Filed: Oct. 30, 2019

(65) Prior Publication Data

US 2020/0145977 A1 May 7, 2020

Related U.S. Application Data

(60) Provisional application No. 62/790,174, filed on Jan. 9, 2019, provisional application No. 62/754,180, filed on Nov. 1, 2018.

(51) Int. Cl.
*H04W 72/044* (2023.01)
*G01S 5/00* (2006.01)
(Continued)

(52) U.S. Cl.
CPC ......... *H04W 72/046* (2013.01); *G01S 5/0063* (2013.01); *H04B 7/0617* (2013.01);
(Continued)

(58) Field of Classification Search
USPC ........................................................ 370/329
See application file for complete search history.

(56) References Cited

U.S. PATENT DOCUMENTS 5,526,001 A * 6/1996 Rose .................. G01S 1/026
342/442
9,500,738 B2 11/2016 Edge et al.
(Continued)

FOREIGN PATENT DOCUMENTS

WO WO-2015027118 A1 * 2/2015 ............... G01S 1/66
WO 2017164925 A1 9/2017

OTHER PUBLICATIONS

Hajjar et al., Lund University, Codebook Based Multi-User MIMO for 5G (Year: 2019).*

(Continued)

*Primary Examiner* — Jeffrey M Rutkowski
*Assistant Examiner* — Luna Weissberger
(74) *Attorney, Agent, or Firm* — Thien T. Nguyen

(57) ABSTRACT

Techniques for determining a location of a mobile device are provided. An example of a method according to the disclosure includes determining, on the mobile device, beam identification information for one or more radio beams, transmitting, with the mobile device, the beam identification information to a network node, receiving, at the mobile device, positioning reference signal beam information for one or more positioning reference signals, generating, with the mobile device, one or more receive beams based on the positioning reference signal beam information, obtaining, with the mobile device, at least one measurement from at least one of the one or more positioning reference signals, and facilitating location determination of the mobile device at a location-capable device based at least in part on the at least one measurement.

57 Claims, 25 Drawing Sheets

(51) Int. Cl.
*H04B 7/06* (2006.01)
*H04L 5/00* (2006.01)
*H04W 56/00* (2009.01)
*H04W 64/00* (2009.01)

(52) U.S. Cl.
CPC ......... *H04L 5/0048* (2013.01); *H04W 56/001* (2013.01); *H04W 64/006* (2013.01)

(56) References Cited

U.S. PATENT DOCUMENTS

| | | | |
|---|---|---|---|
| 9,609,480 | B2 | 3/2017 | Priyanto et al. |
| 9,832,602 | B2 | 11/2017 | Moshfeghi |
| 2007/0232906 | A1* | 10/2007 | Alexandru ........... G10K 11/346 600/437 |
| 2017/0339516 | A1 | 11/2017 | Edge et al. |
| 2018/0270775 | A1* | 9/2018 | Zhang ................. H04L 27/2655 |
| 2018/0324022 | A1* | 11/2018 | Sheng ............... H04W 36/0061 |
| 2018/0324738 | A1* | 11/2018 | Stirling-Gallacher ....................... G01S 5/0205 |
| 2021/0219366 | A1* | 7/2021 | Matsumura ........... H04L 5/0048 |
| 2021/0345289 | A1* | 11/2021 | Priyanto ............... H04W 16/28 |
| 2022/0113365 | A1* | 4/2022 | Sosnin ................. H04W 64/00 |
| 2022/0124664 | A1* | 4/2022 | Cha .......................... G01S 5/02 |

OTHER PUBLICATIONS

Taiwan Search Report—TW108139576—TIPO—dated Feb. 13, 2023.
"3rd Generation Partnership Project, Technical Specification Group Radio Access Network; NG Radio Access Network (NG-RAN); Stage 2 functional specification of User Equipment (UE) positioning in NG-RAN (Release 15)", 3GPP Draft, 38305-F10, 3rd Generation Partnership Project (3GPP), Mobile Competence Centre, 650, Route Des Lucioles, F-06921 Sophia-Antipolis Cedex, France, Oct. 1, 2018 (Oct. 1, 2018), XP051519481, 63 pages, Retrieved from the Internet: URL: http://www.3gpp.org/ftp/tsg%5Fran/WG2%5FRL2/Specifications/201809%5Ffinal%5Fspecs%5Fafter% NPL item 1 Document can be retrieved the internet URL: https://www.3gpp.org/ftp//Specs/archive/38_series/38.305/38305-f10.zip.
International Search Report and Written Opinion—PCT/US2019/059083—ISA/EPO—dated Jul. 17, 2020.
Nokia Networks: "Potential Enhancements for OTDOA", 3GPP Draft, 3GPP TSG RAN WG1 #82, R1-154738, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 23, 2015 (Aug. 23, 2015), XP051001952, 3 pages, Retrieved from the Internet: URL: http://www.3gpp.org/ftp/Meetings_3GPP_SYNC/RAN1/Docs/. [retrieved on Aug. 23, 2015] the whole document.
Partial International Search Report—PCT/US2019/059083—ISA/EPO—dated May 26, 2020.

* cited by examiner

POSITIONING ENHANCEMENTS FOR LOCATING A MOBILE DEVICE IN A WIRELESS NETWORK

CROSS-REFERENCE TO RELATED APPLICATIONS

This application claims the benefit of U.S. Provisional Application No. 62/754,180, filed Nov. 1, 2018, entitled "OBSERVE TIME DIFFERENCE OF ARRIVAL ENHANCEMENTS FOR FIFTH GENERATION NETWORKS," and U.S. Provisional No. 62/790,174, filed Jan. 9, 2019, entitled "PRS SCHEDULING ENHANCEMENTS FOR 5G NR", each of which is assigned to the assignee hereof and is incorporated herein in its entirety herein by reference.

BACKGROUND

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In methods based on terrestrial radio sources, a mobile device may measure the timing of signals received from two or more base stations and determine times of arrival, time differences of arrival, angles of arrival and/or receive time-transmit time differences. Combining these measurements with known locations for the base stations and, in some cases, known transmission times or from each base station may enable location of the mobile device using such position methods as Observed Time Difference Of Arrival (OTDOA), Enhanced Cell ID (E-CID), Angle of Arrival (AOA) or Angle of Departure (AOD).

SUMMARY

An example of a method for determining a location of a mobile device according to the disclosure includes determining, on the mobile device, beam identification information for one or more radio beams, transmitting, with the mobile device, the beam identification information to a network node, receiving, at the mobile device, positioning reference signal beam information for one or more positioning reference signals, generating, with the mobile device, one or more receive beams based on the positioning reference signal beam information, obtaining, with the mobile device, at least one measurement from at least one of the one or more positioning reference signals, and facilitating location determination of the mobile device at a location-capable device based at least in part on the at least one measurement.

Implementations of such a method may include one or more of the following features. Determining the beam identification information may include determining a synchronization signal burst index value for the one or more radio beams. Determining the beam identification information may include determining a beam width value for at least one of the one or more radio beams. Determining the beam identification information may include determining a reference signal received power value or a reference signal received quality value for at least one of the one or more radio beams. Obtaining the at least one measurement may include determining a time of arrival measurement from the at least one of the one or more positioning reference signals. Obtaining the at least one measurement may include determining an average time of arrival measurement from each of the at least one of the one or more positioning reference signals. Obtaining the at least one measurement may include determining a reference signal time difference measurement from the at least one of the one or more positioning reference signals. Transmitting the beam identification information may include transmitting a neighbor cell identification list. Transmitting the beam identification information may include at least one band identification value and a maximum number of supported beams associated with the at least one band identification value. Transmitting the beam identification information may include at least one band combination value and a maximum number of supported beams associated with the at least one band combination value.

An example of a mobile device according to the disclosure includes a memory, a transceiver, at least one processor operably coupled to the memory and the transceiver and configured to determine beam identification information for one or more radio beams, transmit the beam identification information to a network node, receive positioning reference signal beam information for one or more positioning reference signals, generate one or more receive beams based on the positioning reference signal beam information, obtain at least one measurement from at least one of the one or more positioning reference signals, and facilitate a location determination of the mobile device at a location-capable device based at least in part on the at least one measurement.

Implementations of such a mobile device may include one or more of the following features. The at least one processor may be further configured to determine a synchronization signal burst index value for the one or more radio beams. The at least one processor may be further configured to determine a beam width value for at least one of the one or more radio beams. The at least one processor may be further configured to determine a reference signal received power value or a reference signal received quality value for at least one of the one or more radio beams. The at least one processor may be further configured to obtain the at least one measurement by determining a time of arrival measurement from the at least one of the one or more positioning reference signals. The at least one processor may be further configured to obtain the at least one measurement by determining an average time of arrival measurement from each of the at least one of the one or more positioning reference signals. The at least one processor may be further configured to obtain the at least one measurement by determining a reference signal time difference measurement from the at least one of the one or more positioning reference signals. The at least one processor may be further configured to transmit a neighbor cell identification list. The at least one processor may be further configured to transmit at least one band identification value and a maximum number of supported beams associated with the at least one band identification value. The at least one processor may be further configured to transmit at least one band combination value and a maximum number of supported beams associated with the at least one band combination value.

An example apparatus according to the disclosure includes means for determining beam identification information for one or more radio beams, means for transmitting the beam identification information to a network node, means for receiving positioning reference signal beam information for one or more positioning reference signals, means for generating one or more receive beams based on the positioning reference signal beam information, means for obtaining at least one measurement from at least one of the one or more positioning reference signals, and means for facilitating a location determination of the apparatus at a location-capable device based at least in part on the at least one measurement.

An example of a method for determining a location of a mobile device according to the disclosure includes receiving, from the mobile device, one or more identification values associated with one or more radio beams transmitted by at least one base station, determining positioning reference signal information based on the one or more identification values, and providing the positioning reference signal information to the mobile device.

Implementations of such a method may include one or more if the following features. Providing the positioning reference signal information may include providing angular data for each of the one or more radio beams. Providing the positioning reference signal information may include providing a beam width value for at least one of the one or more radio beams. Providing the positioning reference signal information may include providing a reference signal received power value or a reference signal received quality value for at least one of the one or more radio beams. The one or more identification values may be synchronization signal burst index values associated with each of the one or more radio beams transmitted by the at least one base station. Providing the positioning reference signal information to the mobile device may include providing one or more synchronization signal burst index values specifying one or more radio beams to be used for measuring a time of arrival value. Providing the positioning reference signal information to the mobile device may include providing a companion band list indicating a band list with which the mobile device may utilize concurrent beam forming for concurrently measuring time of arrival values. The companion band list may include tuples of beam combinations for every companion band that can be measured together by the mobile device. The companion band list may indicate at least two bands. The method may include receiving, from the mobile device, one or more positioning reference signal measurements associated with the positioning reference signal information and determining the location of the mobile device based on the one or more positioning reference signal measurements. The one or more positioning reference signal measurements may include a time of arrival measurement. The one or more positioning reference signal measurements may include a plurality of time of arrival measurements for each of the at least one base station. The one or more positioning reference signal measurements may include a minimum time of arrival measurement for each of the at least one base station. The one or more positioning reference signal measurements may include an average time of arrival measurement for each of the at least one base station. The one or more positioning reference signal measurements may include a reference signal time difference measurement for each of the at least one base station. Receiving the one or more positioning reference signal measurements associated with the positioning reference signal information may include receiving a plurality of positioning reference signal measurements from one or more radio beams transmitted from a plurality of base stations, wherein the one or more radio beams are identified in the positioning reference signal information provided to the mobile device. The received one or more identification values associated with one or more radio beams transmitted by at least one base station in may be stored in a codebook. The codebook may be sent to a location server.

An example base station according to the disclosure includes a memory, at least one external interface (e.g., wireless, backhaul), at least one processor operably coupled to the memory and the at least one external interface and configured to receive, from a mobile device, one or more identification values associated with one or more radio beams transmitted by at least one base station, determine positioning reference signal information based on the one or more identification values, and provide the positioning reference signal information to the mobile device.

An example of an apparatus for determining a location of a mobile device according to the disclosure includes means for receiving, from the mobile device, one or more identification values associated with one or more radio beams transmitted by at least one base station, means for determining positioning reference signal information based on the one or more identification values, and means for providing the positioning reference signal information to the mobile device.

An example of a method of determining a location of a mobile device according to the disclosure includes receiving, on the mobile device, one or more positioning reference signals for each of a plurality of radio beams, wherein each of the plurality of radio beams is associated with a beam identification value, determining a measurement value for each of the one or more positioning reference signals, determining a final measurement value for each of the plurality of radio beams based on the measurement value, and determining the location of the mobile device based on the final measurement value for each of the plurality of radio beams.

Implementations of such a method may include one or more of the following features. The beam identification value may be a synchronization signal burst index value. Determining the measurement value may include determining at least one time of arrival measurement for each of the one or more positioning reference signals. Each of the plurality of radio beams may be associated with a base station and determining the measurement value may include determining at least one time of arrival measurement for the base station. The plurality of radio beams may be associated with a plurality of base stations and determining the measurement value for each of the one or more positioning reference signals may include determining at least one time of arrival measurement for each of the plurality of base stations. Determining the measurement value may include determining a plurality of time of arrival measurements simultaneously for a plurality positioning reference signals. The method may include receiving, on the mobile device, a codebook comprising a synchronization signal beam index for each of the plurality of radio beams and the positioning reference signal information associated with each of the plurality of radio beams, and determining, on the mobile device, the one or more positioning reference signals to be used for determining the location of the mobile device based on the codebook.

An example of a mobile device according to the disclosure includes a memory, a transceiver, at least one processor operably coupled to the memory and the transceiver and configured to receive one or more positioning reference signals for each of a plurality of radio beams, wherein each of the plurality of radio beams is associated with a beam identification value, determine a measurement value for each of the one or more positioning reference signals, determine a final measurement value for each of the plurality of radio beams based on the measurement value, and determine a location of the mobile device based on the final measurement value for each of the plurality of radio beams.

An example of an apparatus according to the disclosure includes means for receiving one or more positioning reference signals for each of a plurality of radio beams, wherein each of the plurality of radio beams is associated with a beam identification value, means for determining a measurement value for each of the one or more positioning reference signals, means for determining a final measurement value for each of the plurality of radio beams based on the measurement value, and means for determining a location of the apparatus based on the final measurement value for each of the plurality of radio beams.

An example of a method for supporting location services for a user equipment (UE) performed by a base station according to the disclosure includes obtaining a schedule of Positioning Reference Signal (PRS) transmissions along different elevation angles and different azimuth angles across multiple PRS occasions; sending the schedule of the PRS transmission to the UE; and transmitting the PRS transmissions to the UE along the different elevation angles and different azimuth angles across the multiple PRS occasions, wherein each PRS transmission has a range of azimuth angles and a range of elevation angles, wherein a magnitude of the range of azimuth angles is different than the magnitude of the range of elevation angles.

An example of a method for supporting location services for a user equipment (UE) performed by the UE according to the disclosure includes receiving from a base station a schedule of Positioning Reference Signal (PRS) transmissions along different elevation angles and different azimuth angles across multiple PRS occasions, wherein each PRS transmission has a range of azimuth angles and a range of elevation angles, wherein a magnitude of the range of azimuth angles is different than the magnitude of the range of elevation angles; performing measurements of the PRS transmissions at the different elevation angles and the different azimuth angles across the multiple PRS occasions; and transmitting the measurement of the PRS transmissions with an indication of the PRS occasion associated with each measurement to the location server for location determination of the UE.

An example of a method for supporting location services for a user equipment (UE) performed by a location server according to the disclosure includes obtaining a schedule of Positioning Reference Signal (PRS) transmissions along different elevation angles and different azimuth angles across multiple PRS occasions for a base station, wherein each PRS transmission has a range of azimuth angles and a range of elevation angles, wherein a magnitude of the range of azimuth angles is different than the magnitude of the range of elevation angles; receiving measurements of the PRS transmissions at the different elevation angles and the different azimuth angles across the multiple PRS occasions from a UE with an indication of the PRS occasion associated with each measurement to the location server for location determination of the UE; and determining a location including an elevation of the UE using the measurement of the PRS transmissions with the indication of the PRS occasion associated with each measurement to the location server for location determination of the UE and the schedule of PRS transmissions.

Items and/or techniques described herein may provide one or more of the following capabilities, as well as other capabilities not mentioned. A mobile device may detect the synchronization signal burst (SSB) index/Beam ID of the serving cell and the neighboring cells measured in the past. The mobile device may provide the SSB Index/Beam ID information to a network node in a provide capabilities message. The provide capabilities message may also include a beam width value for each of detected beams. The network node may store the received SSB indices along with the respective angular information including azimuth ($\varphi$) and elevation ($\theta$) dimensions, and beam measurements in a codebook. The codebook may be provided to the mobile device and/or other network nodes such as a location server. The SSB indices, angular information, and beam information in the codebook may be used to localize a mobile device and determine assistance data to be utilized by the mobile device. The assistance data may be used to measure directional positioning reference signals on one or more beams transmitted from one or more base stations. The mobile device may include an indication of the maximum number of simultaneous beams it may detect in the provide capabilities message. The assistance data may be based in part on the maximum number of simultaneous beams indication. The assistance data may reduce the number of positioning signal measurements the mobile device must perform to determine a location. The reduction in measurements may reduce latency in determining the location of the mobile device and decrease the amount of power consumed by the mobile device. Further, it may be possible for an effect noted above to be achieved by means other than that noted, and a noted item/technique may not necessarily yield the noted effect.

BRIEF DESCRIPTION OF THE DRAWINGS

Like reference numbers and symbols in the various figures indicate like elements, in accordance with certain example implementations.

DETAILED DESCRIPTION

Figure 1A:
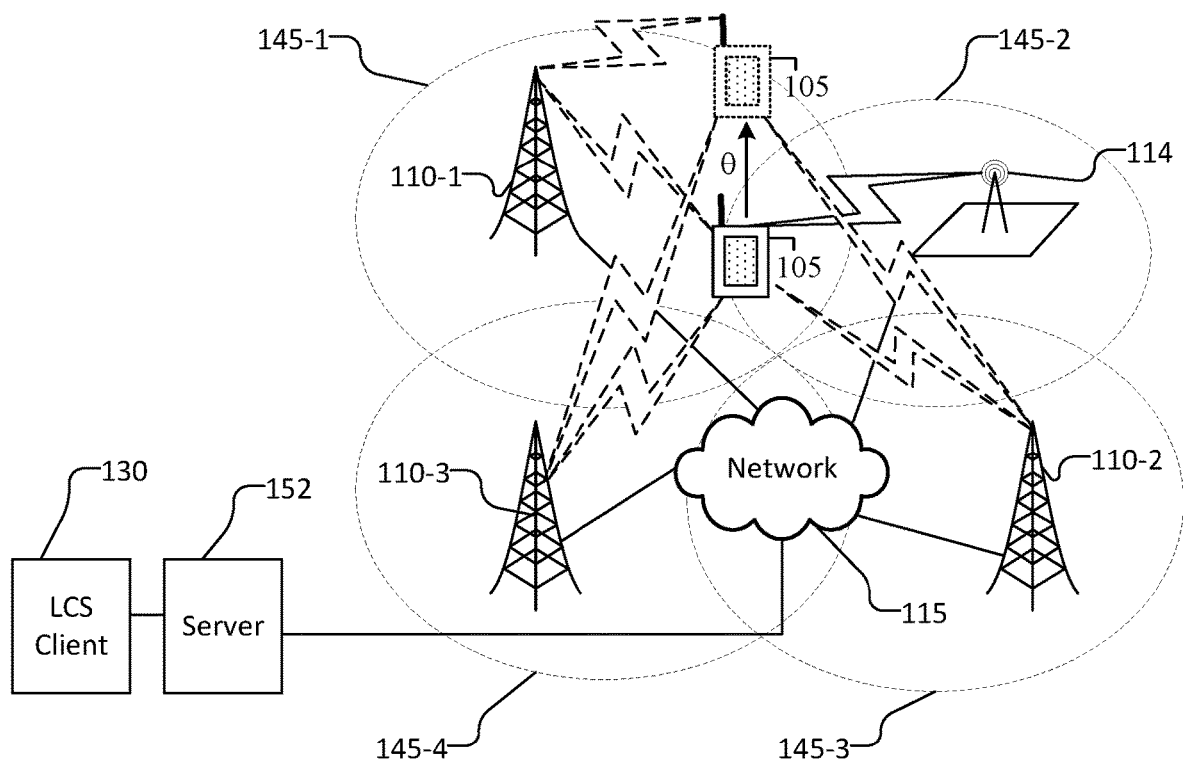
FIG. 1A shows an architecture of a system capable of providing location services to a User Equipment.

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In methods based on terrestrial radio sources, a mobile device may measure signals received from two or more base stations and determine signal strengths, angles of arrival, times of arrival, time differences of arrival and/or receive time-transmit time differences. Combining these measurements with known locations for the base stations and other information, such as known transmission times and/or known transmission angles of departure for each base station, may enable location of the mobile device using such position methods as Observed Time Difference Of Arrival (OTDOA), angle of arrival (AOA), angle of departure (AOD), and/or Enhanced Cell ID (E-CID). Such terrestrial based position methods may be employed in wireless networks that support different wireless technologies such as Long Term Evolution (LTE) and Fifth Generation (5G) (also referred to New Radio (NR)) as defined by an organization known as the Third Generation Partnership Project (3GPP).

OTDOA may be utilized in Long Term Evolution (LTE) networks. In LTE networks, a mobile device may share capability information and some additional information with a network server. The network server may provide a list of different neighbor cells to the mobile device, and the mobile device may determine reference signal time difference (RSTD) or Time of Arrival (TOA) measurements and report back to the network server. Based on these reported measurements and the known locations of the neighbor cells, the network server may compute the location of the mobile device using triangulation methods and algorithms.

Using Observed Time Difference of Arrival (OTDOA) based positioning, the UE may measure time differences in received signals from a plurality of base stations. Because positions of the base stations are known, the observed time differences may be used to calculate the location of the terminal. In OTDOA, the mobile station determines at least one time of arrival measurement (i.e., (TOA)) of signals from a reference cell (e.g., the serving cell) and one or more neighboring cells. The TOA from the reference cell may be subtracted from the TOA from the one or more reference cells to determine the Reference Signal Time Difference (RSTD). Using the RSTD measurements, the absolute or relative transmission timing of each cell, and the known position(s) of the physical transmitting antennas for the reference and neighboring cells, the UE's position may be calculated.

Positioning Reference Signals (PRS) are broadcast by base stations and are used by UEs for positioning in Long Term Evolution (LTE) networks, where the UE measures the TOA (Time of Arrival) metric of different cells and reports to the network/server. The location server (LS) may use the reported measurements for trilateration to generate a fix for the position of the UE. PRS signals are typically transmitted at higher power than Cell specific Reference Signals (CRS) to have higher hearability. In LTE networks, PRS is transmitted simultaneously throughout the cell coverage area.

In the Fifth Generation (5G) wireless network, PRS may not be transmitted simultaneously throughout the cell coverage area. For 5G New Radio (NR), positioning signals (e.g. PRS) may be transmitted directionally, such that a transmission spans a narrow range of angles (e.g. 5 degrees of azimuth) using a "directional beam." Further, the direction of transmission of the positioning signal may change with time. For example, a directional beam may be rotated through 120 degrees for a cell sector or 360 degrees for an omnidirectional cell, with the rotation periodically repeated. Moreover, multiple directional beams may be transmitted at the same time in several different directions and the directions of transmission may change with time.

In the current specifications and proposed mechanisms defining PRS specifics for 5G NR, PRS may be scheduled on different beams mapped to different physical/geographical directions, i.e., different azimuth angles, which may be generally defined as a horizontal angle measured clockwise (or counter-clockwise) from any fixed reference plane or easily established base direction line. The current methods proposed for positioning in 5G NR are based on, e.g., AOA (Angle of Arrival), AOD (Angle of Arrival), signal strength, signal quality, and TA (Timing Advance). These methods include both Enhanced Cell ID (E-CID) and OTDOA and other positioning techniques. For 5G NR OTDOA, the PRS may be transmitted along the regular Synchronization Signal (SS) directions or re-use the Synchronization Signal Block (SSB) transmissions for RSTD measurements. In the current specifications and proposed mechanisms for 5G NR, there is no PRS scheduling at both azimuth (φ) and elevation (θ) dimensions, nor is there a method in 5G NR to provide an accurate elevation/altitude estimation.

Accordingly, in an embodiment, methods and systems are proposed herein for PRS transmissions along specific azimuth and elevation angles across multiple PRS occasions in co-ordination with UE measurements for respective PRS occasions. For example, dynamic PRS scheduling and hopping mechanism along different elevation and azimuth directions/angles may be used. The PRS, for example, may be beam formed over a range of angles of elevation and a range of angles of azimuth to assist UE measurement. The range of angles of elevation may be greater than or smaller than the range of angles of azimuth. For example, a narrow range of angles of elevation (e.g. 10 degrees) and a wide range of angles of azimuth (e.g. 120 degrees) may be used ("elevation PRS"). Alternatively, if desired, PRS beams may be formed with a wide range of elevation and narrow range of azimuth may also be used ("azimuth PRS").

To support elevation/altitude estimation using PRS transmissions along specific azimuth and elevation angles, the UE may indicate its capability, e.g., in an LTE Positioning Protocol (LPP) "Provide Capabilities" message, to support independent control over azimuth and elevation beam changes, as well as other parameters, such as the minimum and maximum width of beams along elevation and azimuth and the granularity of the width changes supported along elevation and azimuth. The capabilities of the UE may be used (e.g. by a location server) to derive an appropriate PRS schedule, e.g., for On Demand PRS scheduling, as opposed to a static PRS schedule. Moreover, the PRS schedule may be based on the respective capabilities of multiple UEs that are requesting location estimation. The PRS from multiple base stations, e.g., gNBs, may be scheduled with changing elevation angle in successive occasions. Similarly, another PRS schedule may be used to vary the azimuth of the PRS beam along narrow elevation.

The PRS schedule may be communicated to the UE in assistance data (AD). The UE may measure the multiple occasions either using a fixed beam or using a beam sweep technique. The resulting measurements, e.g., TOA measurements, may be reported individually for multiple occasions or a parameter from the measurements, e.g., a least TOA or average TOA across different elevation or azimuth beams, may be considered.

In LTE systems, for example, the transmission and reception to and from the network is generally in an isotropic pattern and PRSs are scheduled and available across the cell always during a PRS scheduling period. In 5G NR networks, the base stations (e.g., gNB) and mobile devices (e.g., UEs) may utilize beam forming to schedule transmissions in specific directions through directional beams to reduce the high path loss associated with millimeter-wave (mmW) frequencies. In such 5G NR networks, PRS may be scheduled across different possible beams. For example, the PRS may be configured differently on different beam indices, and an UE would need to perform beam steering on the receiver side to detect the PRS for a specific cell. In this approach, the UE would be required steer the receive beams to perform multiple attempts for PRS detection across different possible beam indices (e.g., SSB IDs) over several possible PRS occasions for a respective beam ID. The UE may incur significant delay in obtaining the PRS measurements of a serving cell as well as of different neighboring cells. The delay in PRS measurements may cause delays in obtaining position fixes and may consume significant power/battery.

In an example, an improved OTDOA scheme for 5G NR may mitigate the delay issues by detecting and utilizing additional information to perform PRS measurements. In an example, the synchronization signal burst index (SSB Index/Beam ID) value of the serving cell and the neighbor cells (measured or observed in the past) may be provided to a UE in the AD and stored. The SSB indices may be used by the UE, or provided by the UE to a location server, to determine a PRS measurement schedule. A base station (e.g., gNB) may include a codebook of the SSB indices along with their respective angular information when they are transmitted. The codebook information is an example of AD may reside at a gNB, shared with another network node, or shared with the UE. SSB indices of the serving and the neighboring cells may be used to localize the UE (e.g. obtain an approximate location for the UE) and to measure specific cells along with one or more SSB IDs or angular information. In the absence of the SSB indices for the serving cell and neighboring cells, the UE would be required to measure and detect PRS on all possible beams which may increase latencies in positioning results and may consume additional battery power.

In an example, a transceiver in a UE may be configured to simultaneously receive more than one parallel beam within the same frequency band or within different frequency bands. The UE may provide (e.g. to a location server) a maximum number of simultaneous beam values indicating the maximum number of beams which the UE can receive and measure at approximately the same time. A network node (e.g. a location server) may utilize the maximum number of simultaneous beam value to generate assistance data for the UE based on the band/frequency capabilities of the UE. For example, the network node may specify that a UE measure PRS on multiple beam IDs/SSD indices/angular information for the same cell. In an example, multiple intra-frequency measurements may be carried out simultaneously across different cells. The maximum number of simultaneous beam values may be used to improve the assistance data provided to the UE. The value may also enable the UE to determine multiple PRS measurements simultaneously and reduce the response time. In an example, the assistance data may group neighbor cells and their respective beam IDs in pairs to enable the UE to measure PRS from multiple cells in a reduced amount of time.

Figure 1B:
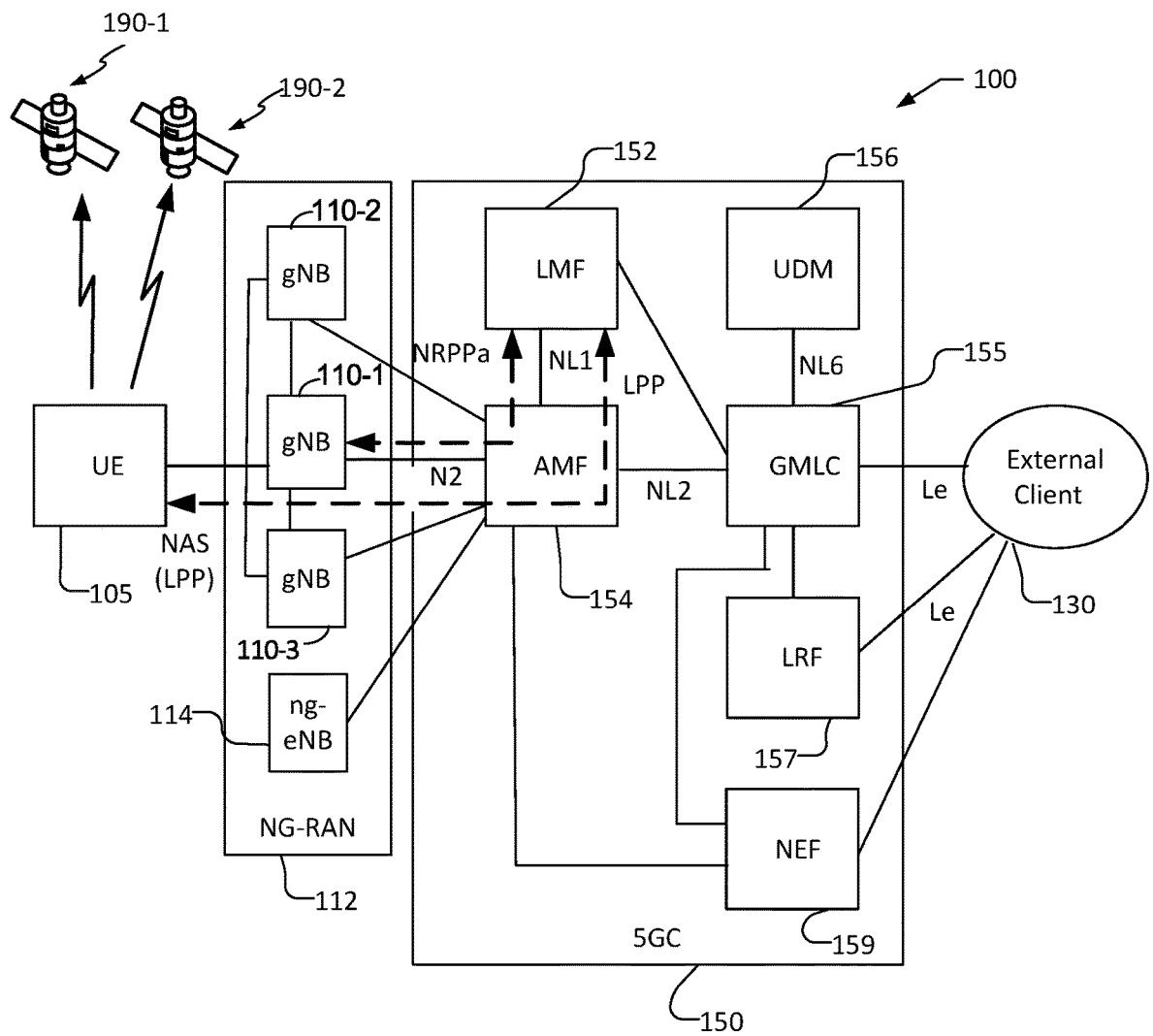
FIG. 1B is a block diagram illustrating a non-roaming reference architecture for UE location determination using PRS transmissions along specific azimuth and elevation angles.

Referring to FIGS. 1A and 1B, an architecture of a system 100 capable of providing location services to UE 105 including azimuth and elevation and codebook measurements using PRS transmissions along specific azimuth and elevation angles is shown. The transfer of capabilities, location assistance data, location information, etc. may use messages such as Long Term Evolution (LTE) Positioning Protocol (LPP) or LPP extensions (LPPe) messages or New Radio Position Protocol A (NRPPa) messages between UE 105 and base stations gNBs 110-1, 110-2, 110-3, ng-eNB 114 or server 152, which, in some instances, may take the form of a location server or another network entity. The transfer of the location information may occur at a rate appropriate to both UE 105 and location server 152. LPP is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

For simplicity, only one UE 105 and location server 152 are shown in FIG. 1A. The elevation (θ) of the UE 105 is illustrated as changing from a first position to a second position indicated with dotted lines. The position of the UE 105, including azimuth and elevation, may be determined using PRS transmissions from the base stations gNBs 110-1, 110-2, 110-3 along specific azimuth and elevation angles. In general, system 100 may comprise multiple cells indicated by 145-$k$ ($0 \leq k \leq N_{cells}$, where $N_{cells}$ is the number of cells) with additional networks 115, LCS clients 130, UEs 105, servers 150, base station (antennas) 110-1-110-4, and Space Vehicles (SVs) 190. System 100 may further comprise a mix of cells including macrocells such as cells 145-1, 145-3, and 145-4 along with femtocells such as cell 145-2 in a manner consistent with embodiments disclosed herein.

UE 105 may be capable of wirelessly communicating with location server 152 through one or more networks 115 that support positioning and location services. For example, location services (LCS) may be performed on behalf of LCS Client 130 that accesses location server 152 and issues a request for the location of UE 105. Location server 152 may then respond to LCS client 130 with a location estimate for UE 105. LCS Client 130 may also be known as a SUPL Agent—e.g. when the location solution used by location server 152 and UE 105 is SUPL. In some embodiments, UE 105 may also include an LCS Client or a SUPL agent that may issue a location request to some positioning capable function within UE 105 and later receive back a location estimate for UE 105. The LCS Client or SUPL Agent within UE 105 may perform location services for the user of UE 105—e.g. provide navigation directions or identify points of interest within the vicinity of UE 105.

As illustrated in FIG. 1A, the UE 105 may communicate with location server 152 through network 115 and base stations gNB 110-1, 110-2, 110-3, ng-eNB 114, which may be associated with network 115. UE 105 may receive and measure signals from base stations gNB 110-1, 110-2, 110-3, ng-eNB 114 that are beam formed along specific azimuth and elevation angles across multiple PRS occasions, which may be used for position determination. For example, UE 105 may receive and measure signals from one or more of base stations gNB 110-1, 110-2, 110-3 and/or 110-4, which may be associated with cells 145-1, 145-2, 145-3 and 145-4, respectively. In some embodiments, base stations gNB 110-1, 110-2, 110-3, ng-eNB 114 may form part of a wireless communication network, which may be a wireless wide area network (WWAN), wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

FIG. 1B is a simplified block diagram illustrating the communication system 100 for non-roaming support of UE 105 location using PRS transmissions along specific azimuth and elevation angles by the base stations gNB 110-1, 110-2, 110-3, ng-eNB 114. The non-roaming communication system 100 comprises a UE 105 and components of a Fifth Generation (5G) network comprising a Next Generation Radio Access Network (NG-RAN) 112, which includes base stations (BSs) sometimes referred to as New Radio (NR) NodeBs or gNBs 110-1, 110-2, 110-3, and a 5G Core Network (5GC) 150 that is in communication with an external client 130. A 5G network may also be referred to as a New Radio (NR) network; NG-RAN 112 may be referred to as an NR RAN or a 5G RAN; and 5GC 150 may be referred to as an Next Generation (NG) Core network (NGC). As an example, NG-RAN 112 may include one or more next generation eNBs (ng-eNBs) 114 which provide LTE wireless access to UE 105. Standardization of an NG-RAN and 5GC is ongoing in the Third Generation Partnership Project (3GPP). Accordingly, NG-RAN 112 and 5GC 150 may conform to current or future standards for 5G support from 3GPP. The UE 105 may also receive signals from one or more Earth orbiting Space Vehicles (SVs) 190-1 or 190-2, which may be part of a satellite positioning system (SPS). SVs 190-1 or 190-2, for example, may be in a constellation of Global Navigation Satellite System (GNSS) such as the US Global Positioning System (GPS), the European Galileo system, the Russian Glonass system or the Chinese Compass or BeiDou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

It should be noted that FIG. 1B provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190-1, 190-2, gNBs 110-1, 110-2, 110-3, ng-eNBs 114, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1B illustrates a 5G-based network, similar network implementations and configurations may be used for other communication technologies, such as 3G, Long Term Evolution (LTE), 802.11 WiFi etc.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GC 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GC 150 not shown in FIG. 1B, or possibly via a Gateway Mobile Location Center (GMLC) 155) and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110-1, 110-2, 110-3 or ng-eNB 114. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from satellites 190-1, 190-2 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110-1, 110-2, 110-3 or ng-eNB 114). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110-1, 110-2, 110-3) fixed at known locations or relative to four or more satellites 190-1, 190-2 with accurately known orbital data, or combinations thereof, based at least in part, on pilots, positioning reference signals (PRS) or other positioning related signals transmitted by the transmitters or satellites and received at the UE 105. Here, a location server, such as the LMF 152, may be capable of providing positioning assistance data to UE 105 including, for example, information regarding signals to be measured (e.g., expected signal timing, signal coding, signal frequencies, signal Doppler, muting configuration), locations and identities of terrestrial transmitters (e.g. gNBs 110-1, 110-2, 110-3) and/or signal, timing and orbital information for GNSS satellites 190-1, 190-2 to facilitate positioning techniques such as A-GNSS, AFLT, OTDOA and ECID. The facilitation may include improving signal acquisition and measurement accuracy by UE 105 and, in some cases, enabling UE 105 to compute its estimated location based on the location measurements. For example, location servers may comprise an almanac which indicates locations and identities of cellular transceivers and/or local transceivers in a particular region or regions such as a particular venue, and may provide information descriptive of signals transmitted by a cellular base station or AP (e.g. a gNB 110-1, 110-2, 110-3) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), or a round trip signal propagation time (RTT) between UE 105 and a cellular transceiver (e.g. a gNB 110-1, 110-2, 110-3) or a local transceiver (e.g. a WiFi access point (AP)). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS Ephemeris information) received from a location server (e.g. LMF 152) or broadcast by a base station (e.g. a gNB 110-1, 110-2, 110-3 or ng-eNB 114) in NG-RAN 112 to determine a location for UE 105.

The UE 105 may measure one or more of a Reference Signal Time Difference (RSTD), a Receive-Transmit (Rx-Tx) time difference, an Angle of Arrival (AOA), a Round Trip signal propagation Time (RTT), an Angle of Departure (AOD), a Reference Signal Strength Indication (RSSI), a Reference Signal Received Power (RSRP), a Reference Signal Received Quality (RSRQ). For example, in the case of OTDOA, UE 105 may measure a Reference Signal Time Difference (RSTD) between signals such as a position reference signal (PRS), Cell specific Reference Signal (CRS), or Tracking Reference Signal (TRS) transmitted by nearby pairs of transceivers and base stations (e.g. gNBs 110-1, 110-2, 110-3). An RSTD measurement may provide the time of arrival difference between signals (e.g. TRS, CRS or PRS) received at UE 105 from two different transceivers. The UE 105 may return the measured RSTDs to a location server (e.g. LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS receiver at each transceiver to accurately obtain the common universal time.

An estimate of a location of the UE 105 may be referred to as a location, location estimate, location fix, fix, position, position estimate or position fix, and may be geographic, thus providing location coordinates for the UE 105 (e.g., latitude and longitude) which may include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1B, pairs of gNBs 110-1, 110-2, 110-3 in NG-RAN 112 may be connected to one another, e.g., directly as shown in FIG. 1B or indirectly via other gNBs 110-1, 110-2, 110-3. Access to the 5G network is provided to UE 105 via wireless communication between the UE 105 and one or more of the gNBs 110-1, 110-2, 110-3, which may provide wireless communication access to the 5GC 150 on behalf of the UE 105 using 5G (e.g. NR). In FIG. 1B, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs in FIG. 1B (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 1B depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GC 150. Thus, the NG-RAN 112 may include any combination of gNBs, eNBs, or other types of base stations or access points. As an example, NG-RAN 112 may include one or more next generation eNBs (ng-eNBs) 114 which provide LTE wireless access to UE 105 and may connect to entities in 5GC 150 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), WLAN positioning, and/or other position methods. The LMF 152 may also process location services requests for the UE 105, e.g., received from the AMF 154. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support a location request for the UE 105 received from an external client 130 and may forward such a location request to the AMF 154, which may in turn forward the location request to LMF 152. A location response from the LMF 152 (e.g. containing a location estimate for the UE 105) may be similarly returned to the GMLC 155 via the AMF 154, or in some cases directly to the GMLC 155, and the GMLC 155 may then return the location response (e.g., containing the location estimate) to the external client 130. GMLC 155 may contain subscription information for an external client 130 and may authenticate and authorize a location request for UE 105 from external client 130. GMLC 155 may further initiate a location session for UE 105 by sending a location request for UE 105 to AMF 154 and may include in the location request an identity for UE 105 and the type of location being requested (e.g. such as a current location or a sequence of periodic or triggered locations).

As further illustrated in FIG. 1B, the LMF 152 and the gNBs 110-1, 110-2, 110-3 may communicate using a New Radio Position Protocol A (which may be referred to as NPPa or NRPPa). NRPPa may be defined in 3GPP TS 38.455 and may be the same as, similar to, or an extension of the LTE Positioning Protocol A (LPPa) defined in 3GPP Technical Specification (TS) 36.455, with NRPPa messages being transferred between the gNBs 110-1, 110-2, 110-3 and the LMF 152 via the AMF 154. As further illustrated in FIG. 1B, LMF 152 and UE 105 may communicate using the LTE Positioning Protocol (LPP) defined in 3GPP TS 36.355, where LPP messages are transferred inside NAS transport messages between the UE 105 and the LMF 152 via the AMF 154 and a serving gNB 110-1 for UE 105. For example, LPP messages may be transferred between the LMF 152 and the AMF 154 using service-based operations (e.g. based on the HyperText Transfer Protocol (HTTP)) and may be transferred between the AMF 154 and the UE 105 using a 5G Non-Access Stratum (NAS) protocol. The LPP protocol may be used to support positioning of UE 105 using UE assisted and/or UE based position methods such as A-GNSS, RTK, WLAN, OTDOA, AOA, AOD and/or ECID. The NRPPa protocol may be used to support positioning of UE 105 using network based position methods such as ECID (when used with measurements obtained by a gNB 110) and/or may be used by LMF 152 to obtain location related information from gNBs 110-1, 110-2, 110-3 such as parameters defining positioning reference signal (PRS) transmission from gNBs 110-1, 110-2, 110-3 for support of OTDOA.

With a UE assisted position method, UE 105 may obtain location measurements (e.g. measurements of RSSI, RTT, RSTD, AOA, AOD, RSRP and/or RSRQ for gNBs 110-1, 110-2, 110-3, ng-eNBs 114 or WLAN APs, codebook measurements, or measurements of GNSS pseudorange, code phase and/or carrier phase for SVs 190-1, 190-2) and send the measurements to a location server (e.g. LMF 152) for computation of a location estimate for UE 105. With a UE based position method, UE 105 may obtain location measurements (e.g. which may be the same as or similar to location measurements for a UE assisted position method) and may compute a location of UE 105 (e.g. with the help of assistance data received from a location server such as LMF 152 or broadcast by gNBs 110-1, 110-2, 110-3, ng-eNBs 114 or other base stations or APs). With a network based position method, one or more base stations (e.g. gNBs 110-1, 110-2, 110-3 and/or ng-eNBs 114) or APs may obtain location measurements (e.g. measurements of RSSI, RTT, RSRP, RSRQ or TOA for signals transmitted by UE 105) and/or may receive measurements obtained by UE 105, and may send the measurements to a location server (e.g. LMF 152) for computation of a location estimate for UE 105.

Information provided by the gNBs 110-1, 110-2, 110-3 to the LMF 152 using NRPPa may include timing and configuration information for PRS transmission and location coordinates of the gNBs 110-1, 110-2, 110-3. The LMF 152 can then provide some or all of this information to the UE 105 as assistance data in an LPP message via the NG-RAN 112 and the 5GC 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 110-1, 110-2, 110-3 (or supported by one or more ng-eNBs 114 or eNBs). The UE 105 may send the measurements back to the LMF 152 in an LPP message (e.g. inside a 5G NAS message) via the serving gNB 110-1 and the AMF 154.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP and/or NPP messages between UE 105 and LMF 152 via the ng-eNB 114 and AMF 154. An ng-eNB 114 and/or a gNB 110-1, 110-2, 110-3 in NG-RAN 112 may also broadcast positioning assistance data to UEs such as UE 105.

As illustrated, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management. Additionally, the GMLC 155 is connected to the Location Retrieval Function (LRF) 157, which handles retrieval of location information for the UE 105 and may be used to provide location information for UE 105 to an external client 130 that is a Public Safety Answering Point, e.g. following an emergency call from UE 105 to the PSAP.

To support services including location services from external clients 130 for Internet of Things (IoT) UEs, a Network Exposure Function (NEF) 159 may be included. The NEF 159, for example, may function to obtain a current or last known location for a UE 105, may obtain an indication of a change in location for a UE 105, or an indication of when a UE 105 becomes available (or reachable). An external client 130 (which may also be an Application Function (AF)) may access NEF 159 in order to obtain location information for UE 105. The NEF 159 may be connected to the GMLC 155 and/or to AMF 154 to support last known location, current location and/or deferred periodic and triggered location for the UE 105. If desired, the NEF 159 may include, or may be combined with, the GMLC 155.

Figure 1C:
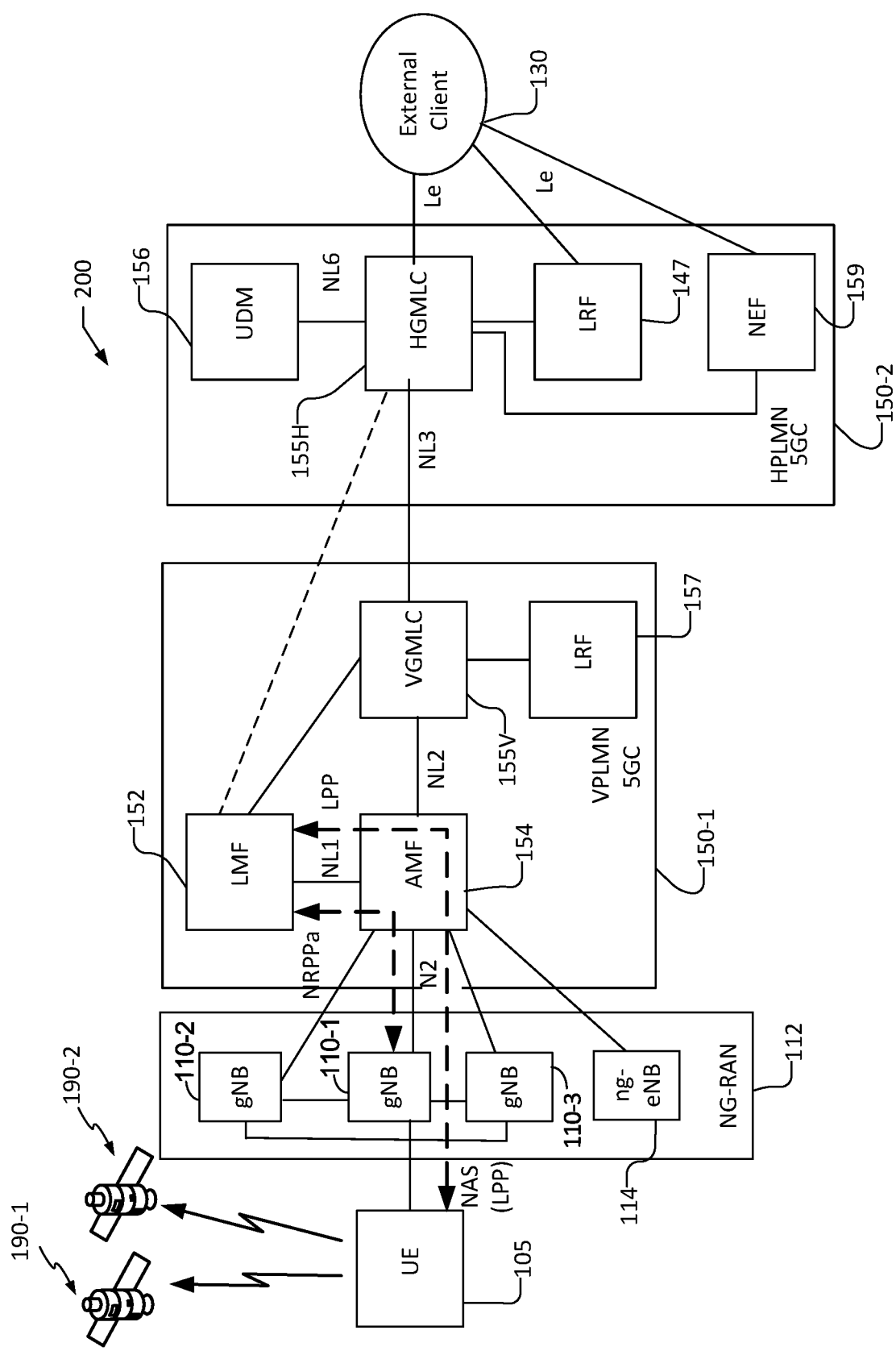
FIG. 1C is a block diagram illustrating a roaming reference architecture for UE location determination using PRS transmissions along specific azimuth and elevation angles.

Referring to FIG. 1C, a communication system 200 that is similar to the communication system 100 shown in FIG. 1B, but supports location for a roaming UE 105. In the communication system 200, the core network 5GC 150-1 that is in communication with the UE 105 via the NG-RAN 112 is a visited network, i.e., Visited Public Land Mobile Network (VPLMN), which is in communication with a home network 5GC, i.e., Home Public Land Mobile Network (HPLMN) 150-2. In communication system 200, the VPLMN 5GC 150-1 includes the Location Management Function (LMF) 152, which may perform the same functions and operations as LMF 152 in the non-roaming communication system of FIG. 1B. The VPLMN 5GC 150-1 also includes a Visited Gateway Mobile Location Center (VGMLC) 155V, which is similar to the GMLC 155 in the non-roaming communication system of FIG. 1B, and is designated as 155V to indicate that it is located in the visited network for UE 105. As illustrated in FIG. 1C, the VGMLC 155V connects to the LMF 152, the AMF 154 and to the LRF 157 in the VPLMN 5GC 150-1.

As illustrated, HPLMN 5GC 150-2 may include a Home GMLC (HGMLC) 155H that may be connected to the VGMLC 155V (e.g., via the Internet). Optionally (and as shown by the dashed line in FIG. 1C), HGMLC 155H may be connected to LMF 152 (e.g. via the Internet) and/or to the AMF 154 (not shown in FIG. 1C) and may in that case not always be connected to VGMLC 155V. The HGMLC 155H may be similar to the GMLC 155 in the non-roaming communication system of FIG. 1B, and is designated as 155H to indicate that it located in the home network for UE 105. The VGMLC 155V and HGMLC 155H may be sometimes collectively and generically referred to herein as GMLC 155. The HGMLC 155H is in communication with the external client 130, as well as the UDM 156 and LRF 147 in the HPLMN 150-2. The LRF 147 may also communicate with the external client 130 and may perform similar functions to LRF 157. The HGMLC 155H may provide location access to UE 105 on behalf of external clients such as external client 130. One or more of HGMLC 155H and LRF 147 may be connected to external client 130, e.g., through another network, such as the Internet. In some cases, a Requesting GMLC (RGMLC) located in another PLMN (not shown in FIG. 1C) may be connected to HGMLC 155H (e.g., via the Internet) in order to provide location access to UE 105 on behalf of external clients connected to the RGMLC. The RGMLC, HGMLC 155H and VGMLC 155V may support location access to UE 105. HPLMN 5GC 150-2 also includes NEF 159 which may correspond to NEF 159 in communication system 100 and may be connected to HGMLC 155H.

Figure 2A:
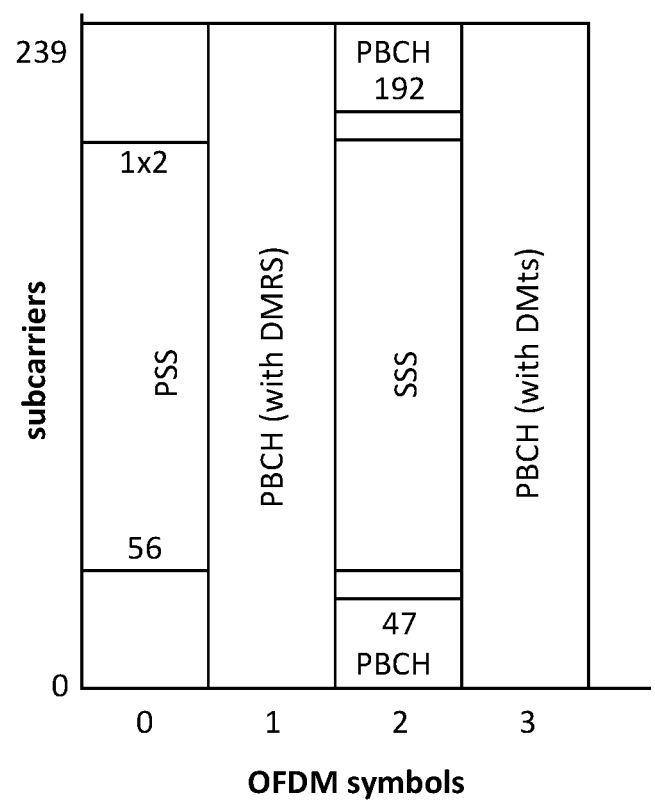
FIG. 2A is an example synchronization signal in a fifth-generation new radio (5G NR) wireless network.

Referring to FIG. 2A, an example synchronization signal in a 5G NR wireless network is shown. The Synchronization Signal and Physical Broadcast Channel (PBCH) block (SSB/SS Block) may include a primary and a secondary synchronization signals (PSS, SSS), each occupying 1 symbol and 127 subcarriers, and PBCH spanning across 3 OFDM symbols and 240 subcarriers. The periodicity of the SSB can be configured by the network and the time locations where SSB can be sent are determined by sub-carrier spacing. Within the frequency span of a carrier, multiple SSBs can be transmitted. The Physical Cell Identifiers (PCIs) of the SSBs do not have to be unique, i.e. different SSBs can have different PCIs.

In some versions of the 3GPP specifications (e.g., 3GPP "NR and NG-RAN Overall Description—Rel. 15," TS 38.300, 2018), the concept of SSB and burst emerged for periodic synchronization signal transmission from the gNBs. An SS block may be a group of 4 OFDM symbols in time and 240 subcarriers in frequency (i.e., 20 resource blocks), as shown in FIG. 2. The SS block may carry the PSS, the SSS and the PBCH. A Demodulation Reference Signal (DMRS) associated with the PBCH may be used to estimate the Reference Signal Received Power (RSRP) of the SS block. In a slot of 14 symbols, there are two possible locations for SS blocks: symbols 2-5 and symbols 8-11. The SS blocks may be grouped into the first 5 ms of an SS burst, which can have different periodicities TSS. For example, value of TSS may be on the order of 5, 10, 20, 40, 80, or 160 ms. When accessing the network for the first time, a UE may assume a periodicity TSS=20 ms. When considering frequencies for which beam operations are required, each SS block may be mapped to a certain angular direction. To reduce the impact of SS transmissions, SS may be sent through wide beams, while data transmission for the active UE may usually performed through narrow beams, to increase the gain produced by beamforming.

Figure 2B:
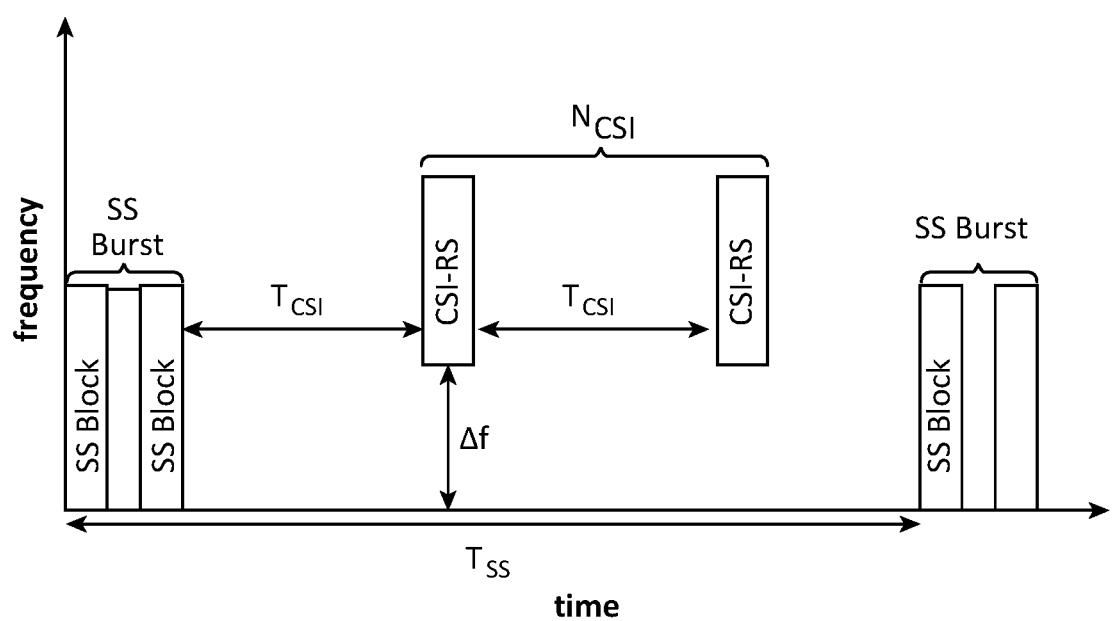
FIG. 2B is an example channel-state information reference signal (CSI-RS) periodicity configuration in a 5G NR wireless network.

In an embodiment, CSI-RSs may be used for Radio Resource Management (RRM) measurements for mobility management purposes in connected mode. For example, it may be possible to configure multiple CSI-RS to the same SS burst, in such a way that a UE may first obtain synchronization with a given cell using the SS bursts, and then use that as a reference to search for CSI-RS resources. The CSI-RS measurement window configuration may contain at least the periodicity and time/frequency offsets relative to the associated SS burst. Referring to FIG. 2B, an example CSI-RS periodicity configuration in a 5G NR wireless network is shown. SS blocks may be sent every TSS ms, and they embed time and frequency offsets indicating the time and frequency allocation of CSI-RS signals within the frame structure. As depicted, a CSI-RS signal may be sent $T_{CSI}$ ms after the end of an SS burst. In general, in a 5G NR network, the best directions for the beams of the transceiver need to be periodically identified (e.g., through beam search operations), in order to maintain the alignment between the communicating nodes. In an example, SS- and CSI-based measurement results can be jointly used to reflect the different coverage which can be achieved through different beamforming architectures.

Figure 3:
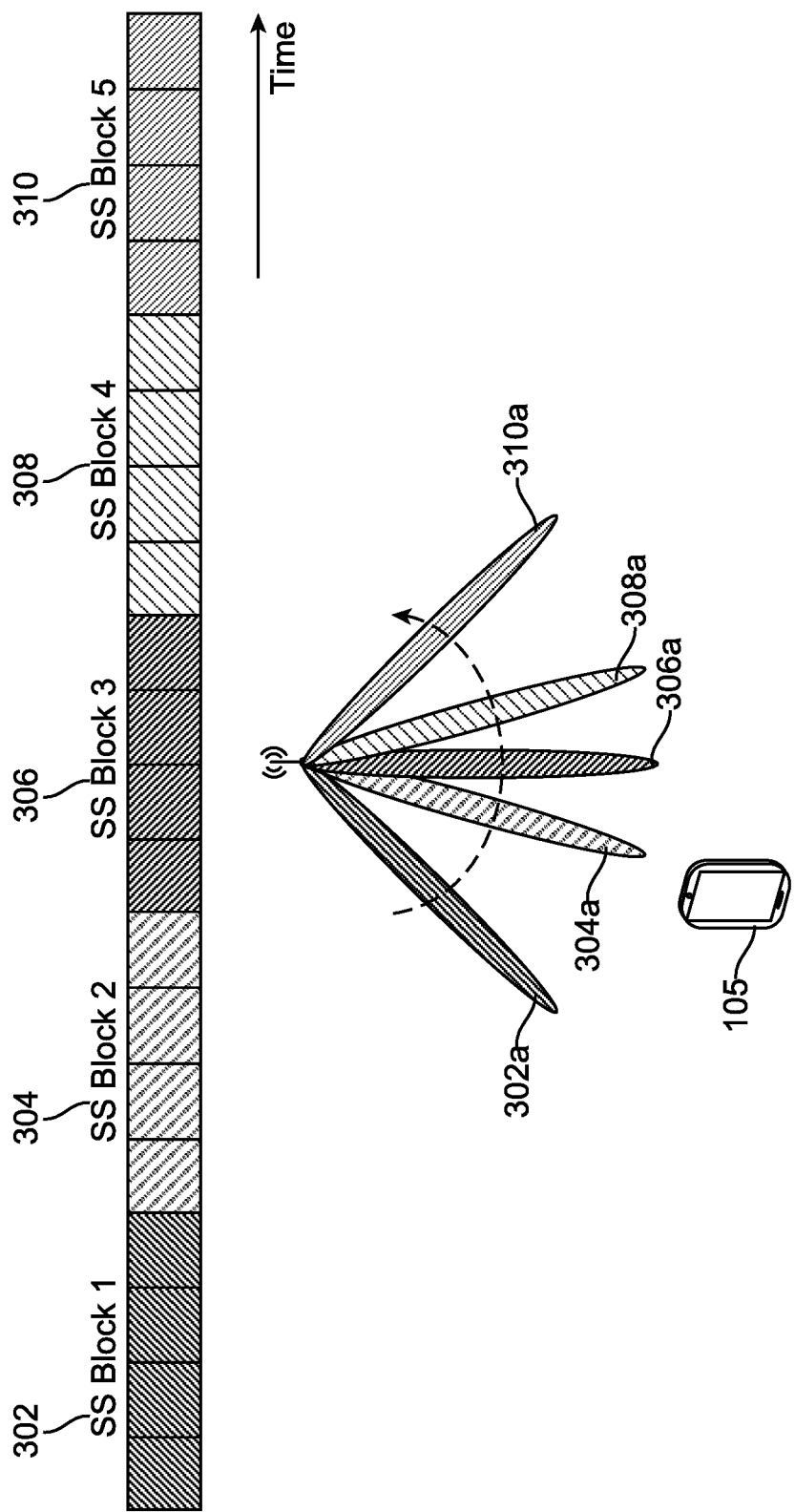
FIG. 3 is a conceptual diagram of directional beams transmitted from a base station based on a synchronization signal (SS) burst.

Referring to FIG. 3, a conceptual diagram directional beams transmitted from a base station based on a synchronization signal (SS) burst is shown. The SS Burst includes a plurality of SS blocks such as a first SS Block 302, a second SS Block 304, a third SS Block 306, a fourth SS block 308 and a fifth SS Block 310. An SS burst may include additional SS blocks. As discussed above, each SS block 302, 304, 306, 308, 310 may be mapped to an angular direction and a specific beam ID. For example, the first SS block 302 is mapped to a first beam 302a with a beam identification value (e.g., index) of 1, the second SS block 304 is mapped to a second beam 304a with a beam identification value of 2, the third SS block 306 is mapped to a third beam 306a with a beam identification value of 3, the fourth SS block 308 is mapped to a fourth beam 308a with a beam identification value of 4, and the fifth SS block 310 is mapped to a fifth beam 310a with a beam identification value of 5. During an initial signal acquisition procedure, a UE 105 may receive one or more beam identification values from base stations (e.g., gNB) in a wireless network. Once the UE 105 receives a beam from a particular base station, the UE may be configured to map the received beam identification value and a cell identification based on a codebook. For example, when the UE 105 receives the second beam 304a with the beam identification value of 2 (i.e., associated with SS Block 2), the UE may be configured to reference a codebook (e.g., a data structure) with the beam identification value to determine the angular information associated with the second beam 304a. In an example, the UE may report the beam identification back to a network node configured to determine the angular information based on a codebook (i.e., stored remote from the UE). In general, there may be a one-to-one mapping between a beam identification value (e.g., a SSB ID) with a spatial angle of the transmitted beam. In an example, the codebook may include PRS data (e.g., PRS ID, bandwidth, frequency hopping configuration, beam IDs, etc.) associated with the cell and synchronization signal beam identification information. One or more data structures such as a codebook (e.g., data table) located on a network node and/or the UE may be used to determine the angular direction of the transmitted beam based on the beam identification value.

Figure 4A:
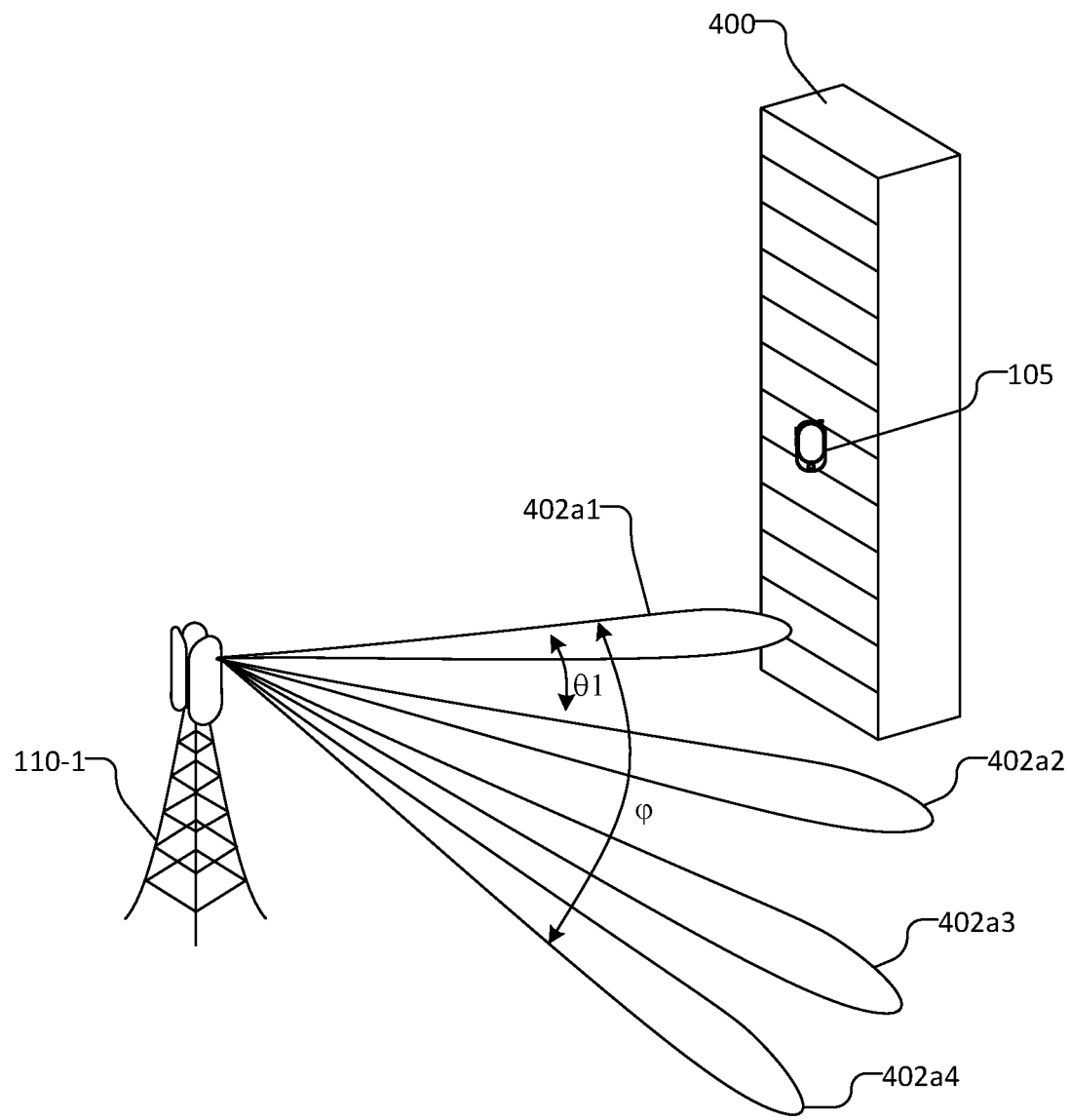
FIGS. 4A, 4B, and 4C illustrates a base station transmitting directional beams with PRS signals formed along specific azimuth and elevation angles across multiple PRS occasions.
Figure 4B:
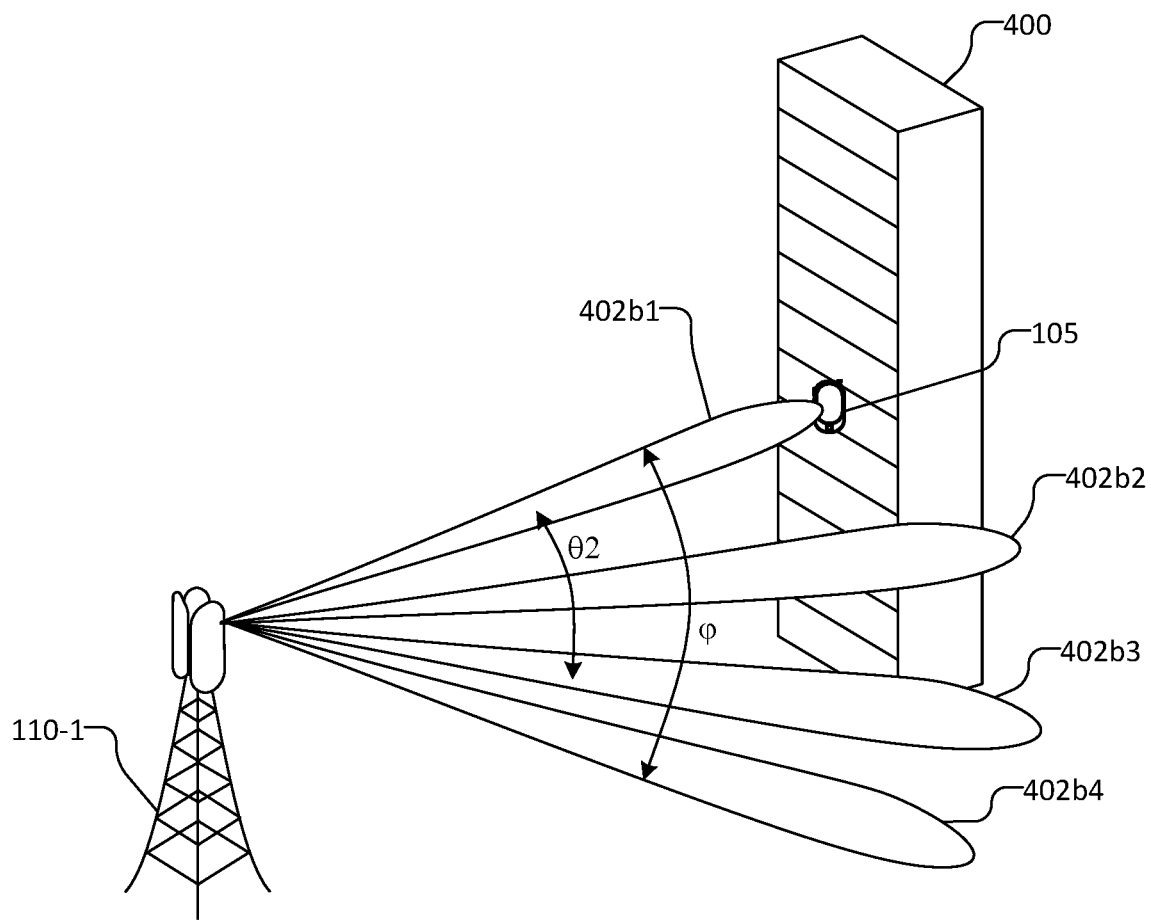
Figure 4C:
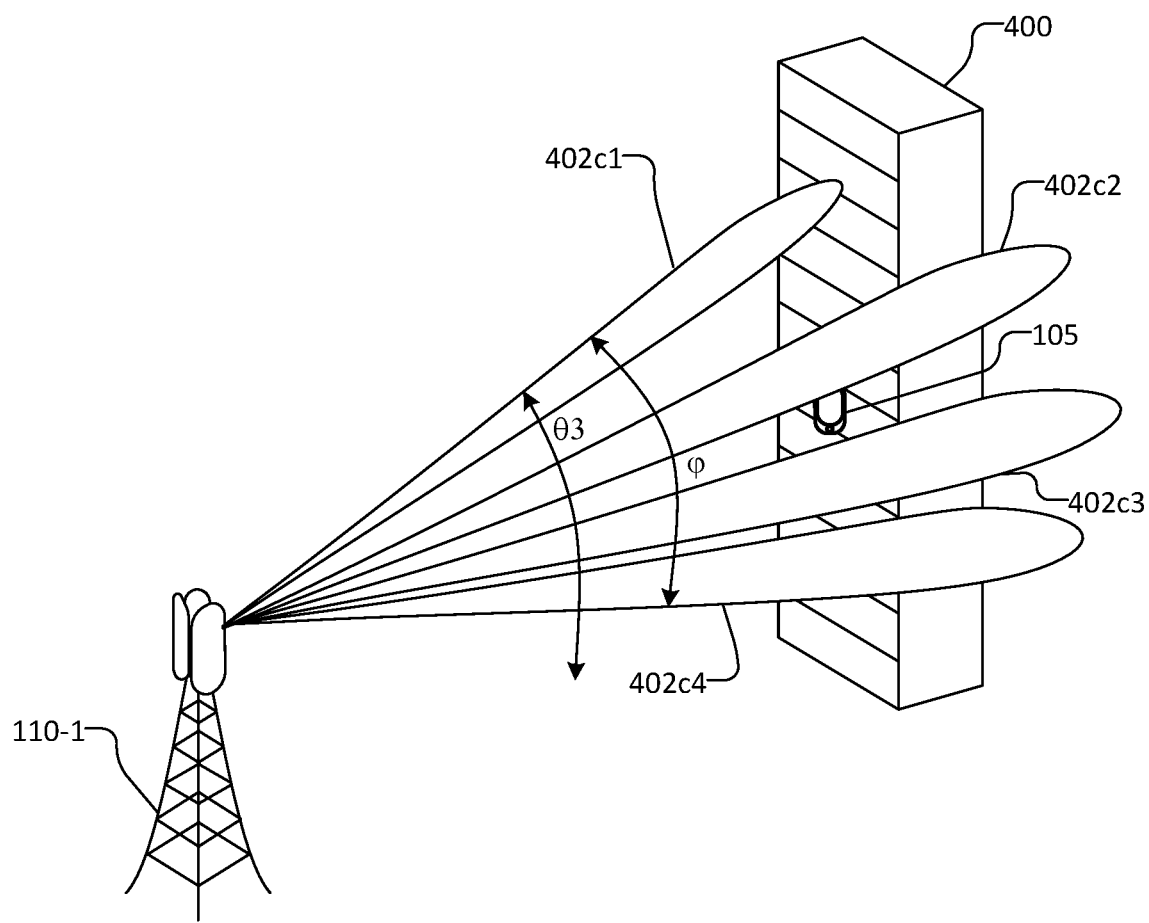

Referring to FIGS. 4A, 4B, and 4C, by way of example, a building 400, a UE 105 that is in the building 400, and a base station gNB 110-1 producing a number of directional beams with PRS signals formed along specific azimuth and elevation angles across multiple PRS occasions is shown. While a UE 105 in building 400 is illustrated, the use of PRS signals formed along specific azimuth and elevation angles across multiple PRS occasions may have other uses, for example, measuring the altitude of drone and UAV based UEs.

FIG. 4A, by way of example, illustrates a number of directional beams 402a1, 402a2, 402a3, and 402a4 each formed at the same elevation θ1, but with different azimuth angles φ during a first set of PRS occasions. FIG. 4B is similar to FIG. 4A, but illustrates a number of directional beams 402b1, 402b2, 402b3, and 402b4 each formed at an elevation θ2, which is different than the elevation θ1 shown in FIG. 4A, and with different azimuth angles φ during a second set of PRS occasions. FIG. 4C is similar to FIGS. 4A and 4B, but illustrates a number of directional beams 402c1, 402c2, 402c3, and 402c4 each formed at an elevation θ3, which is different than the elevations θ1 and θ2 shown in FIGS. 4A and 4B, respectively, and with different azimuth angles φ during a third set of PRS occasions. While FIGS. 4A, 4B, and 4C illustrate sweeping the azimuth angle φ of the directional beams before changing elevation angle θ, it should be understood, that if desired, the elevation angle θ of the directional beams may be swept before changing azimuth angle φ. In another implementation, if desired, both the azimuth angle φ and the elevation angle θ may change at every PRS occasion. Further, as discussed above, the directional beams may be formed with a narrow range of angles of elevation (e.g. 10 degrees) and a wide range of angles of azimuth (e.g. 120 degrees), or alternatively, the PRS beams may be formed with a wide range of elevation and narrow range of azimuth.

The UE 105 may provide its capabilities to support independent control over elevation beamforming while keeping the azimuth beam the same for altitude/elevation measurement. The UE capabilities for example, may be sent in a 'ProvideCapabilities' message/IE. The UE may further indicate the granularity of the elevation beams possible, e.g., based on the present antenna array on the UE. Additionally, UE 105 may include a time metric, e.g., specifying the time taken by the UE 105 to change the elevation angle for the same azimuth beam. The time metric may be used, e.g., to tailor the PRS schedule and assistance data so that two successive PRS occasions with changing elevation are separated in the time domain by at least the amount of time required by the UE to change the elevation angle with its antenna array. In addition, the UE 105 may specify in the same or additional IE the minimum and maximum elevation and azimuth width that is supported by the UE 105 or the UE expected altitude, which can be used to schedule the PRS signals.

A possible ProvideCapabilities is shown in Table 1. The definition in Table 1 is based on a fragment of Abstract Syntax Notation One (ASN.1).

Figure 4D:
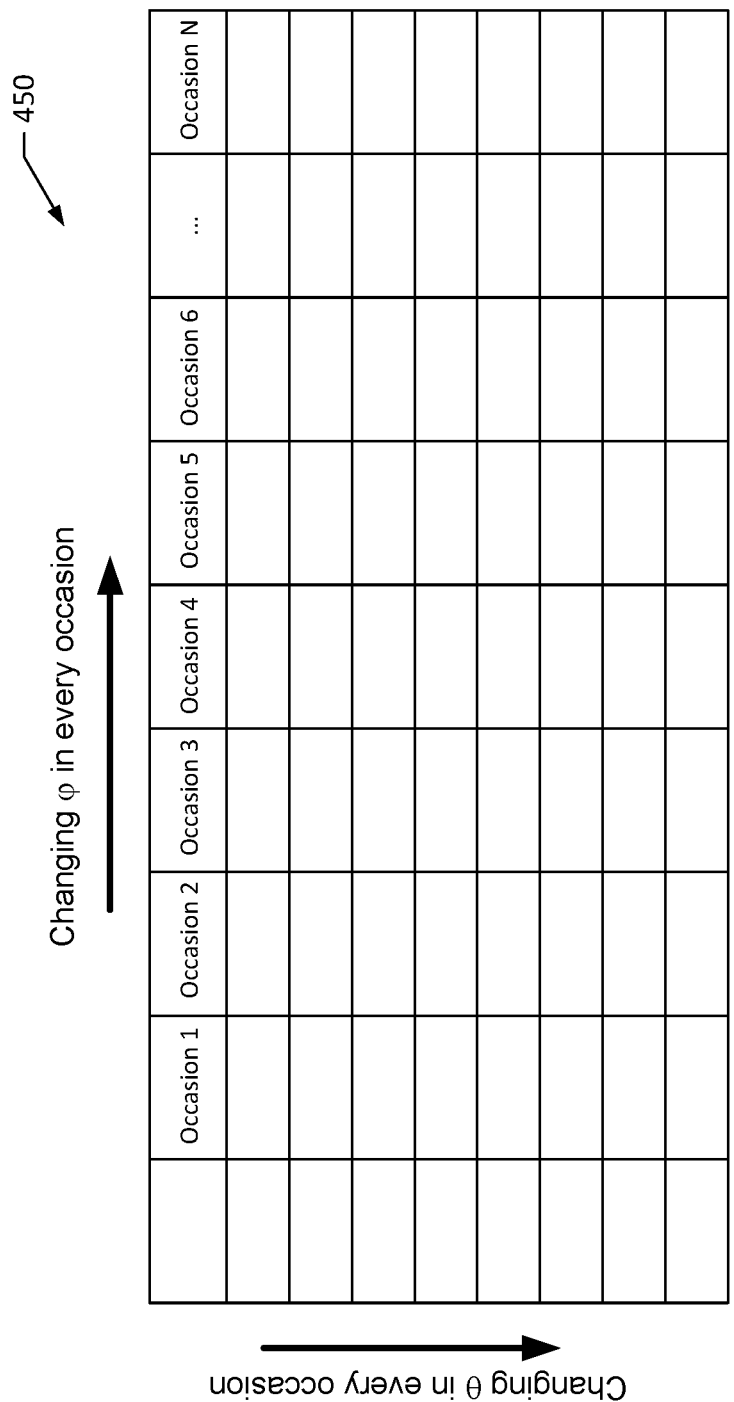
FIG. 4D illustrates a table defining a schedule of PRS occasions with changing azimuth and elevation angles.

The location server, e.g., LMF 152, or other entities in the network, e.g., the base station gNB 110-1, may define the 'Elevation PRS' and 'Azimuth PRS', e.g., based on the capabilities of the UE 105 or the capabilities of multiple UEs including the UE 105. The initial scheduling may be on a specific beam, e.g., along the current serving beam, specified in the assistance data for the UE 105 to detect and measure the beam information. The assistance data may specify subsequent PRS occasions and how the elevation, azimuth or both changes. FIG. 4D, by way of example, illustrates a table 450 of PRS occasions with changing azimuth $\varphi$ and changing elevation $\theta$, which may be used to define the PRS schedule. The UE 105 may measure beam information for every PRS occasion, which may be relative to the first PRS occasion. The periodicity of the PRS occasions for every cell may be contained using the existing IEs.

A possible PRS-Info IE, which may be provided to the UE 105 is shown in Table 2. Similar to Table 1, the definition in Table 2 is based on a fragment of Abstract Syntax Notation One (ASN.1).

TABLE 2

-- ASN1START
PRS-Info ::= SEQUENCE {
    prs-Bandwidth ENUMERATED { n6, n15, n25, n50, n75, n100, ... },
    prs-ConfigurationIndex INTEGER (0..4095),
    numDL-Frames ENUMERATED {sf-1, sf-2, sf-4, sf-6, ..., sf-add-v1420},
    ...,
    prs-MutingInfo-r9 CHOICE {
    po2-r9 BIT STRING (SIZE(2)),
    po4-r9 BIT STRING (SIZE(4)),

TABLE 1

```
-- ASN1START
OTDOA-ProvideCapabilities ::= SEQUENCE (
   otdoa-Mode BIT STRING { ue-assisted (0) } (SIZE (1..8)),
   ...,
   supportedBandListEUTRA SEQUENCE (SIZE (1..maxBands)) OF
SupportedBandEUTRA OPTIONAL,
   supportedBandListEUTRA-v9a0 SEQUENCE (SIZE (1..maxBands)) OF
SupportedBandEUTRA-v9a0 OPTIONAL
}
</snip for existing IE>
}
   </snip for existing IE>
}
//Proposed R-16 params
Beam Control IEs R-16
{
     Elevation Control Capable        ENUMERATED { supported }
OPTIONAL,
     Azimuth Control Capable          ENUMERATED { supported }
OPTIONAL,
     Elevation Control Granularity    ENUMERATED { 5 deg, 10 deg,...}
OPTIONAL,
     Azimuth Control Granularity      ENUMERATED { 5 deg, 10 deg, ... }
OPTIONAL,
     Min Elevation Control            ENUMERATED { 5 deg, 10 deg, ... }
OPTIONAL,
     Min Azimuth Control              ENUMERATED { 5 deg, 10 deg, ... }
OPTIONAL,
     Max Elevation Control            ENUMERATED { 5 deg, 10 deg, ... }
OPTIONAL,
     Max Azimuth Control              ENUMERATED { 5 deg, 10 deg, ... }
OPTIONAL
}
maxFBI INTEGER ::= 64 -- Maximum value of frequency band indicator
maxFBI-Plus1 INTEGER ::= 65 -- lowest value extended FBI range
maxFBI2 INTEGER ::= 256 -- highest value extended FBI range
-- ASN1STOP
```

TABLE 2-continued

```
        po8-r9 BIT STRING (SIZE(8)),
        po16-r9 BIT STRING (SIZE(16)),
        ...,
    </snip>
    </snip>
        prs-elevation-Azimtuth-Info-r16 CHOICE (
        SeedAzimuthAngle ENUMERATED (0, 30, 60.. 180),
        ElevationStepSize ENUMERATED (10, 20, .. 180)
        num-elevation-steps INTEGER (1..18)
        SeedElevationAngle ENUMERATED (0, 30, 60.. 180),
        AzimuthStepSize ENUMERATED (10, 20, .. 180)
        num-Azimuth-steps INTEGER (1..18)
        } OPTIONAL
        ]]
    }
    maxAvailNarrowBands-Minus1-r16 INTEGER ::= 15 -- Maximum
    number of narrowbands minus 1
    -- ASN1STOP
```

In Table 2, the first PRS positioning occasion of the first PRS occasion group that starts after the beginning of SFN=0 of the assistance data reference cell may be the seed occasion of the elevation PRS. Subsequent PRS occasions numbering for step size changes may be relative to the first PRS occasion. The SeedAzimuthAngle may be the azimuth of the first PRS occasion. The ElevationStepSize may be the step size of the change in the elevation angle in subsequent occasion. The num-elevation-steps may be the number of occasions for which the elevation PRS would be present with changing elevation. The SeedElevationAngle may be the elevation of the first PRS occasion. The AzimuthStepSize may be the step size of the change in the azimuth angle in subsequent occasion. The num-Azimuth-steps may be the number of occasions for which the Azimuth PRS would be present with changing elevation. It should be understood that while the core information content may remain the same, there may be changes to how the information is communicated to the UE 105.

In one implementation, based on the PRS schedule information received in the assistance data by the UE 105, the UE 105 may beamform using an antenna array in the specified direction to measure the PRS for a specific cell. The UE 105 may report the measurement, e.g., the TOA, of each of the different occasion separately for each cell to a location server, e.g., LMF 152, to estimate the altitude of the UE 105 or to compute an accurate position of the UE 105 in 3D space, for example, based on the PRS measurement for multiple different elevation beams. The UE 105 may determine and report to the location server a differential in the PRS measurement, e.g., the TOA, for multiple different beams from the same cell with respect to a reference PRS from the base station. The location server may determine an altitude of the UE 105 based on the reported measurement or differential for each PRS occasion, e.g., using the known azimuth and elevation of the PRS beam for each PRS occasion.

In another implementation, the UE 105 may measure the PRS beamformed as 'Elevation PRS' and 'Azimuth PRS' for each PRS occasion without beamforming the receive beam, e.g., the UE 105 may use a single receive beam. The UE 105 may report the measurement for each occasion, e.g., either the measurement itself or a differential relative to a reference PRS, to a location server to determine the altitude of the UE 105 or to compute an accurate position of the UE 105 in 3D space. Measurements across different PRS occasions by the UE 105 with a fixed receive beam may assist in determining the location of the within a certain azimuth or elevation. For example, TOA and RSTD measurements may be reported along with non-detection of certain occasion due to elevation and azimuth of the PRS being outside the fixed receive beam of the UE 105.

Figure 5:
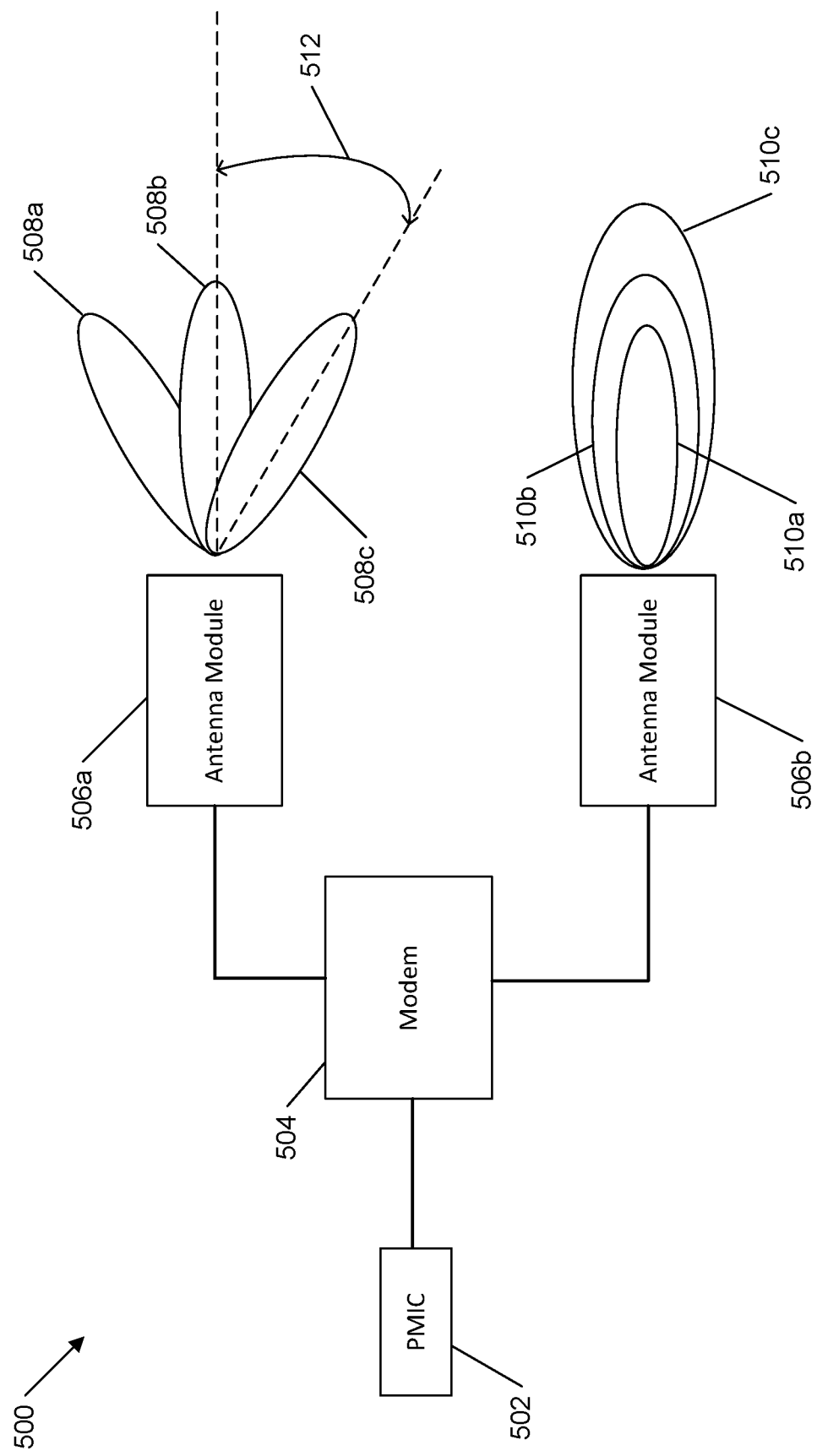
FIG. 5 is a block diagram of antenna modules in an example mobile device with configurable receive beam steering and receive beam width.

Referring to FIG. 5, a block diagram of antenna modules in an example mobile device 500 with configurable receive beam steering and receive beam width is shown. The mobile device 500 is an example of the UE 105 configured to beamform a receive antenna using an antenna array in the specified direction to measure the PRS for a specific cell. The mobile device 500 includes a Power Management integrated circuit (PMIC) 502, a modem 504, a first antenna module 506a, and a second antenna module 506b. The PMIC 502 is operably coupled to the modem 504 and is configured to control the power to the modem 504. The modem 504 may include one or more modems operably coupled to the antenna modules 506a-b and configured to support 5G mobility features (e.g. beam control). The SnapDragon® X50 is an example of a modem 504. The modem 504 provides signal and control data to a plurality of antenna modules. The antenna modules 506a-b may be multiple-input-multiple output (MIMO) antenna arrays configured to enable beam forming, beam steering and beam tracking. For example, the antenna modules may include an array of patch antennas and the modem 504 may be configured to utilize phase shifters and/or hybrid antenna couplers to control the power directed to the antenna array and to control the resulting beam pattern. While two antenna modules are depicted in FIG. 5, additional modules may be coupled to the modem 504. The first antenna module 506a is an example of beam steering such that a single beam of fixed width is steered across different reference angles. The antenna module 506a is configured to sweep through different angle sensitivity relative to an antenna array. For example, the antenna module 506a may be configured to sequentially receive a signal in a first beam direction 508a, a second beam direction 508b, and a third beam direction 508c. The antenna module 506a may be configured to receive multiple signals with different directional beams 508a-c simultaneously within a frequency band or across different bands. The angular orientation between a beam direction and a reference direction (e.g., orthogonal to the antenna array) may be referred to as a mean angle 512. In an example, the angular orientation may be based on a reference system (e.g., true north, magnetic north, etc.). The mobile device 500 may be configured to measure the reference signal time difference (RSTD) of transmitted beams that are received by each of the receive beams 508a-c.

The second antenna module 506b is an example of a single beam with a controllable beam width. The modem 504 is configured to vary the receiver beam width. For example, the number of antenna patches may be changed to vary the receiver beam width. The modem 504 may be configured, for example, to generate a first receive beam 510a, a second receive beam 510b that is wider than the first receive beam 510a, and a third receive beam 510c that is wider than the second receive beam 510b. The uniform beam widths and shapes depicted in FIG. 5 are examples to demonstrate the concept of varying beam widths. The actual beam widths and shapes may vary. The mobile device 500 may be configured to measure the RSTD of transmitted beams using each of the different beam widths values associated with each of the receive beams 510a-c.

Figure 6:
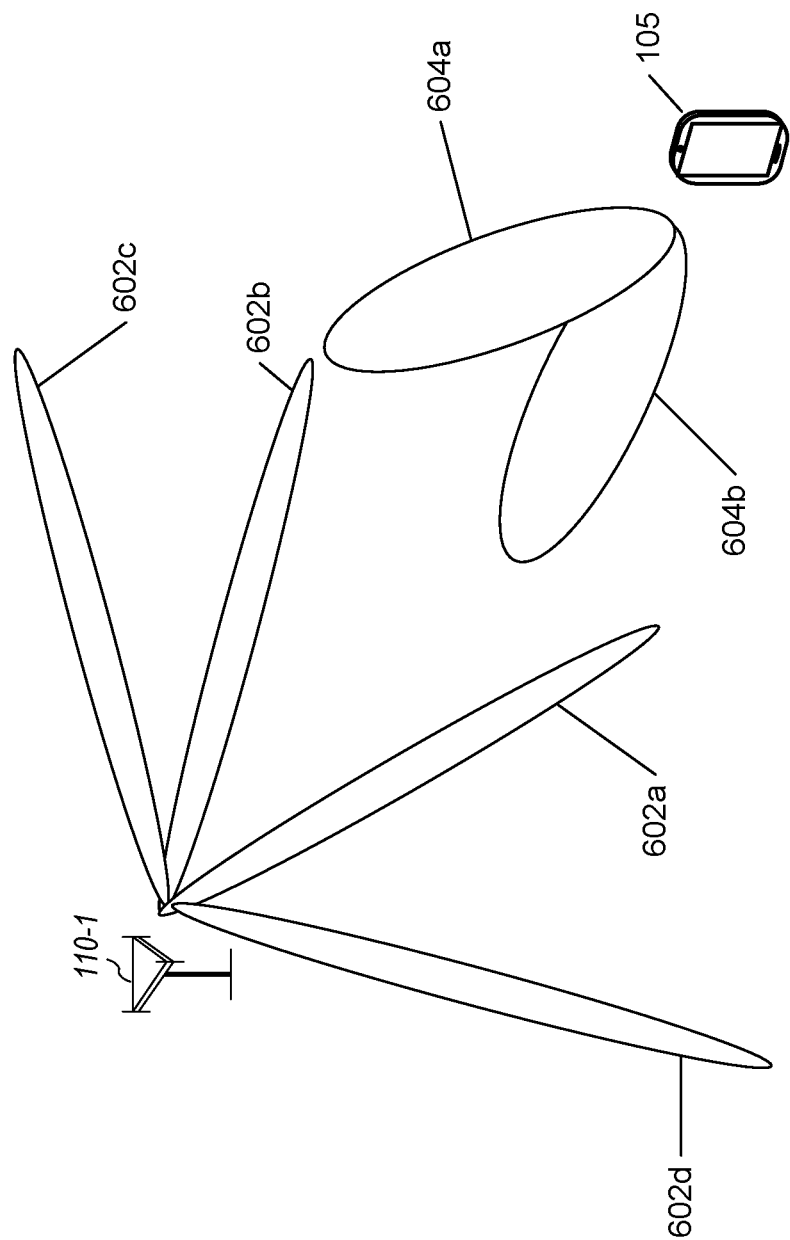
FIG. 6 is a conceptual diagram illustrating directional positioning reference signals and directional receive beams.

Referring to FIG. 6, a conceptual diagram illustrating directional positioning reference signals and directional receive beams is shown. A base station such as a gNB 110-1 is configured to transmit a plurality synchronization signal blocks (SS blocks) as a plurality of transmitted beams 602a-d. The beam angles depicted in FIG. 6 are examples only as the beam angles may include both azimuth (φ) and elevation (θ) dimensions as described in FIGS. 4A-4C. In an example, each beam will cover approximately 30 degrees (e.g., 12 beams to cover 360 degrees). The UE 105 detects a first beam identification value associated with a first beam 602a and a second beam identification value associated with a second beam 602b. The UE 105 may be configured to provide the corresponding cell ID value and the first and second beam identification values in a provide capability messages. The LMF 152 (via the gNB 110-1) may provide PRS assistance data (e.g., in a LPP/NPP Provide Assistance Data message) including a beam ID list specifying the SSB ID to be used to measure RSTD/TOA. For example, the beam ID list may include the SSB ID values for the first beam 602a and the second beam 602b, and the assistance data may include the PRS values (e.g., azimuth (φ) and elevation (θ) dimensions) associated with the first and second beams 602a-b. The UE 105 may utilize the beam ID list and current orientation information to generate one or more receive beams 604a-b to make the TOA/RSTD measurements. The inclusion of the beam ID list in the assistance data allows the UE 105 to determine azimuth (φ) and elevation (θ) dimensions associated with the transmitted beam and perform receiver beam steering to detect the PRS for a specific cell and beam. Without the beam ID list in the assistance data, the UE 105 would need to perform multiple attempts for PRS detection across different possible beam indices (SSB IDs) over several possible PRS occasions on that respective beam ID.

Figure 7A:
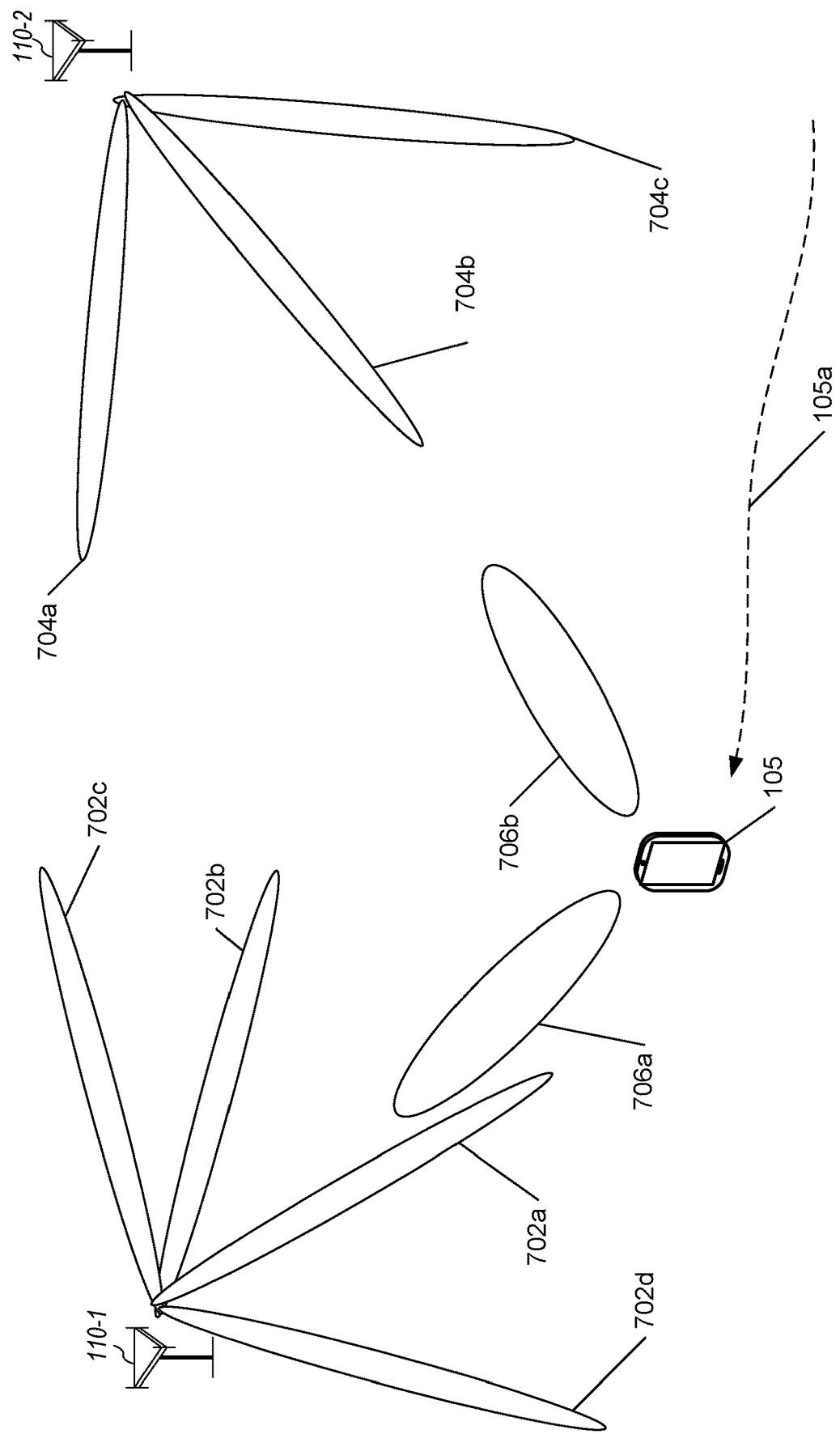
FIG. 7A is a conceptual diagram illustrating simultaneous reception of positioning reference signals from two base stations.

Referring to FIG. 7A, a conceptual diagram illustrating directional positioning reference signals and directional receive beams is shown. A first base station gNB 110-1 and a second base station gNB 110-2 are each configured to transmit a plurality of synchronization signal blocks (SS blocks) as a first plurality of transmitted beams 702a-d and a second plurality of transmitted beams 704a-c. The beam angles depicted in FIG. 7A are examples only as the beam angles may include the azimuth (φ) and elevation (θ) dimensions. In operation, the first base station gNB 110-1 may be the current serving cell for the UE 105, and the two stations may be configured to communicate via a first beam 702a and a first receiver beam 706a. The UE 105 may have travelled along a path 105a and may have been in communication with the second base station gNB 110-2 via a third beam 704c. The UE 105 may send a provide capabilities message including the SSB index of the serving cell and the neighbor cells measured and/or observed in the past. For example, the cell IDs and beam IDs associated with the first beam 702a (i.e., current serving cell), and third beam 704c (i.e., a previous serving cell). The provide capabilities message may also include an indication of the number of PRS beams the UE 105 can receive simultaneously. The LMF 152 may be configured to utilize provide capabilities message to determine one or more directional PRS beams (including azimuth (φ) and elevation (θ) dimensions) that the UE 105 may use to obtain TOA/RSTD measurements. As illustrated in FIG. 7A, the assistance data provided to the UE 105 may indicate that the PRS measurements may be obtained using the first beam 702a from the first base station gNB 110-1 and a fourth beam 704b from the second base station gNB 110-2. The UE 105 may generate directional receive beams 706a-b based on the angular information associated with the first beam 702a and the fourth beam 704b. In an example, the PRS measurements associated with the first beam 702a and the fourth beam 704b may be obtained individually or simultaneously based on the capabilities of the UE 105.

In an example, the UE 105 may provide the resulting TOA/RSTD measurements including the respective beam ID values to the LMF 152 in a provide location information message. The UE 105 may be configured to measure the TOA of the PRS of each specified beam ID for each base station and report to the LMF 152, and the LMF 152 may be configured to look for minimum TOA for each cell across different beam IDs and use that minimum TOA value further for RSTD computation. With multiple TOAs available for the same cell for different SSB/Beam IDs requested in the assistance data, the LMF 152 may apply other algorithms such as mean averaging, RSRP/RSRQ based weighted averaging to compute a final singular TOA for each cell. This TOA can then be used to calculate the RSTD values. In another example, the UE 105 may be configured to measure the TOA for different specified beam IDs for a specific cell and compute the final TOA for that cell using one of the above techniques.

Figure 7B:
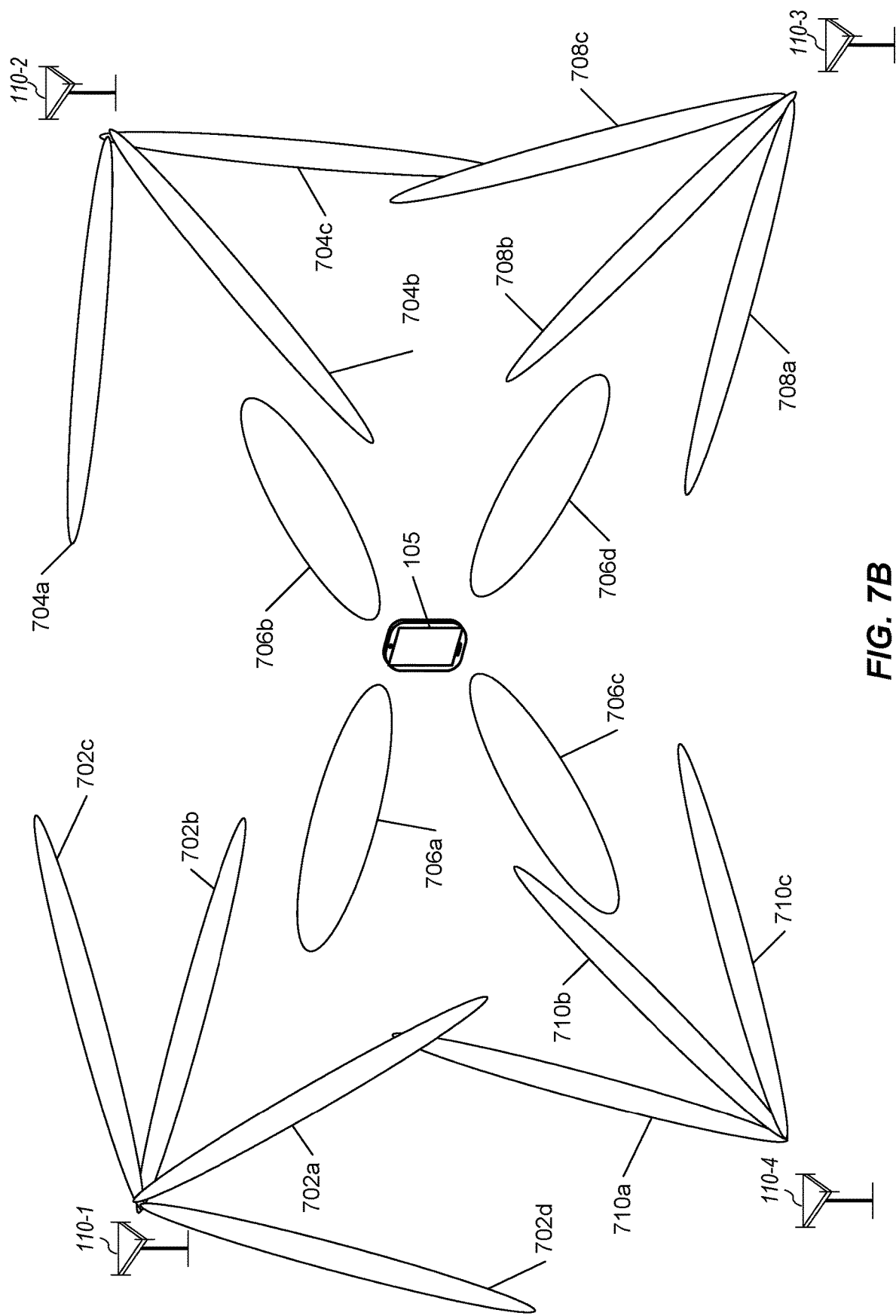
FIG. 7B is a conceptual diagram illustrating simultaneous reception of positioning reference signals in a multiband network.

Referring to FIG. 7B, a conceptual diagram illustrating simultaneous reception of positioning reference signals in a multiband network is shown. An example wireless network includes a first base station gNB 110-1, a second base station gNB 110-2, a third base station gNB 110-3 and a fourth base station gNB 110-4. The base stations gNB 110-1, 110-2, 110-3, 110-4 may be, for example, gNBs, ng-eNBs, or other network nodes and may be operably connected to a location server such as the LMF 152. The first base station gNB 110-1 is configured to provide a first plurality of directional beams 702a-d, the second base station gNB 110-2 is configured to provide a second plurality of directional beams 704a-c, the third base station gNB 110-3 is configured to provide a third set of direction beams 708a-c, and the fourth base station gNB 110-4 is configured to provide a fourth set of directional beams 710a-c. The beam angles depicted in FIG. 7B are examples only as the beam angles may include the azimuth (φ) (shown) and elevation (θ) (not shown). In operation, the UE 105 is configured to send a provide capabilities message including the SSB Index/Beam ID of the serving cell and the neighbor cells measured/observed in the past. In an embodiment, the beam widths used for these cells along with their signal parameters may also be reported. The UE 105 may also report the number of simultaneous beams that the UE 105 is capable of supporting across bands/frequency layers. In an example, a base station (e.g., gNB 110-1) or another network node (e.g., the LMF 152) may include a codebook of the SSB indices along with their respective angular information (e.g., azimuth (φ) (shown) and elevation (θ)) when they are transmitted. In an example, the codebook may persist on the UE 105. Once the SSB indices of the serving and neighboring cells are known or shared with a network node, the SSB indices may be used to localize the UE 105 and to determine which beams to use to measure and detect PRS. The multiple supported beam information may be used by the network node or the UE 105 to instruct the UE 105 to measure PRS on multiple beam IDs/SSD indices/angular info for the same cell or multiple cell. In an example, intra-frequency measurements may be carried out simultaneously across different cells. The use of multiple simultaneous beams across bands/frequency layer enables the UE 105 to perform multiple PRS measurements simultaneously and thereby reducing the response time. The assistance data received by a network node or computed by the UE 105, may be configured to group neighboring cells and their respective beam ID in pairs based on spatial, time and/or frequency criteria.

In an example use case, the UE 105 may be in communication with the second base station gNB 110-2 (i.e., the serving cell). The second base station gNB 110-2 may be a gNB or ng-eNB such as depicted in FIG. 1B. The UE 105 may send a provide capability message indicating a list of beam IDs associated with second base station gNB 110-2, as well as the beam IDs associated with the neighboring cells (e.g., the first base station gNB 110-1, the third base station gNB 110-3 and the fourth base station gNB 110-4). The provide capability message may also include an indication of the maximum simultaneously supported beams across a certain band, or across different bands that the UE 105 is capable of. For example, the UE 105 may be configured to support band 79 in a millimeter-wave mode and capable of measuring a maximum of two beams. When the provide capability message is shared with the appropriate network node (e.g., the gNB 110-2, the LMF 152), the network node may generate assistance data configured to instruct the UE 105 to measure two PRS locations which may collide in the time domain but are spatially different in the angular domain and thus may be measured at the same time. The UE 105 may generate a first receive beam 706a and a second receive beam 706b to perform PRS measurements from beams transmitted from the first base station gNB 110-1 and the second base station gNB 110-2 respectively. The provide capability message may include the maximum number of simultaneous beams supported on multiple bands. For aggregation combinations such as band 79 and band 81, for example, the maximum number of simultaneous supported beams for the band combination may be included in the provide capability message. In an example band 79 plus band 81, may be classified as "beam 2" for two beams on band 79 and two beams on band 81 at the same time. The assistance data may provide the UE 105 with a set of neighbor cell data to measure which may include PRSs colliding in time domain but with different beam IDs which do not intersect in the angular domain. For example, the UE 105 may be configured to generate the first and second receive beams 706a-b in band 79, and a third receive beam 706c and a fourth receive beam 706d in band 81. Other bands and numbers of simultaneous beams may also be used.

In an embodiment, the UE 105 may be configured to measure the TOA of the PRS of each specified beam ID for each base station gNB 110-1, 110-2, 110-3, ng-eNB 114 and report the TOA data to the base station. A network node (e.g., gNB 110-1, AMF 154, LMF 152) may be configured to determine a minimum TOA for each cell across different beam IDs and use the minimum TOA values for further for RSTD computations. If multiple TOA measurements are available for the same cell for different SSB/Beam IDs requested in the assistance date, the network node may apply other algorithms such as mean averaging, RSRP/RSRQ based weighted averaging to compute a final singular TOA for each cell. This average or weighted TOA may be used to calculate the RSTD values. In an example, the UE 105 may be configured to measure the TOA for different specified beam IDs for a specific cell and compute the final TOA for that cell using one of the above techniques. The UE 105 may be configured to calculate the RSTD for each gNB with respect to the reference cell and report the measurement to a network node.

In an example, the network node may utilize companion band/Absolute radio-frequency channel number (ARFCN) information and companion cell beam lists to inform the UE 105 of a list of beam IDs from different base stations that can be measured simultaneously. For example, one or more information elements in the assistance data may specify a tuple of beam IDs for the companion bands that can be measured by the UE 105 simultaneously. The assistance data may also specify a beam ID against which the RSTD for a specific beam ID should be measured for a specific base station. In an example, the UE 105 may be configured to report the RSTD information using the same tuple list.

Figure 8:
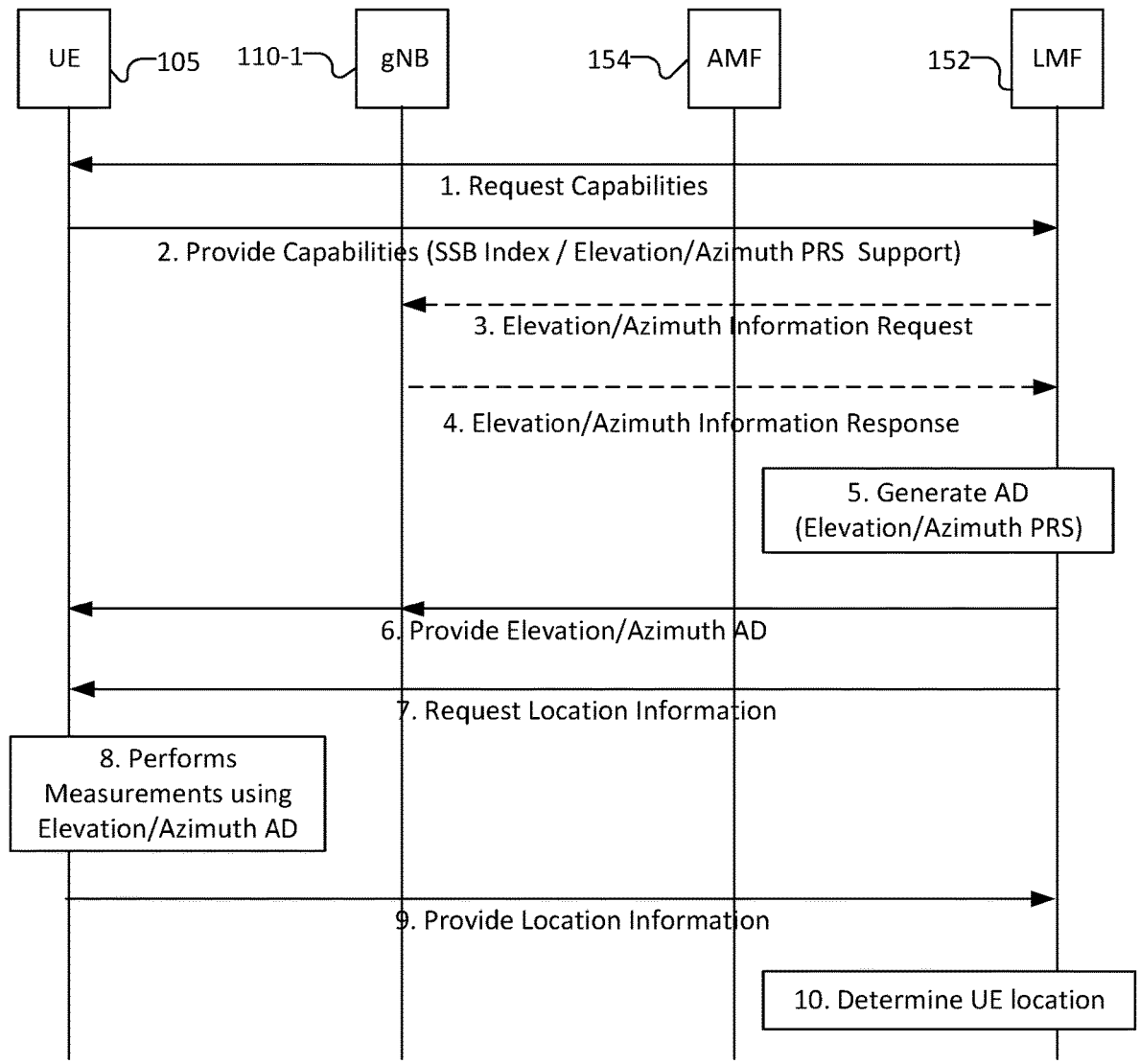
FIG. 8 shows a procedure which may be used to support UE based position methods using PRS signals formed along specific azimuth and elevation angles across multiple PRS occasions.

Referring to FIG. 8, a procedure which may be used to support UE based position methods (e.g. OTDOA) in PRS signals determined based on detected SSB Indexes and formed along specific azimuth and elevation angles across multiple PRS occasions are measured and used to determine a location including an elevation of the UE 105 is shown. It should be understood that the call flow may include additional messages, such as acknowledgement messages.

At stage 1, the location server, LMF 152, sends an LPP Request Capabilities message to UE 105 via the serving AMF 154 and serving gNB 110 to request the positioning capabilities of UE 105. The Request Capabilities message may indicate the type of capabilities needed. For example, for OTDOA, the UE's OTDOA capabilities are requested.

At stage 2, the UE 105 returns an LPP Provide Capabilities message to LMF 152 comprising the positioning capabilities of UE 105. UE 105 may include its capability to support OTODA, or other desired measurement technique, and may include the capability to support independent control over elevation beamforming for altitude measurement, and may include one or more parameters such as the granularity of the elevation beams, a time metric specifying the time required by the UE 105 to change the elevation angle, and the minimum and maximum elevation and azimuth width supported. The LPP Provide Capabilities message may also include the SSB index of the serving cell and the neighbor cells measured and/or observed in the past. For example, referring to FIG. 7A, the cell IDs and beam IDs associated with the first beam 702a (i.e., current serving cell), and third beam 704c (i.e., a previous serving cell). The LPP Provide Capabilities message may also include an indication of the number of PRS beams the UE 105 can receive simultaneously.

At stage 3, the LMF 152 may send an Elevation/Azimuth Information Request to the gNB 110-1. For example, the Elevation/Azimuth Information Request may request that the gNB 110-1 provide the capabilities of the gNB 110 for Elevation/Azimuth PRS beamforming. In some implementations, the Elevation/Azimuth Information Request may include the capabilities of the UE 105 or a plurality of UEs including the UE 105.

At stage 4, the gNB 110-1 may return an Elevation/Azimuth Information Response to the LMF 152 providing the requested information, including the capabilities for Elevation/Azimuth PRS beamforming. In one implementation, the schedule of the PRS transmissions may be generated by the gNB 110-1 based on the information received in the Elevation/Azimuth Information Request received at stage 3, and the Elevation/Azimuth Information Response may include the schedule of the PRS transmissions. The Elevation/Azimuth Information Request of stage 3 and the Elevation/Azimuth Information Response of stage 4 may be, e.g., Long Term Evolution (LTE) Positioning Protocol A (LPPa) or New Radio Position Protocol A (NRPPa) messages.

At stage 5, the LMF 152 may generate assistance data (AD) that includes scheduling information for the Elevation/

Azimuth PRS beamforming across multiple PRS occasions, e.g., using the capabilities provided by the UE 105 at stage 2 (or the capabilities of a plurality of UEs, including the UE 105) as well as the capabilities for Elevation/Azimuth PRS beamforming optionally provided by gNB 110-1 at stage 4 or obtained elsewhere for gNB 110. The assistance data may include assistance data for the gNB 110-1 and other gNBs that may be nearby.

At stage 6, the LMF 152 provides the AD including the scheduling information for the Elevation/Azimuth PRS beamforming across multiple PRS occasions to the gNB 110-1 and the UE 105. For example, as illustrated in FIG. 7A, the generated by the LMF 152 and provided to the UE 105 may indicate that the PRS measurements may be obtained using the first beam 702a from the gNB 110-1 and a fourth beam 704b from a second base station gNB 110-2. The UE 105 may then generate directional receive beams 706a-b based on the angular information associated with the first beam 702a and the fourth beam 704b. In a variant of the procedure, stages 3 to 6 may not occur and gNB 110-1 may instead generate scheduling information for the Elevation/Azimuth PRS beamforming across multiple PRS occasions and may broadcast the scheduling information to UE 105 or provide the scheduling information to UE 105 via unicast.

At stage 7, the LMF 152 sends a Request Location Information message to the UE 105 to request location information. The message may include, e.g., the type of location measurements, the desired accuracy, response time, etc.

At stage 8, the gNB 110-1 transmits the PRS Elevation/Azimuth beams across multiple PRS occasions. The UE 105 also performs the requested measurements of the PRS Elevation/Azimuth beams across multiple PRS occasions using the AD from stage 6. For example, location measurements may be one or more of a Reference Signal Time Difference (RSTD), a Receive-Transmit (Rx-Tx) time difference, an Angle of Arrival (AOA), a Round Trip signal propagation Time (RTT), an Angle of Departure (AOD), a Reference Signal Strength Indication (RSSI), a Reference Signal Received Power (RSRP), a Reference Signal Received Quality (RSRQ). The location measurements may be performed using a fixed receive beam or using an antenna array to beamform the receive beam in synchronization with the different azimuth angles and elevation angles in the scheduled PRS occasions. In an example, the PRS measurements associated with the beams may be obtained individually or simultaneously based on the capabilities of the UE 105.

At stage 9, the UE 105 provides the location information to the LMF 152. The location information may include, for example, the location measurement for each PRS occasion or differential location measurements, which may be a differential between the location measurement at each PRS occasion and a reference location measurement from a reference PRS occasion.

At stage 10, the LMF 152 may determine the UE 105 location, including the elevation/altitude of the UE 105, using the received location information and the known azimuth and elevation angles of the PRS beam for each PRS occasion. For example, the LMF 152 may make use of position methods such as OTDOA, RTT, AOD and/or ECID. The LMF 152 may provide the UE 105 location to an external client. In a variant, UE 105 may obtain the location of UE 105 as part of stage 8 and includes the location in the location information sent at stage 9, in which case LMF 152 may determine the UE 105 location at stage 10 by receiving the location at stage 9.

Figure 9:
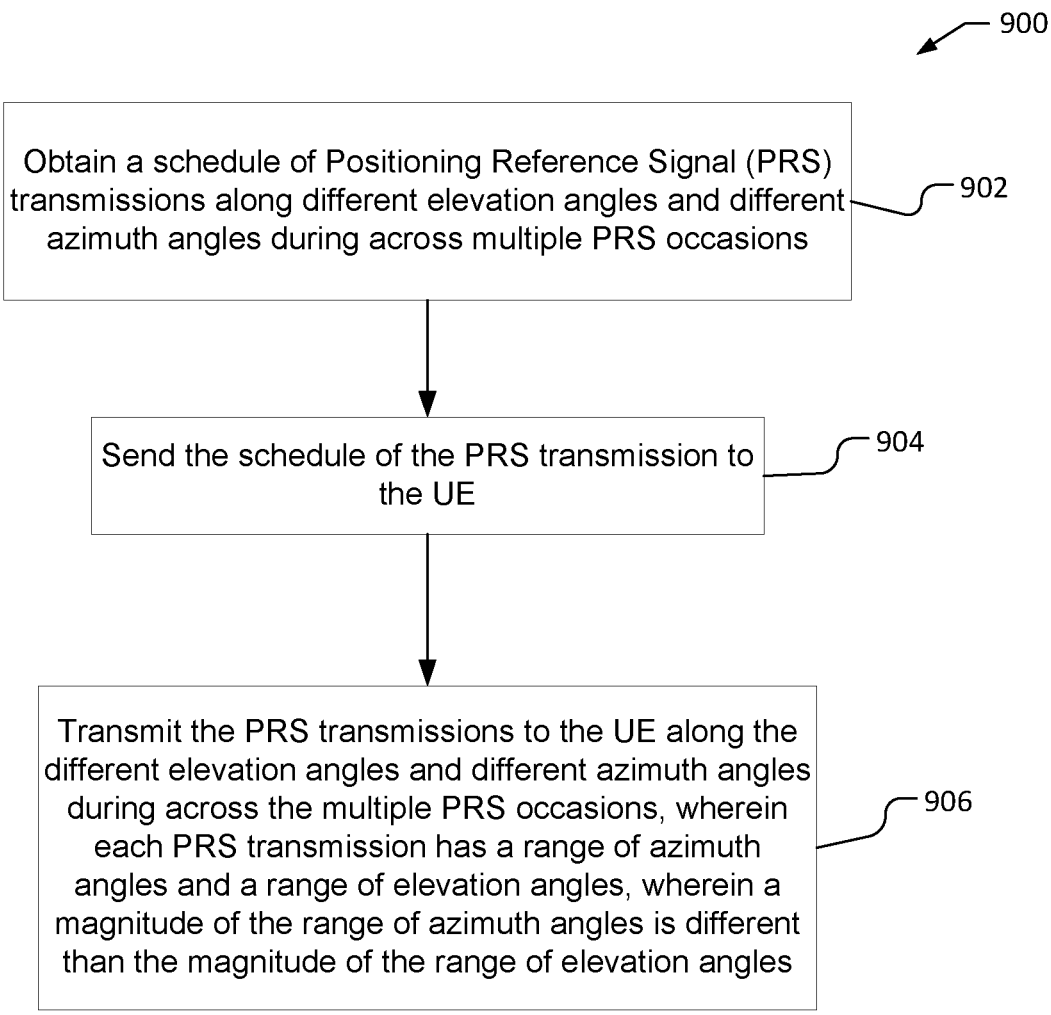
FIG. 9 shows a process flow illustrating a method for supporting location services for a user equipment performed by a base station, using PRS transmissions along specific azimuth and elevation angles across multiple PRS occasions.
Figure 16:
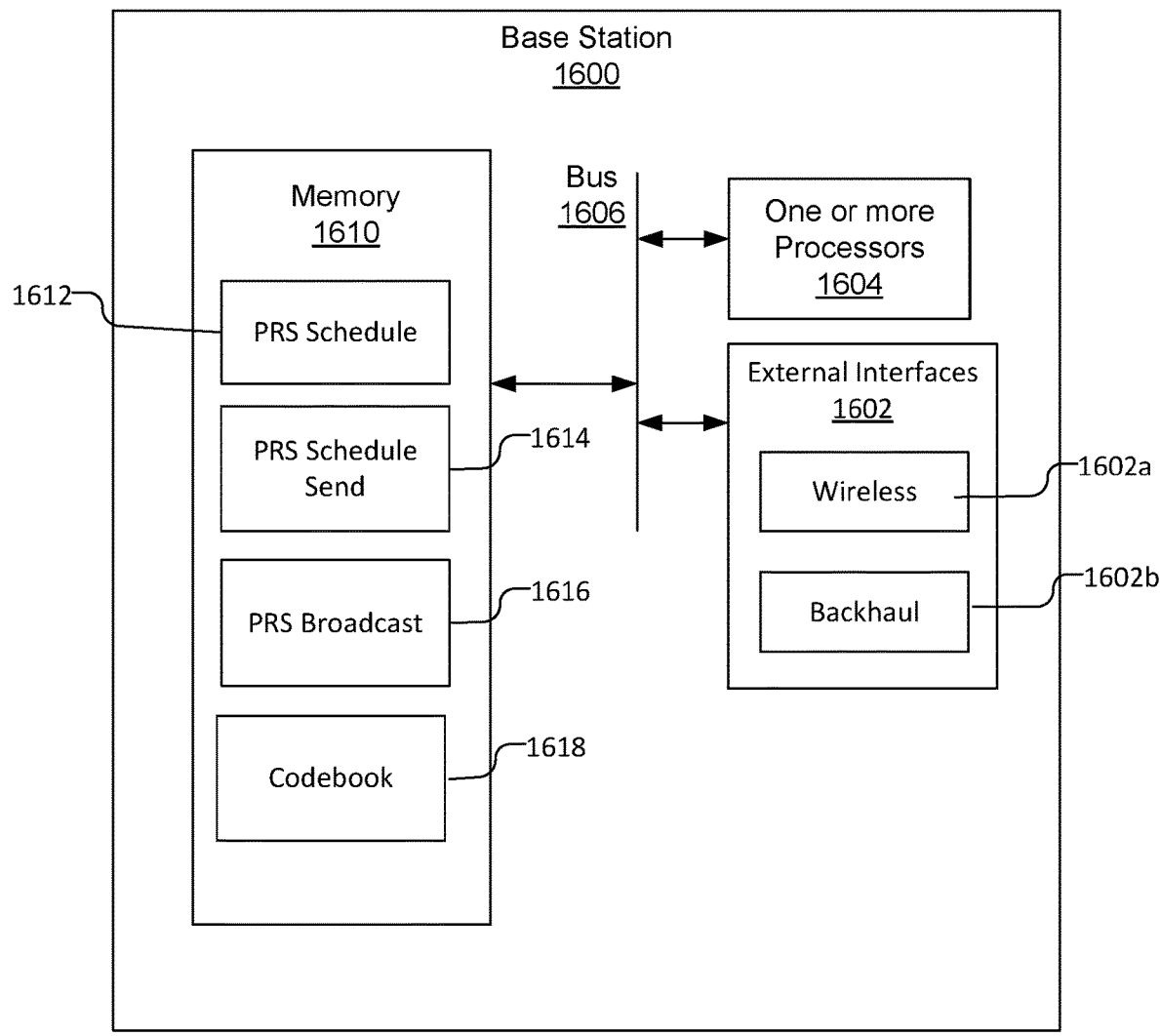
FIG. 16 is a block diagram of an embodiment of a base station capable of supporting location services for a UE.

Referring to FIG. 9, with further reference to FIGS. 1-8, a method 900 for supporting location services for a user equipment (UE) such as the UE 105 is shown. The method 900 may be performed by a base station, such a New Radio (NR) NodeB (gNB) or a Next Generation evolved NodeB (ng-eNB), for example, as illustrated in FIG. 16, in a Fifth Generation (5G) wireless network (e.g. gNB 110-1 or ng-eNB 114) that supports PRS transmissions along specific azimuth and elevation angles across multiple PRS occasions, as discussed above. The method 900 is, however, an example only and not limiting. The method 900 may be altered, e.g., by having stages added, removed, rearranged, combined, performed concurrently, and/or having single stages split into multiple stages.

At stage 902, the method includes obtaining a schedule of Positioning Reference Signal (PRS) transmissions along different elevation angles and different azimuth angles across multiple PRS occasions, e.g., as at stage 6 of FIG. 8. The schedule may be obtained from configuration information (e.g. from an Operations and Maintenance (O&M) server). At stage 904, the schedule of the PRS transmission is sent directly or indirectly to the UE, e.g., indirectly via a location server as at stage 4 and stage 6 of FIG. 8, or directly via broadcasting the information to the UE or sending the information to the UE via unicast. At stage 906, the PRS transmissions are transmitted to the UE along the different elevation angles and different azimuth angles across the multiple PRS occasions, wherein each PRS transmission has a range of azimuth angles and a range of elevation angles, wherein a magnitude of the range of azimuth angles is different than the magnitude of the range of elevation angles, e.g., as at stage 6 of FIG. 8 and as illustrated in FIGS. 4A-4C.

In one implementation, the magnitude of the range of azimuth angles is at least 10 times the magnitude of the range of elevation angles. In one implementation, the magnitude of the range of elevation angles is at least 10 times the magnitude of the range of azimuth angles.

In one implementation, the PRS transmissions to the UE are transmitted from a minimum azimuth angle to a maximum azimuth angle at each different elevation angle. In one implementation, the PRS transmissions to the UE are transmitted from a minimum elevation angle to a maximum elevation angle at each different azimuth angle.

In one implementation, the schedule of the PRS transmission is sent to a location server, e.g., as at stage 4 of FIG. 8. In one implementation, the schedule of PRS transmissions is obtained by receiving capabilities of the UE to support PRS transmissions at different elevation angles and different azimuth angles, e.g., as at stage 3 of FIG. 8. The schedule of the PRS transmission is generated based on the capabilities of the UE, e.g., as at stage 4 of FIG. 8.

In one implementation, the a plurality of measurements of PRS transmissions is received from the UE, each measurement is for a different PRS occasion and includes in indication of the PRS occasion associated with the location measurement, e.g., as at stage 9 of FIG. 8. The plurality of measurements from the UE is sent to a location server, e.g., as at stage 9 of FIG. 8.

Figure 10:
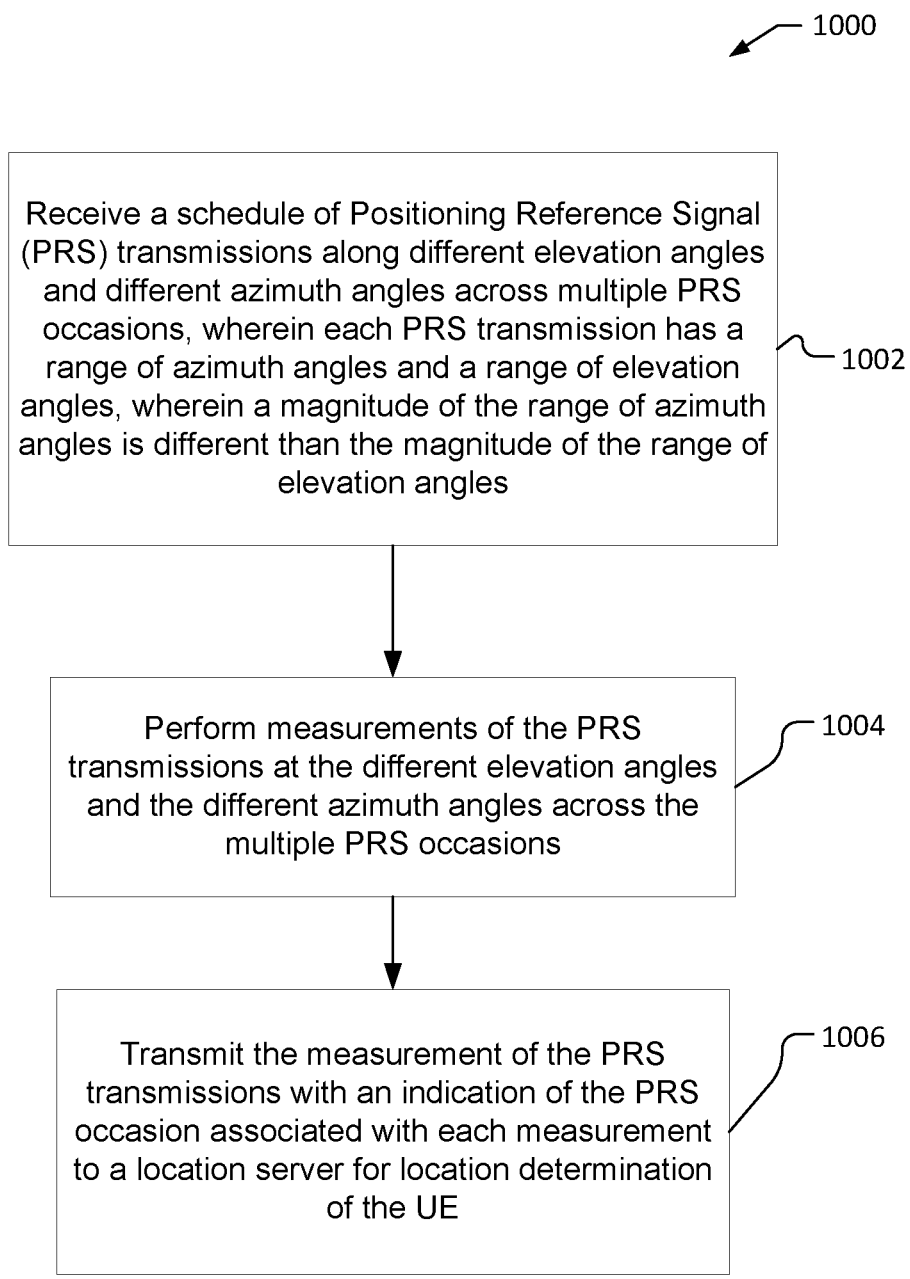
FIG. 10 shows a process flow illustrating a method for supporting location services for a user equipment performed by the user equipment, using PRS transmissions along specific azimuth and elevation angles across multiple PRS occasions.
Figure 17:
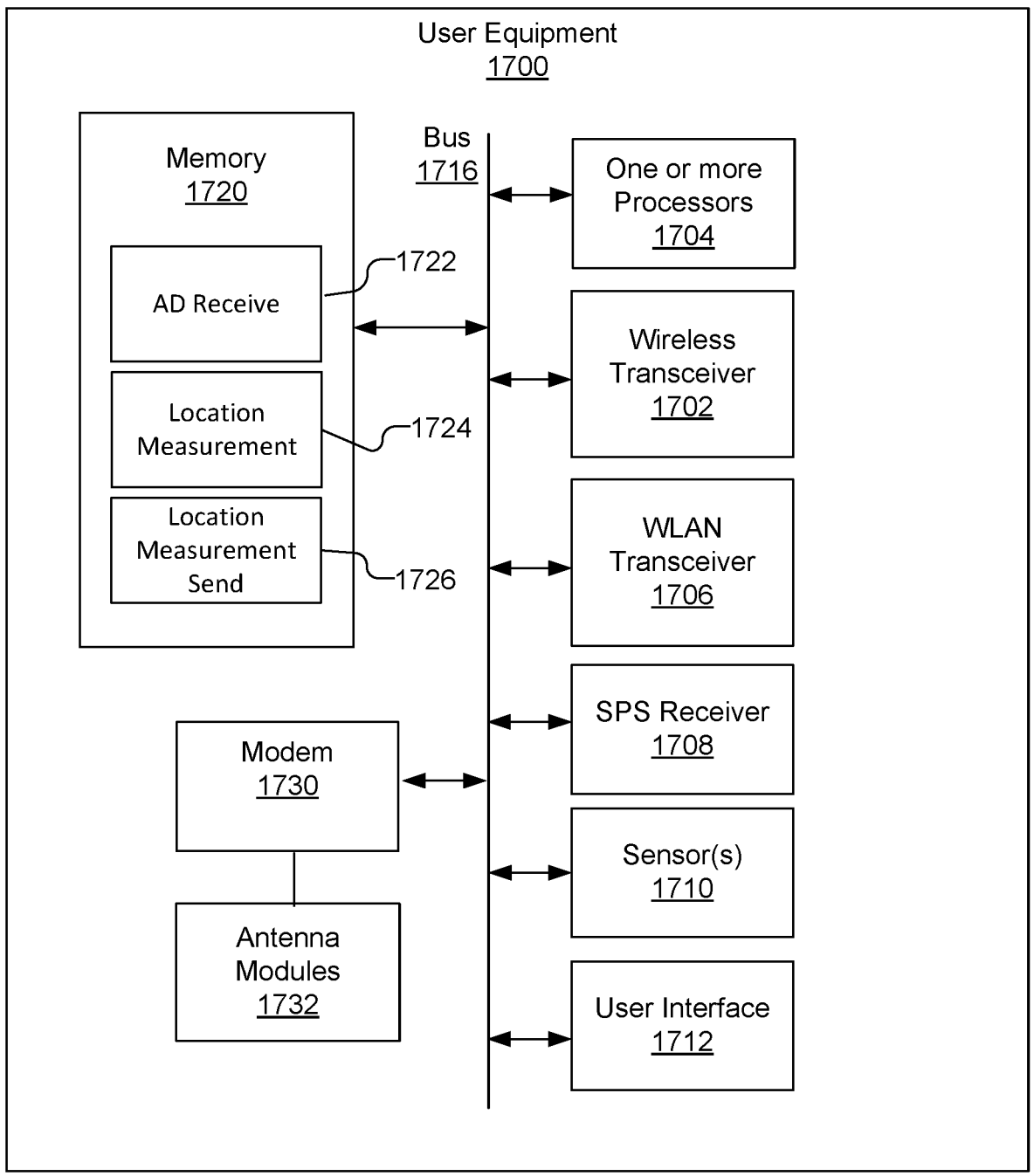
FIG. 17 is a block diagram of an embodiment of a UE capable of supporting location services for the UE.

Referring to FIG. 10, with further reference to FIGS. 1-8, a method 1000 for supporting location services for a user equipment (e.g., the UE 105), which may be performed by the UE, for example, as illustrated in FIG. 17, that supports determination of elevation of the UE based on PRS transmissions along specific azimuth and elevation angles across multiple PRS occasions is shown. The method 1000 is, however, an example only and not limiting. The method 1000 may be altered, e.g., by having stages added, removed, rearranged, combined, performed concurrently, and/or having single stages split into multiple stages.

At stage 1002, the method includes receiving (e.g., from a base station such as a gNB 110 or from a location server such as LMF 152) a schedule of Positioning Reference Signal (PRS) transmissions along different elevation angles and different azimuth angles across multiple PRS occasions, wherein each PRS transmission has a range of azimuth angles and a range of elevation angles, wherein a magnitude of the range of azimuth angles is different than the magnitude of the range of elevation angles, e.g., as at stage 6 of FIG. 8. At stage 1004, the UE performs measurements of the PRS transmissions at the different elevation angles and the different azimuth angles across the multiple PRS occasions, e.g., as at stage 8 of FIG. 8. At stage 1006, the UE transmits the measurement of the PRS transmissions with an indication of the PRS occasion associated with each measurement to a location server (e.g. LMF 152) for location determination of the UE, e.g., as at stage 9 of FIG. 8. The base station, for example, may be a New Radio (NR) NodeB (gNB) or a Next Generation evolved NodeB (ng-eNB), for example, as illustrated in FIG. 16, in a Fifth Generation (5G) wireless network, e.g., gNB 110-1, and the location server may be a Location Management Function (LMF), e.g., LMF 152.

In one implementation, the measurements of the PRS transmission at the different elevation angles and the different azimuth angles are performed using an antenna array such as depicted in FIG. 5 to beamform along the elevation angle and the azimuth angle at each PRS occasion.

In one implementation, a message is sent by the UE that provides capabilities to support the PRS transmissions at the different elevation angles and the different azimuth angles, e.g., as at stage 2 of FIG. 8. The capabilities to support the PRS transmissions at the different elevation angles and the different azimuth angles for example may include at least one of a support for independent control of elevation angle, a granularity of elevation angles, a granularity of azimuth angles, a time necessary to change elevation angle, a minimum and maximum of range of elevation angles, a minimum and maximum of the range of azimuth angles.

In one implementation, the magnitude of the range of azimuth angles is at least 10 times the magnitude of the range of elevation angles. In one implementation, the magnitude of the range of elevation angles is at least 10 times the magnitude of the range of azimuth angles.

In one implementation, the PRS transmissions are from a minimum azimuth angle to a maximum azimuth angle at each different elevation angle. In one implementation, the PRS transmissions are from a minimum elevation angle to a maximum elevation angle at each different azimuth angle.

In one implementation, the measurements of the PRS transmissions may be one or more of a Reference Signal Time Difference (RSTD), an Angle of Arrival (AOA), an Angle of Departure (AOD), a Reference Signal Received Power (RSRP), and a Reference Signal Received Quality (RSRQ).

Figure 11:
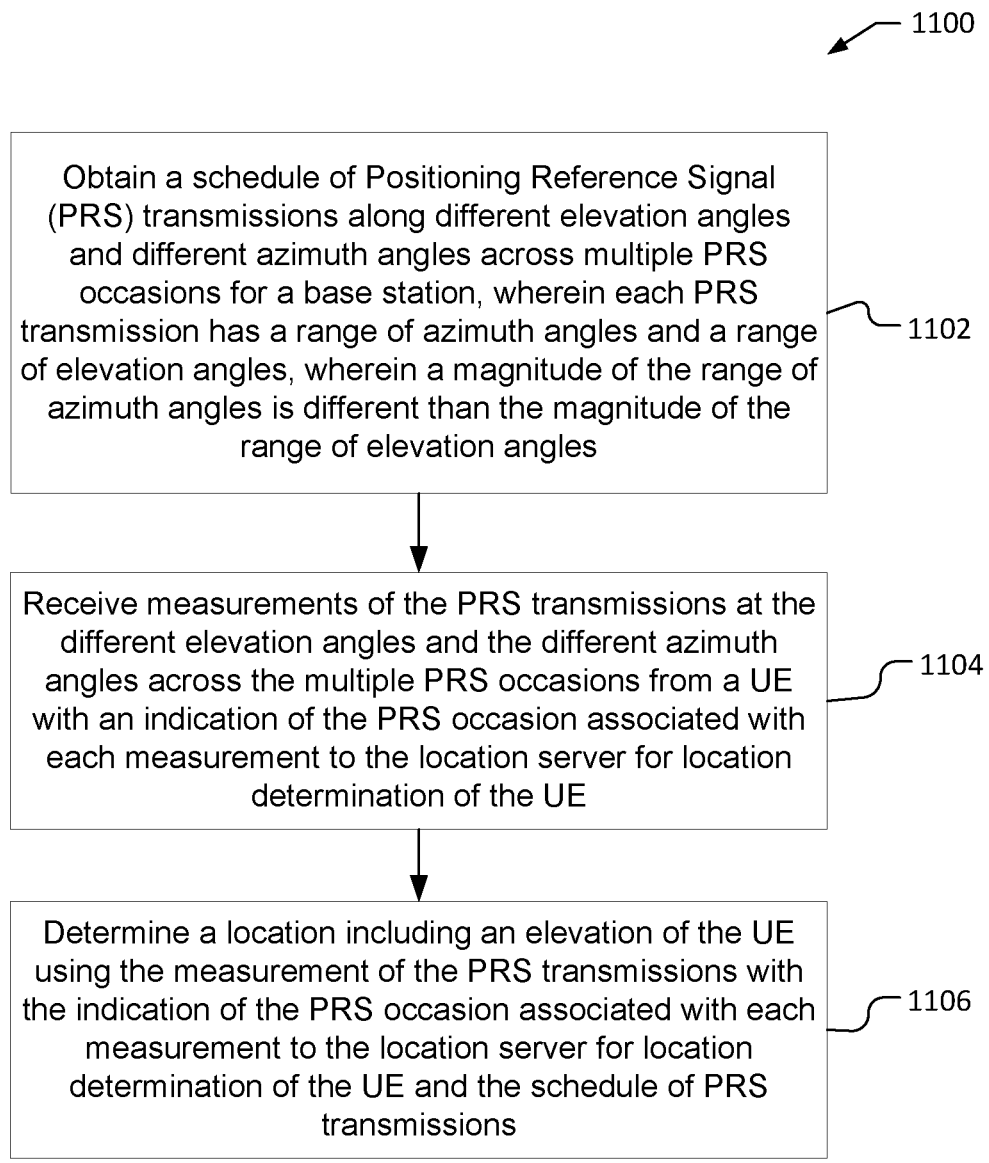
FIG. 11 shows a process flow illustrating a method for supporting location services for a user equipment performed by a location server, in which PRS transmissions are measured by a UE along specific azimuth and elevation angles across multiple PRS occasions.
Figure 18:
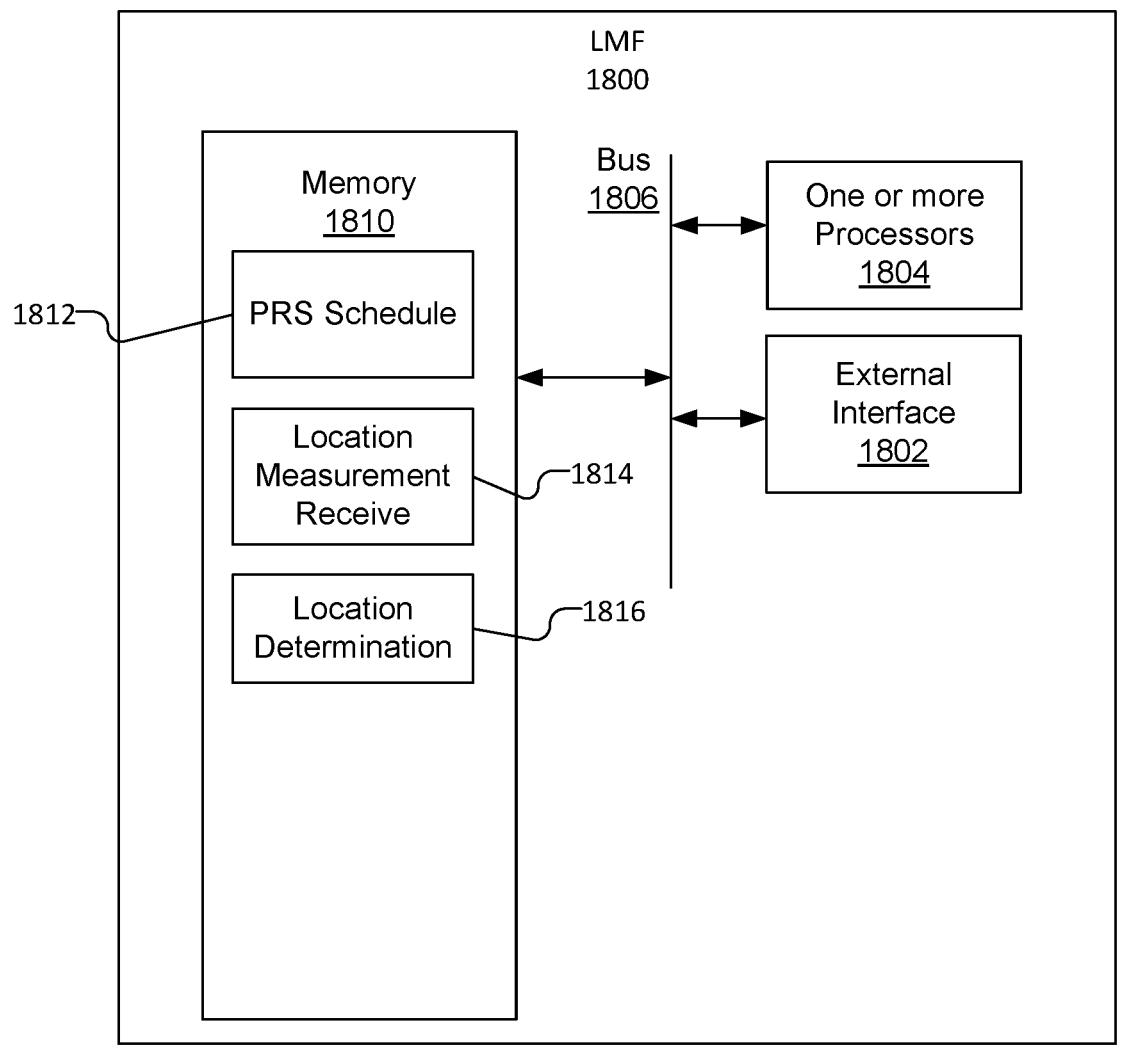
FIG. 18 is a block diagram of an embodiment of an LMF capable of supporting location services for a UE.

Referring to FIG. 11, with further reference to FIGS. 1-8, a method 1100 for supporting location services for a user equipment (UE) such as the UE 105 is shown. The method 1100 may be performed by a location server, for example, as illustrated in FIG. 18, such as LMF 152 that supports determination of elevation of the UE based on PRS transmissions along specific azimuth and elevation angles across multiple PRS occasions, discussed above. The method 1100 is, however, an example only and not limiting. The method 1100 may be altered, e.g., by having stages added, removed, rearranged, combined, performed concurrently, and/or having single stages split into multiple stages.

At stage 1102, the method includes obtaining a schedule of Positioning Reference Signal (PRS) transmissions along different elevation angles and different azimuth angles across multiple PRS occasions for a base station, wherein each PRS transmission has a range of azimuth angles and a range of elevation angles, wherein a magnitude of the range of azimuth angles is different than the magnitude of the range of elevation angles, e.g., as at stages 4 or 5 of FIG. 8. At stage 1104, the location server receives measurements of the PRS transmissions at the different elevation angles and the different azimuth angles across the multiple PRS occasions from a UE with an indication of the PRS occasion associated with each measurement to the location server for location determination of the UE, e.g., as at stage 9 of FIG. 8. At stage 1106, the location server determines a location including an elevation of the UE using the measurement of the PRS transmissions with the indication of the PRS occasion associated with each measurement to the location server for location determination of the UE and the schedule of PRS transmissions, e.g., as at stage 10 of FIG. 8. The base station, for example, may be a New Radio (NR) NodeB (gNB) or a Next Generation evolved NodeB (ng-eNB) in a Fifth Generation (5G) wireless network and the location server may be a Location Management Function (LMF).

In one implementation, the location receives receiving capabilities of the UE to support PRS transmissions at different elevation angles and different azimuth angles, e.g., as at stage 2 of FIG. 8. The schedule of PRS transmissions may be obtained by generating the schedule of schedule of the PRS transmission based on the capabilities of the UE, e.g., as at stage 5 of FIG. 8. The schedule of PRS transmissions is sent to the base station, e.g., as at stage 6 of FIG. 8. The capabilities to support the PRS transmissions at the different elevation angles and the different azimuth angles may include at least one of a support for independent control of elevation angle, a granularity of elevation angles, a granularity of azimuth angles, a time necessary to change elevation angle, a minimum and maximum of range of elevation angles, a minimum and maximum of the range of azimuth angles.

In one implementation, the schedule of PRS transmissions is obtained by receiving the schedule of schedule of the PRS transmission from the base station, e.g., as at stage 4 of FIG. 8.

In one implementation, the measurements of the PRS transmissions comprise one or more of a Reference Signal Time Difference (RSTD), an Angle of Arrival (AOA), an Angle of Departure (AOD), a Reference Signal Received Power (RSRP), and a Reference Signal Received Quality (RSRQ).

In one implementation, the magnitude of the range of azimuth angles is at least 10 times the magnitude of the range of elevation angles. In one implementation, the magnitude of the range of elevation angles is at least 10 times the magnitude of the range of azimuth angles.

In one implementation, the PRS transmissions are from a minimum azimuth angle to a maximum azimuth angle at each different elevation angle. In one implementation, the PRS transmissions are from a minimum elevation angle to a maximum elevation angle at each different azimuth angle.

Figure 12:
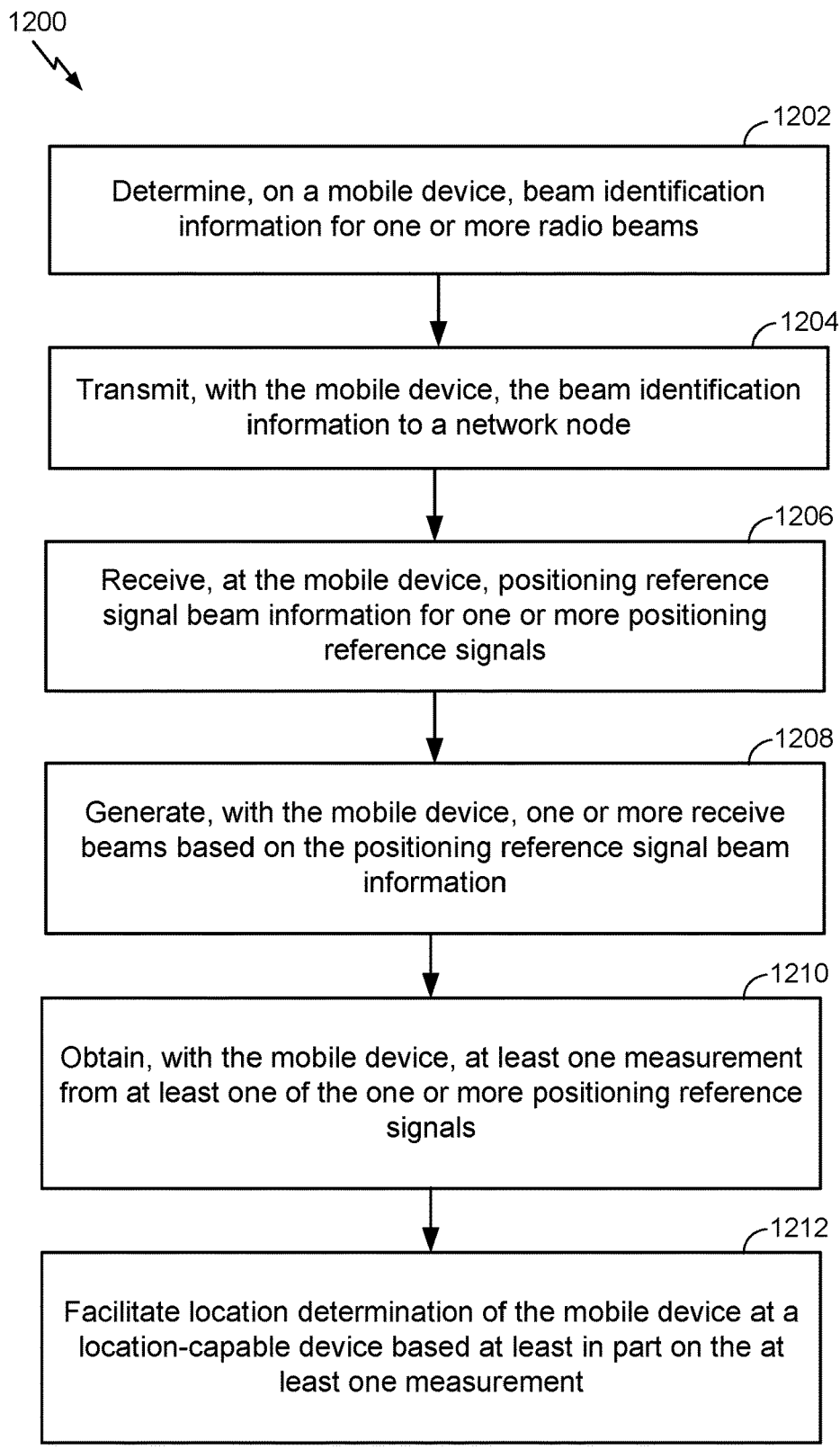
FIG. 12 is a flowchart of an example procedure, generally performed at a mobile device, to support and facilitate positioning of the mobile device.

Referring to FIG. 12, with further reference to FIGS. 1-8, a method 1200 generally performed at a mobile device (e.g. the UE 105), as illustrated in FIG. 17, for example, to support and facilitate positioning of the mobile device includes the stages shown. The method 1200 is, however, an example only and not limiting. The method 1200 may be altered, e.g., by having stages added, removed, rearranged, combined, performed concurrently, and/or having single stages split into multiple stages.

At stage 1202, the method includes determining, on a mobile device, beam identification information for one or more radio beams. The UE 105 is an example means for determining beam identification information. Antenna modules within the UE 105 may include an array of antennas (e.g., patches, lines, dipoles, etc.) and a modem 504 may be configured to utilize phase shifters and/or hybrid antenna couplers to control the antenna array and to control the resulting beam pattern. In an example, the UE 105 may generate multiple receive beams at fixed reference angles. The receive beams generated by the UE 105 may be used to detect the SSB index values for the beams transmitted from one or more base stations (e.g. gNBs 110). For example, referring to FIG. 7A, the UE 105 may be currently detecting, or have previously detected, one or more beams 702*a-d* transmitted from the first base station gNB 110-1, and one or more beams 704*a-c* transmitted from the second base station gNB 110-2. The UE 105 may be configured to store the SSB index values associated with the beams in a local memory device. In an example, location and timestamp information may also be stored with the SSB index values.

At stage 1204, the method includes transmitting, with the mobile device, the beam identification information to a network node (e.g. a gNB 110 or LMF 152). The UE 105 is an example means for transmitting the beam identification information. The UE 105 may be in communication with a network node such as the first base station gNB 110-1. The SSB index values determined at stage 1202 may be included in one or more information elements of a provide capabilities message as at stage 2 of FIG. 8 and transmitted to a network node such as the gNB 110-1 or the LMF 152. Alternatively, the beam identification information (e.g. SSB index values) may be transmitted to the network node (e.g. LMF 152) in a message requesting assistance data from the network node (e.g. an LPP Request Assistance Data message) or in a message providing location information to the network node (e.g. an LPP Provide Location Information). For example, the network node may request location information (e.g. comprising beam identification information) from the mobile device (e.g. for ECID) and the mobile device may obtain and return the location information (e.g. the beam identification information) to the network node. For example, the location information (e.g., in the provide capabilities message at stage 2 in FIG. 8 or in an LPP Request Assistance data message or LPP Provide Location Information message) may include a serving cell ID value, a serving SSB ID value, a neighboring Cell ID list, and/or a SSB ID list. Other fields may also be used to identify the beams relevant to the UE 105. In an example, the UE 105 may also provide an indication of the maximum number of beams that the UE 105 is capable of receiving per band. For example, an information element may include a band identifier (ID) value and a maximum number of supported beams for that band ID. An information element may also include a band combination identifier and a maximum number of supported beams for that band combination.

At stage 1206, the method includes receiving, at the mobile device, positioning reference signal beam information for one or more positioning reference signals. The UE 105 is an example of a means for receiving positioning reference signal beam information. In an example, the first gNB 110-1 or the LMF 152 may provide cell information messages (i.e., assistance data) to the UE 105, e.g. as at stage 6 of FIG. 8, to enumerate the beams to be used for TOA, RSTD, Rx-Tx, RSSI and/or RSRP measurements. For example, the assistance data may include one or more information elements indicating the Beam ID/SSB ID values to specify the directional PRS beams (i.e., based on the corresponding SSB ID) to be used to obtain TOA, RSTD, Rx-Tx, RSSI and/or RSRP measurements. In an example, the assistance data may include the beam azimuth ($\varphi$) and elevation ($\theta$) dimensions. An information element may include a list of companion bands/ARFCN to specify the band/ARFCN which the mobile device may use with simultaneous beam forming. A companion beam list may also include tuples of beam combinations of companion bands that can be measured together.

At stage 1208, the method includes generating, with the mobile device, one or more receive beams based on the positioning reference signal beam information. The UE 105 is an example of a means for generating one or more receive beams. In an example, the beam identification information may include angular data (e.g., azimuth ($\varphi$) and elevation ($\theta$) dimensions) for each of the beams included in the information. The mobile device may also include a codebook or other data structured to correlate the received Beam ID information with angular data such as the azimuth ($\varphi$) and elevation ($\theta$) dimensions. Antenna modules within the mobile device may include an array of antennas (e.g., patches, lines, dipoles, etc.) and a modem 504 to control the resulting beam pattern. The mobile device may utilize orientation sensors (e.g., compass, accelerometers, gyros) to generate receive beams in the direction of the direction PRS beams associated with Beam IDs listed in the assistance data, e.g. as sent at stage 6 of FIG. 8. For example, referring to FIG. 7A, the mobile device (e.g. UE 105) may generate a first receive beam 706*a* directed toward a first beam 702*a* transmitted from the first base station gNB 110-1, and a second receive beam 706*b* directed toward a second beam 704*b* transmitted from the second base station gNB 110-2.

At stage 1210, the method includes obtaining, with the mobile device, at least one measurement from at least one of the one or more positioning reference signals. The at least one measurement may be a measurement of TOA, RSTD, Rx-Tx, RSSI, RTT or RSRP. The UE 105 is an example of a means for obtaining the at least one measurement. The base stations (e.g., gNB 110-1) are configured to transmit directional PRS to be used by the UE 105 for obtaining TOA measurements. The assistance data received at stage 1206 may include the beam Id, frequency, angular data, and other beam parameters associated with the directional PRS beams. In an example, the assistance data may specify a beam ID against which the at least one measurement for a specific beam ID should be measured for a specific base station.

At stage 1212, the method includes facilitating location determination of the mobile device at a location capable device based at least in part on the at least one measurement. The UE 105 and network nodes (e.g., gNB 110-1, LMF 152, and E-SMLC, an SLP, etc.), for example, as depicted in FIG. 16, may be means for facilitating location determination. The location determination for stage 1212 may correspond to stage 10 in FIG. 8. As discussed herein, the location-capable device, where at least some of the location determination operations may be performed, may include one or more of, for example, the UE 105, the first base station gNB 110-1, some other base station, and/or a network node (e.g. the LMF 152, an E-SMLC, an SLP, etc.). The UE 105 may be configured to obtain the at least one measurement for one or more of the PRSs included in the assistance data. In an example, the UE 105 and/or a network node may be configured to determine a minimum TOA for each cell across different beam IDs and use the minimum TOA values for RSTD computations. If multiple TOA measurements are available for the same cell for different SSB/Beam IDs requested in the assistance date, the UE 105 and/or the network node may apply other algorithms such as mean averaging, RSRP/RSRQ based weighted averaging to compute a final singular TOA for each cell. The average or weighted TOA may be used to calculate RSTD values. The UE 105 may be configured to calculate the RSTD for each gNB with respect to the reference cell and report the measurement to a network node. The UE 105 and/or a network node may be configured to determine the location of the UE 105 based at least in part on the TOA/RSTD measurements.

Figure 13:
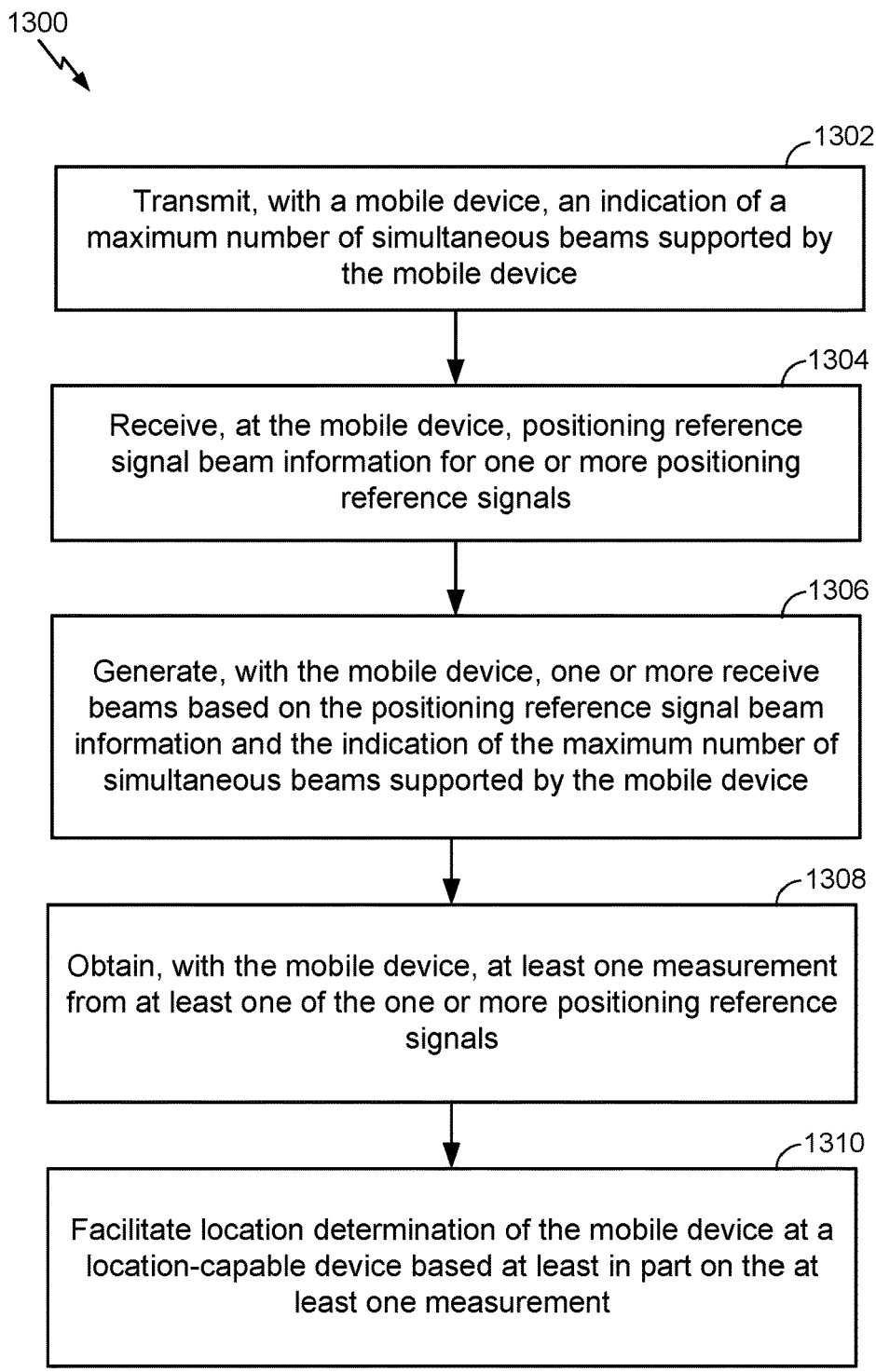
FIG. 13 is a flowchart of an example procedure, generally performed at a mobile device, to support and facilitate positioning of the mobile device using simultaneous beams.

Referring to FIG. 13, with further reference to FIGS. 1-8, a method 1300 generally performed at a mobile device (e.g. UE 105), for example, as illustrated in FIG. 17, to support and facilitate positioning of the mobile device using simultaneous beams includes the stages shown. The method 1300 is, however, an example only and not limiting. The method 1300 may be altered, e.g., by having stages added, removed, rearranged, combined, performed concurrently, and/or having single stages split into multiple stages.

At stage 1302, the method includes transmitting, with a mobile device, an indication of a maximum number of simultaneous beams supported by the mobile device. The UE 105 is an example means for transmitting an indication of a maximum number of simultaneous beams supported by the UE. The UE 105 may be in communication with a networked node such as the first base station gNB 110-1. The maximum number of simultaneous beams supported by the UE may be included in one or more information elements of a provide capabilities message at stage 2 of FIG. 8 and transmitted to a network node such as the gNB 110-1 or the LMF 152. For example, an information element may include a band ID value and a maximum number of supported beams for that band ID. An information element may also include a band combination identifier and a maximum number of supported beams for that band combination.

At stage 1304, the method includes receiving, at the mobile device, positioning reference signal beam information for one or more positioning reference signals. The UE 105 is an example of a means for receiving positioning reference signal beam information. In an example, the LMF 152 via the base station gNB 110-1 may provide cell information messages (i.e., assistance data) to the UE 105 at stage 6 of FIG. 8 to enumerate the beams to use for TOA/RSTD measurements. For example, the assistance data may include one or more information elements indicated the Beam ID/SSB ID values to specify the directional PRS beams (i.e., based on the corresponding SSB ID) to be used to obtain TOA measurements. The assistance data may include the respective beam azimuth ($\varphi$) and elevation ($\theta$) dimensions. An information element may include a list of companion bands/ARFCN to specify the band/ARFCN which the UE 105 may use with simultaneous beam forming. A companion beam list may also include tuples of beam combinations of companion bands that can be measured together.

At stage 1306, the method includes generating, with the mobile device, one or more receive beams based on the positioning reference signal beam information and the indication of the maximum number of simultaneous beams supported by the mobile device. The UE 105 is an example of a means for generating one or more receive beams. In an example, the beam identification information may include angular data (e.g., azimuth ($\varphi$) and elevation ($\theta$) information) for each of the beams included in the information. The UE 105 may also include a codebook or other data structured to correlate the received Beam ID information with angular data. The antenna modules within the UE 105 may include an array of antennas (e.g., patches, lines, dipoles, etc.) and the modem 504 may be configured to utilize phase shifters and/or hybrid antenna couplers to control the antenna array and to control the resulting beam pattern. The UE 105 may utilize orientation sensors (e.g., compass, accelerometers) to generate receive beams in the direction of the direction PRS beams associated with Beam IDs listed in the assistance data. For example, referring to FIG. 7A, the UE 105 may generate a first receive beam 706*a* directed toward a first beam 702*a* transmitted from the first base station gNB 110-1, and a second receive beam 706*b* directed toward a second beam 704*b* transmitted from the second base station gNB 110-2. The indication of the maximum number of simultaneous of beams supported by the mobile device may be used by the network node or the UE 105 to instruct the UE 105 to measure PRS on multiple beam IDs/SSD indices/angular info for the same cell or multiple cell. In an example, intra-frequency measurements may be carried out simultaneously across different cells. The use of multiple simultaneous beams across bands/frequency layer enables the UE 105 to perform multiple PRS measurements simultaneously and thereby reducing the response time. The assistance data received by a network node or computed by the UE 105, may be configured to group neighboring cells and their respective beam ID in pairs based on spatial, time and/or frequency criteria.

At stage 1308, the method includes obtaining, with the mobile device, at least one measurement from at least one of the one or more positioning reference signals. The UE 105 is an example of a means for obtaining at least one measurement. The base stations gNB 110-1, 110-2, 110-3, ng-eNB 114, are configured to transmit directional PRS to be used by the UE 105 for obtaining TOA measurements. The assistance data received at stage 6 of FIG. 8 may include the beam Id, frequency and other beam parameters associated with the directional PRS beams. In an example, the assistance data may specify a beam ID against which the RSTD for a specific beam ID should be measured for a specific base station. In an example, the UE 105 may be configured to support a first band in a millimeter-wave mode and capable of measuring a maximum of two beams. The assistance data may include information elements configured to instruct the UE 105 to measure two PRS locations which may collide in the time domain but are spatially different in the angular domain and thus may be measured at the same time. Obtaining at least one measurement may include generating a first receive beam 706*a* and a second receive beam 706*b* to perform PRS measurements from beams transmitted from the first base station gNB 110-1 and the second base station gNB 110-2 respectively. The assistance data may include aggregation combinations indicating multiple bands that may be used in combination. For example, a combination may include a first band and a second band and may be classified as "beam X" for receiving X beams on the first band, and X beams on the second band at the same time. The assistance data at stage 6 of FIG. 8 may provide the UE 105 with a set of neighbor cell data to measure which may include PRSs colliding in time domain but with different beam IDs which do not intersect in the angular domain. For example, the UE 105 may be configured to generate the first and second receive beams 706a-b in a first band, and a third receive beam 706c and a fourth receive beam 706d in band 81.

At stage 1310, the method includes facilitating location determination of the mobile device at a location capable device based at least in part on the at least one measurement. The UE 105 and network nodes (e.g., gNB 110-1, LMF 152, and E-SMLC, an SLP, etc.) are examples of means for facilitating location determination. The location determination for stage 1310 may correspond to stage 10 in FIG. 8. As discussed herein, the location-capable device, where at least some of the location determination operations may be performed, may include one or more of, for example, the UE 105, the first base station gNB 110-1, some other base station, and/or a network node (e.g. the LMF 152, an E-SMLC, an SLP, etc.). The UE 105 may be configured to measure the TOA one or more of the PRS included in the assistance data received at stage 6 in FIG. 8. In an example, the UE 105 and/or a network node may be configured to determine a minimum TOA for each cell across different beam IDs and use the minimum TOA values for further for RSTD computations. If multiple TOA measurements are available for the same cell for different SSB/Beam IDs requested in the assistance date, the UE 105 and/or the network node may apply other algorithms such as mean averaging, RSRP/RSRQ based weighted averaging to compute a final singular TOA for each cell. The average or weighted TOA may be used to calculate the RSTD values. The UE 105 may be configured to calculate the RSTD for each gNB with respect to the reference cell and report the measurement to a network node. The UE 105 and/or a network node may be configured to determine the location of the UE 105 based at least in part on the TOA/RSTD measurements.

Figure 14:
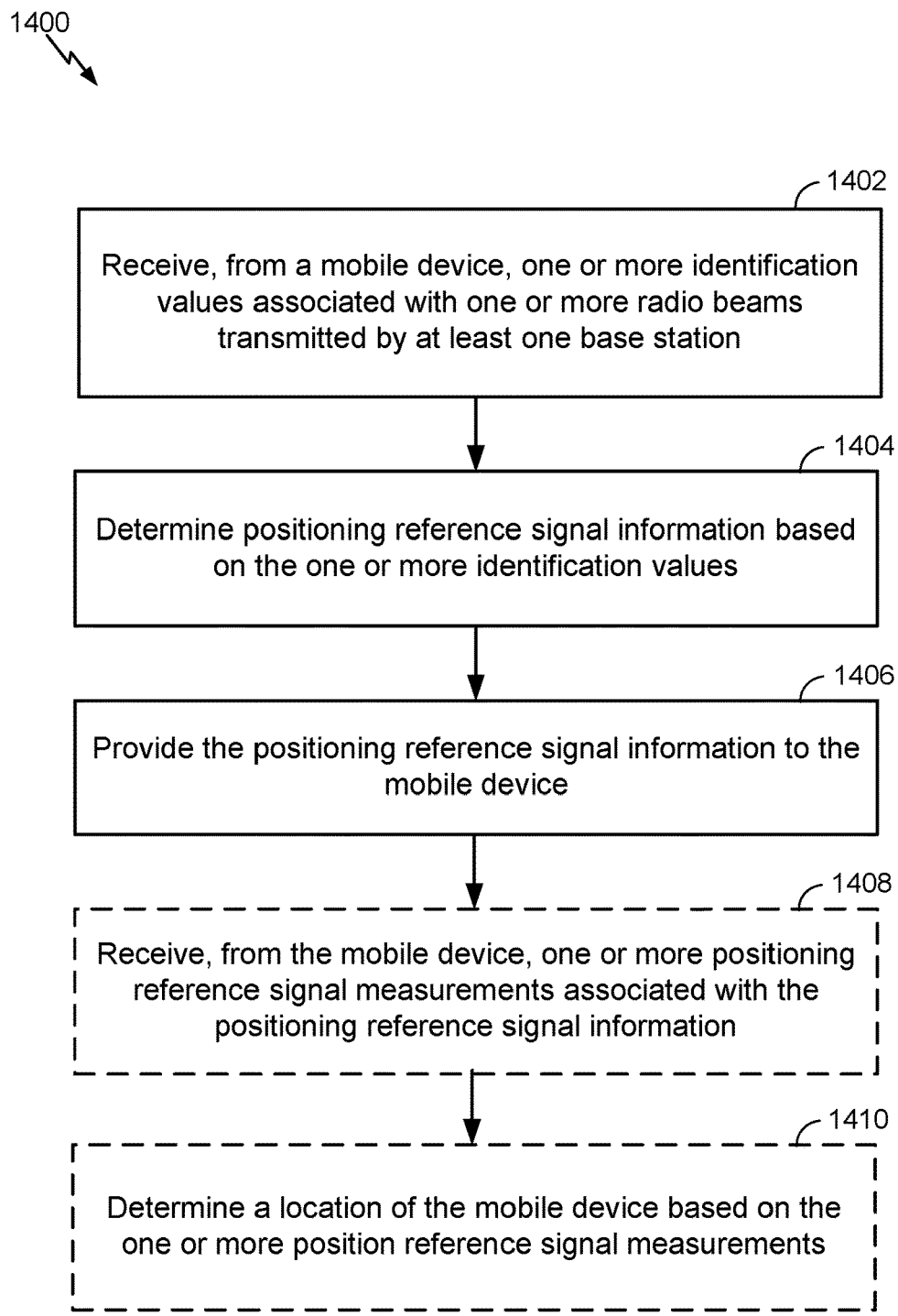
FIG. 14 is a flowchart of an example procedure, generally performed at a network node, to provide positioning reference signal information to a mobile device.

Referring to FIG. 14, with further reference to FIGS. 1-8, a method 1400 generally performed at a network node (e.g. an LMF 152 or gNB 110), for example, as illustrated in FIG. 18, to provide positioning reference signal information to a mobile device (e.g. UE 105) includes the stages shown. The method 1400 is, however, an example only and not limiting. The method 1400 may be altered, e.g., by having stages added, removed, rearranged, combined, performed concurrently, and/or having single stages split into multiple stages. For example, stage 1408 and stage 1410 are optional as the mobile device may be configured to determine a location based on positioning reference signal measurements without using other network resources. Still other alterations to the method 1400 as shown and described are possible.

At stage 1402, the method includes receiving, from a mobile device, one or more identification values associated with a radio beam, or one or more radio beams transmitted by at least one base station. A network node (e.g., the LMF 152, an E-SMLC, an SLP, etc.) is an example of a means for receiving one or more identification values. A UE 105 may be configured to detect one or more beam identification value associated with SSB index beams transmitted from one or more base stations. The UE 105 may then transmit a provide capabilities message at stage 2 of FIG. 8 including the SSB index of the serving cell and the neighbor cells measured and/or observed in the past. For example, the information elements in the provide capabilities message at stage 2 of FIG. 8 may include a serving cell ID value, a serving SSB ID value, a neighboring Cell ID list, and a SSB ID list. Other fields may be used to identify the beams relevant to the UE 105 may also be used. In an example, the UE 105 may also provide an indication of the maximum number of beams that the UE 105 is capable of receiving per band. For example, an information element may include a band ID value and a maximum number of supported beams for that band ID. An information element may also include a band combination identifier and a maximum number of supported beams for that band combination.

At stage 1404, the method includes determining positioning reference signal information based on the one or more identification values. A network node (e.g., the LMF 152, an E-SMLC, an SLP, etc.) is an example of a means for determining positioning reference signal information. The network node may include a codebook or other data structure to correlate the SSB ID values received at stage 1402 with one or more directional PRS transmitted from one or more base stations in a network. The codebook may associate the SSB ID values with azimuth ($\varphi$) and elevation ($\theta$) information. In an embodiment, the gNB 110-1 may be configured to generate a codebook based in part on beam identification values received from a plurality of mobile devices (e.g., a crowdsourcing model). The gNB 110-1 may be configured to send codebook information to another location server such as the LMF 152, and the LMF 152 may be configured to aggregate and disseminate codebook information to other nodes in a communication network. The codebook information may be used in determining the location of a mobile device. In an example, the SSB ID values in the codebook may be used to determine a rough location (e.g., based on intersecting angles) and the directional PRSs may be selected based on the rough location. The PRSs may also be selected based on frequency domain, temporal domain, and angle domain constraints. For example, directional PRSs may be selected based on the relative angles between different PRSs (e.g., to improve fix resolution). The frequency and temporal domain constraints may be used to minimize collisions between PRSs in the respective domains.

At stage 1406, the method includes providing the positioning reference signal information to the mobile device. A network node (e.g., the LMF 152, an E-SMLC, an SLP, etc.) is an example of a means for providing the positioning reference signal information. In an example, the LMF 152 (via the gNB 110-1) may provide PRS assistance data in the LPP/NPP Provide Assistance Data such as at stage 6 of FIG. 8 including a beam ID list determined at stage 1404 specifying the SSB ID to be used to measure RSTD/TOA. For example, the assistance data may include one or more information elements indicated the Beam ID/SSB ID values to specify the directional PRS beams (i.e., based on the corresponding SSB ID) to be used to obtain TOA measurements. In an example, the assistance data may include the azimuth ($\varphi$) and elevation ($\theta$) information. An information element may include a list of companion bands/ARFCN to specify the band/ARFCN which the UE 105 may use with simultaneous beam forming. A companion beam list may also include tuples of beam combinations of companion bands that can be measured together.

At stage 1408, the method may optionally include receiving, from the mobile device, one or more positioning reference signal measurements associated with the positioning reference signal information. In an example, at least some of the location measurements obtained by the mobile device are provided in an LPP/NPP Provide Location Information message at stage 9 of FIG. 8. The mobile device may be configured to measure the TOA of the PRS of each beam ID provided to the mobile device at stage 1406. The LMF 152 may be configured to look for a minimum TOA for each cell across different beam IDs and use that minimum TOA value further for RSTD computation. In an example with multiple TOAs available for the same cell for different SSB/Beam IDs, the LMF 152 may apply other algorithms such as mean averaging, RSRP/RSRQ based weighted averaging to compute a final singular TOA for each cell. This TOA can then be used to calculate the RSTD values.

At stage 1410, the method optionally includes determining a location of the mobile device based on the one or more position reference signal measurements. A network node (e.g., the LMF 152, an E-SMLC, an SLP, etc.) is an example of a means for determining a location of the mobile device. In an example, the LMF 152 may be configured to determine the location of the mobile device at stage 10 in FIG. 8. In an example, the positioning reference signal measurements received at stage 1408 may include measurements of TOA, RSTD, RTT, and the LMF 152 may identify a directional PRS for which a measurement was provided using a beam ID value. The beam ID values may persist in a codebook with the corresponding angular data.

Figure 15:
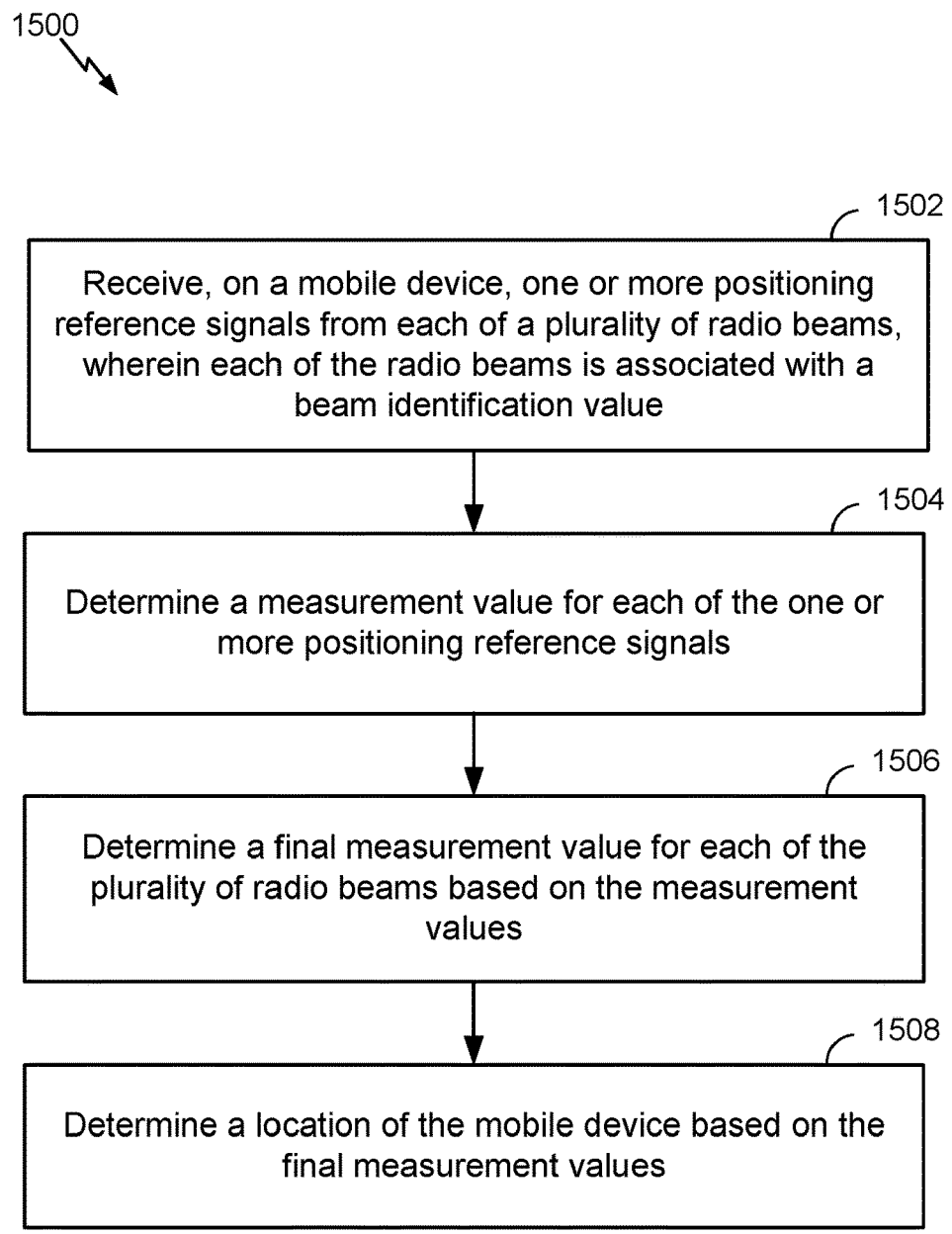
FIG. 15 is a flowchart of an example procedure, generally performed on a mobile device, to facilitate positioning of a mobile device.

Referring to FIG. 15, with further reference to FIGS. 1-8, a method 1500 generally performed on a mobile device (e.g. UE 105), for example, as illustrated in FIG. 17, to facilitate positioning of a mobile device includes the stages shown. The method 1500 is, however, an example only and not limiting. The method 1500 may be altered, e.g., by having stages added, removed, rearranged, combined, performed concurrently, and/or having single stages split into multiple stages.

At stage 1502, the method includes receiving, at the mobile device, one or more positioning reference signal from each of a plurality of radio beams, wherein each of the radio beams is associated with a beam identification value. The UE 105 is an example of a means for receiving one or more positioning reference signals. The UE 105 may receive a codebook or other data structure including SSB index values and PRS information associated with neighboring base stations at stage 6 of FIG. 8. The codebook may enable the UE 105 to determine a position without receiving additional assistance data from a network node. For example, a location server such as the LMF 152 may send an information element including a mode of operation indication to instruct the UE 105 to determine a position based on a locally stored codebook at stage 7 of FIG. 8. In an example, the each of the plurality of radio beams indicated in the codebook may be identified by a SSB index value and a corresponding beam angle values (e.g., azimuth (φ) and elevation (θ) information). The antenna modules within the UE 105 may include an array of antennas (e.g., patches, lines, dipoles, etc.) and a modem 504 may be configured to utilize phase shifters and/or hybrid antenna couplers to control the antenna array and to control the resulting beam pattern. The UE 105 may utilize orientation sensors (e.g., compass, accelerometers, gyros) to generate receive beams in the directions of the one or more positioning reference signals based on the angle information in the codebook. In an example, referring to FIG. 7A, the UE 105 may generate a first receive beam 706a directed toward a first beam 702a transmitted from the first base station gNB 110-1, and a second receive beam 706b directed toward a second beam 704b transmitted from the second base station gNB 110-2.

At stage 1504, the method includes determining a measurement value or values for each of the one or more positioning reference signals. For example, the measurement value(s) may be for a measurement of TOA, RSTD, Rx-Tx, RTT, RSSI or RSRP. The UE 105 is an example of a means for determining a measurement value(s). The base stations gNB 110-1, 110-2, 110-2, ng-eNB 114 are configured to transmit directional PRS to be used by the UE 105 for obtaining the measurements value(s). In an example, determining the measurement value(s) may include generating a first receive beam 706a and a second receive beam 706b to perform PRS measurements from beams transmitted from the first base station gNB 110-1 and the second base station gNB 110-2 respectively. The UE 105 may be configured to obtain the measurement value(s) for each of the one or more positioning reference signals.

At stage 1506, the method includes determining a final measurement value or values for each of the plurality of radio beams based on the measurement values. For example, the final measurement value(s) may be for a measurement of TOA, RSTD, Rx-Tx, RTT, RSSI or RSRP. The UE 105 is an example of a means for determining the final measurement value(s). In an example, the UE 105 may be configured to determine a minimum TOA for each base station that is transmitting one or more of the plurality of radio beams and use the minimum TOA value for RSTD computations. If multiple TOA measurements are available for the same base station for different beam identification values, the UE 105 may be configured to apply other algorithms such as mean averaging, RSRP/RSRQ based weighted averaging to compute a final singular TOA for each base station. The average or weighted TOA may be used to calculate RSTD values.

At stage 1508, the method includes determining a location of the mobile device based on the final measurement values. The UE 105 is an example of a means for determining a location of the mobile device. The UE 105 and/or a network node may be configured to determine the location of the UE 105 based at least in part on the final measurement values. In an example, the final measurement values determined at stage 1506 may include measurements of TOA, RSTD, RTT, Rx-Tx and/or RSRP and UE 105 may identify the positioning reference signals for which a measurement was provided using a beam identification value. The beam identification values may persist with the corresponding angular data in local memory on the UE 105 in a codebook or other data structure.

Referring to FIG. 16, a diagram illustrating an example of a hardware implementation of a base station 1600, such as gNB 110-1, 110-2, 110-3 or ng-eNB 114 is shown. The base station 1600 includes, e.g., hardware components such as at least one external interface which may be the external interfaces 1602 including a wireless interface 1602a and a backhaul (e.g., wired) interface 1602b, which may capable of connecting to an LMF, such as LMF 152 shown in FIGS. 1B-1C, and to wirelessly connect to UE 105. The wireless interface 1602a is capable of beamforming wireless signals along the different elevation angles and different azimuth angles. The base station 1600 includes a one or more processors 1604 and memory 1610, which may be coupled together with bus 1606. The memory 1610 may contain executable code or software instructions that when executed by the one or more processors 1604 cause the one or more processors 1604 to operate as a special purpose computer programmed to perform the procedures and techniques disclosed herein.

As illustrated in FIG. 16, the memory 1610 includes one or more components or modules that when implemented by the one or more processors 1604 implements the methodologies as described herein. While the components or modules are illustrated as software in memory 1610 that is executable by the one or more processors 1604, it should be understood that the components or modules may be dedicated hardware either in the processor or off processor. As illustrated, the memory 1610 may include a PRS schedule unit 1612 that causes the one or more processors 1604 to obtain a schedule of Positioning Reference Signal (PRS) transmissions along different elevation angles and different azimuth angles across multiple PRS occasions, e.g., by generating the schedule or by receiving the schedule from the location server via the backhaul interface 1602b. A PRS schedule send unit 1614 configures the one or more processors 1604 to send, via the wireless interface 1602a, the schedule of the PRS transmission to the UE 105. A PRS broadcast unit 1616 configures the one or more processors 1604 to broadcast, via the wireless interface 1602a, the PRS transmissions to the UE along the different elevation angles and different azimuth angles across the multiple PRS occasions, wherein each PRS transmission has a range of azimuth angles and a range of elevation angles, wherein a magnitude of the range of azimuth angles is different than the magnitude of the range of elevation angles. A codebook 1618 may be one or more data structures configured to store SSB indices, angular information including azimuth ($\varphi$) and elevation ($\theta$) dimensions, and beam information that may be used to localize a mobile device and determine assistance data to be utilized by the mobile device.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1610, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Referring to FIG. 17 a diagram illustrating an example of a hardware implementation of UE 1700, such as UE 105 shown in FIGS. 1B-1C is shown. The UE 1700 may include a wireless transceiver 1702 and a modem 1730 to wirelessly communicate with an NG-RAN 112, e.g., base stations such as gNB 110-1, 110-2, 110-3 or ng-eNB 114 (shown in FIGS. 1B-1C). The wireless transceiver 1702 may be operably coupled to an antenna module 1732, such as the antenna modules 506a, 506b as depicted in FIG. 5, capable of beamforming the receive beam. The UE 1700 may also include additional transceivers, such a wireless local area network (WLAN) transceiver 1706, as well as an SPS receiver 1708 for receiving and measuring signals from SPS SVs 190-1, 190-2 (shown in FIGS. 1B-1C). The UE 1700 may further include one or more sensors 1710, such as cameras, accelerometers, gyroscopes, electronic compass, magnetometer, barometer, etc. The UE 1700 may further include a user interface 1712 that may include e.g., a display, a keypad or other input device, such as virtual keypad on the display, through which a user may interface with the UE 1700. The UE 1700 further includes one or more processors 1704 (e.g., at least one processor) and memory 1720, which may be coupled together with bus 1716. The one or more processors 1704, modem 1730, and other components of the UE 1700 may similarly be coupled together with bus 1716, a separate bus, or may be directly connected together or coupled using a combination of the foregoing. In an example, the modem 1730 may be a mobile device manager (MDM) including one or more processors. The memory 1720 may contain executable code or software instructions that when executed by the one or more processors 1704 cause the one or more processors to operate as a special purpose computer programmed to perform the algorithms disclosed herein.

As illustrated in FIG. 17, the memory 1720 may include one or more components or modules that may be implemented by the one or more processors 1704 to perform the methodologies described herein. While the components or modules are illustrated as software in memory 1720 that is executable by the one or more processors 1704, it should be understood that the components or modules may be dedicated hardware either in the one or more processors 1704 or off the processors. As illustrated, the memory 1720 may include assistance data receive unit 1722 that configures the one or more processors 1704 to receive assistance data via wireless transceiver 1702 from a base station, where the assistance data includes codebook information such as a schedule of Positioning Reference Signal (PRS) transmissions and associated beam ID values along different elevation angles and different azimuth angles across multiple PRS occasions, wherein each PRS transmission has a range of azimuth angles and a range of elevation angles, wherein a magnitude of the range of azimuth angles is different than the magnitude of the range of elevation angles. A location measurement unit 1724 configures the one or more processors 1704 to perform location measurements of the PRS transmissions at the different elevation angles and the different azimuth angles across the multiple PRS occasions, which may use the antenna array in the wireless transceiver 1702 to beamform the receive beam in synchronization with the PRS transmission occasions or may use a fixed receive beam. A location measurement send unit 1726 configures the one or more processors 1704 to transmit, e.g., via the wireless transceiver, the measurements of the PRS transmissions with an indication of the PRS occasion associated with each measurement to the location server for location determination of the UE.

The methodologies described herein may be implemented by various means depending upon the application. For example, these methodologies may be implemented in hardware, firmware, software, or any combination thereof. For a hardware implementation, the one or more processors 1704 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1700 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1720) and executed by one or more processors 1704, causing the one or more processors 1704 to operate as a special purpose computer programmed to perform the techniques disclosed herein. Memory may be implemented within the one or processors 1704 or external to the one or more processors 1704. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1700 may be stored as one or more instructions or code on a non-transitory computer-readable storage medium such as memory 1720. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1700 may be provided as signals on transmission media included in a communication apparatus. For example, a communication apparatus comprising part or all of UE 1700 may include a transceiver having signals indicative of instructions and data. The instructions and data are stored on non-transitory computer readable media, e.g., memory 1720, and are configured to cause the one or more processors 1704 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Referring to FIG. 18, a diagram illustrating an example of a hardware implementation of an LMF 1800, such as LMF 152 in FIGS. 1B-1C is shown. The LMF 1800 may be, e.g., part of a wireless network such as a 5G Core network (5GC). The LMF 1800 includes, e.g., hardware components such as an external interface 1802, which may be a wired or wireless interface capable of connecting to a GMLC, such as GMLC 155, VGMLC 155V or HGMLC 155H, and AMF 154. The LMF 1800 includes one or more processors 1804 and memory 1810, which may be coupled together with bus 1806. The memory 1810 may contain executable code or software instructions that when executed by the one or more processors 1804 cause the one or more processors 1804 to operate as a special purpose computer programmed to perform the procedures and techniques disclosed herein.

As illustrated in FIG. 18, the memory 1810 includes one or more components or modules that when implemented by the one or more processors 1804 implements the methodologies described herein. While the components or modules are illustrated as software in memory 1810 that is executable by the one or more processors 1804, it should be understood that the components or modules may be dedicated hardware either in the processors 1804 or off processor. As illustrated, the memory 1810 may include a PRS schedule unit 1812 that causes the one or more processors 1804 to obtain a codebook including a schedule of Positioning Reference Signal (PRS) transmissions along different elevation angles and different azimuth angles across multiple PRS occasions for a base station, wherein each PRS transmission has a range of azimuth angles and a range of elevation angles, wherein a magnitude of the range of azimuth angles is different than the magnitude of the range of elevation angles. The PRS schedule may be obtained, e.g., from the base station via external interface 1802 or may be determined based at least in part on capabilities received from the UE. A location measurement receive unit 1814 configures the one or more processors 1804 to receive measurements of the PRS transmissions at the different elevation angles and the different azimuth angles across the multiple PRS occasions from a UE with an indication of the PRS occasion associated with each measurement to the location server for location determination of the UE. A location determination unit 1816 configures the one or more processors 1804 to determine a location including an elevation of the UE using the measurement of the PRS transmissions with the indication of the PRS occasion associated with each measurement to the location server for location determination of the UE and the schedule of PRS transmissions.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1810) and executed by one or more processor units (e.g. processors 1804), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1810, and are configured to cause the one or more processors (e.g. processors 1804) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

An example method for supporting location services for a user equipment (UE) performed by a base station includes obtaining a schedule of Positioning Reference Signal (PRS) transmissions along different elevation angles and different azimuth angles across multiple PRS occasions, sending the schedule of the PRS transmission to the UE, and transmitting the PRS transmissions to the UE along the different elevation angles and the different azimuth angles across the multiple PRS occasions, wherein each PRS transmission has a range of azimuth angles and a range of elevation angles, wherein a magnitude of the range of azimuth angles is different than the magnitude of the range of elevation angles.

The example method may include a magnitude of the range of azimuth angles that is at least 10 times the magnitude of the range of elevation angles. The magnitude of the range of elevation angles is at least 10 times the magnitude of the range of azimuth angles. Transmitting the PRS transmissions to the UE along the different elevation angles and the different azimuth angles across the multiple PRS occasions comprises transmitting the PRS transmissions from a minimum azimuth angle to a maximum azimuth angle at each different elevation angle. Transmitting the PRS transmissions to the UE along the different elevation angles and the different azimuth angles across the multiple PRS occasions comprises transmitting the PRS transmissions from a minimum elevation angle to a maximum elevation angle at each different azimuth angle. The method may include sending the schedule of the PRS transmission to a location server. Obtaining the schedule of PRS transmissions includes receiving capabilities of the UE to support PRS transmissions at different elevation angles and the different azimuth angles, and generating the schedule of the PRS transmission based on capabilities of the UE. The method may further include receiving a plurality of measurements of PRS transmissions from the UE, each measurement is for a different PRS occasion and includes in indication of a PRS occasion associated with a location measurement, and sending the plurality of measurements from the UE to a location server. The base station is a New Radio (NR) NodeB (gNB) or a Next Generation evolved NodeB (ng-eNB) in a Fifth Generation (5G) wireless network.

An example method for supporting location services for a user equipment (UE) performed by the UE includes receiving from a base station a schedule of Positioning Reference Signal (PRS) transmissions along different elevation angles and different azimuth angles across multiple PRS occasions, wherein each PRS transmission has a range of azimuth angles and a range of elevation angles, wherein a magnitude of the range of azimuth angles is different than the magnitude of the range of elevation angles, performing measurements of the PRS transmissions at the different elevation angles and the different azimuth angles across the multiple PRS occasions, and transmitting the measurements of the PRS transmissions with an indication of a PRS occasion associated with each measurement to a location server for location determination of the UE.

The example method may include performing the measurements of the PRS transmission at the different elevation angles and the different azimuth angles comprises using an antenna array to beamform along an elevation angle and an azimuth angle at each PRS occasion. Sending a message that provides capabilities to support the PRS transmissions at the different elevation angles and the different azimuth angles. The capabilities to support the PRS transmissions at the different elevation angles and the different azimuth angles comprises at least one of a support for independent control of elevation angle, a granularity of elevation angles, a granularity of azimuth angles, a time necessary to change elevation angle, a minimum and maximum of range of elevation angles, a minimum and maximum of the range of azimuth angles. The magnitude of the range of azimuth angles is at least 10 times the magnitude of the range of elevation angles. The magnitude of the range of elevation angles is at least 10 times the magnitude of the range of azimuth angles. The PRS transmissions are from a minimum azimuth angle to a maximum azimuth angle at each different elevation angle. The PRS transmissions are from a minimum elevation angle to a maximum elevation angle at each different azimuth angle. The base station is a New Radio (NR) NodeB (gNB) or a Next Generation evolved NodeB (ng-eNB) in a Fifth Generation (5G) wireless network and the location server is a Location Management Function (LMF). The measurements of the PRS transmissions comprise one or more of a Reference Signal Time Difference (RSTD), an Angle of Arrival (AOA), an Angle of Departure (AOD), a Reference Signal Received Power (RSRP), and a Reference Signal Received Quality (RSRQ).

An example method for supporting location services for a user equipment (UE) performed by a location server includes obtaining a schedule of Positioning Reference Signal (PRS) transmissions along different elevation angles and different azimuth angles across multiple PRS occasions for a base station, wherein each PRS transmission has a range of azimuth angles and a range of elevation angles, wherein a magnitude of the range of azimuth angles is different than the magnitude of the range of elevation angles, receiving measurements of the PRS transmissions at the different elevation angles and the different azimuth angles across the multiple PRS occasions from a UE with an indication of a PRS occasion associated with each measurement to the location server for location determination of the UE, and determining a location including an elevation of the UE using the measurement of the PRS transmissions with the indication of the PRS occasion associated with each measurement to the location server for location determination of the UE and the schedule of PRS transmissions.

The example method may include receiving capabilities of the UE to support PRS transmissions at different elevation angles and different azimuth angles, wherein obtaining the schedule of PRS transmissions comprises generating the schedule of schedule of the PRS transmission based on capabilities of the UE, and sending the schedule of PRS transmissions to the base station. The capabilities to support the PRS transmissions at the different elevation angles and the different azimuth angles comprises at least one of a support for independent control of elevation angle, a granularity of elevation angles, a granularity of azimuth angles, a time necessary to change elevation angle, a minimum and maximum of range of elevation angles, a minimum and maximum of the range of azimuth angles. Obtaining the schedule of PRS transmissions comprises receiving the schedule of schedule of the PRS transmission from the base station. The measurements of the PRS transmissions comprise one or more of a Reference Signal Time Difference (RSTD), an Angle of Arrival (AOA), an Angle of Departure (AOD), a Reference Signal Received Power (RSRP), and a Reference Signal Received Quality (RSRQ). The base station is a New Radio (NR) NodeB (gNB) or a Next Generation evolved NodeB (ng-eNB) in a Fifth Generation (5G) wireless network and the location server is a Location Management Function (LMF). The magnitude of the range of azimuth angles is at least 10 times the magnitude of the range of elevation angles. The magnitude of the range of elevation angles is at least 10 times the magnitude of the range of azimuth angles. The PRS transmissions are from a minimum azimuth angle to a maximum azimuth angle at each different elevation angle. The PRS transmissions are from a minimum elevation angle to a maximum elevation angle at each different azimuth angle.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for determining a location of a mobile device, comprising:
   determining, on the mobile device, beam identification information for one or more radio beams received by the mobile device, wherein the one or more radio beams are transmitted with beamforming;
   transmitting, with the mobile device, the beam identification information and an indication of a maximum number of simultaneous beams supported by the mobile device to a network node;
   receiving, at the mobile device, positioning reference signal beam information corresponding to a respective transmission angle relative to the network for each of one or more positioning reference signals, wherein the positioning reference signal beam information is based at least in part on the beam identification information and the maximum number of simultaneous beams supported by the mobile device;
   generating, with the mobile device, one or more receive beams, each with a respective receive angle relative to the mobile device, based on the positioning reference signal beam information;
   obtaining, with the mobile device, at least one measurement from at least one of the one or more positioning reference signals; and
   facilitating a location determination of the mobile device at a location-capable device based at least in part on the at least one measurement.

2. The method of claim 1 wherein determining the beam identification information includes determining a beam width value for at least one of the one or more radio beams.

3. The method of claim 1 wherein determining the beam identification information includes determining a reference signal received power value or a reference signal received quality value for at least one of the one or more radio beams.

4. The method of claim 1 wherein obtaining the at least one measurement includes determining a time of arrival measurement from the at least one of the one or more positioning reference signals.

5. The method of claim 1 wherein obtaining the at least one measurement includes determining an average time of arrival measurement from each of the at least one of the one or more positioning reference signals.

6. The method of claim 1 wherein obtaining the at least one measurement includes determining a reference signal time difference measurement from the at least one of the one or more positioning reference signals.

7. The method of claim 1 wherein transmitting the beam identification information includes transmitting a neighbor cell identification list.

8. The method of claim 1 wherein transmitting the beam identification information includes transmitting at least one band combination value and a maximum number of supported beams associated with the at least one band combination value.

9. A mobile device, comprising:
   a memory;
   a transceiver;
   at least one processor operably coupled to the memory and the transceiver and configured to:
      determine beam identification information for one or more radio beams received by the mobile device, wherein the one or more radio beams are transmitted with beamforming;
      transmit the beam identification information and an indication of a maximum number of simultaneous beams supported by the mobile device to a network node;
      receive positioning reference signal beam information corresponding to a respective transmission angle relative to the network work for each of one or more positioning reference signals, wherein the positioning reference signal beam information is based at least in part on the beam identification information and the maximum number of simultaneous beams supported by the mobile device;
      generate one or more receive beams, each with a respective receive angle relative to the mobile device, based on the positioning reference signal beam information;
      obtain at least one measurement from at least one of the one or more positioning reference signals; and
      facilitate a location determination of the mobile device at a location-capable device based at least in part on the at least one measurement.

10. The mobile device of claim 9 wherein the at least one processor is further configured to determine a beam width value for at least one of the one or more radio beams.

11. The mobile device of claim 9 wherein the at least one processor is further configured to determine a reference signal received power value or a reference signal received quality value for at least one of the one or more radio beams.

12. The mobile device of claim 9 wherein the at least one processor is further configured to obtain the at least one measurement by determining a time of arrival measurement from the at least one of the one or more positioning reference signals.

13. The mobile device of claim 9 wherein the at least one processor is further configured to obtain the at least one measurement by determining an average time of arrival measurement from each of the at least one of the one or more positioning reference signals.

14. The mobile device of claim 9 wherein the at least one processor is further configured to obtain the at least one measurement by determining a reference signal time difference measurement from the at least one of the one or more positioning reference signals.

15. The mobile device of claim 9 wherein the at least one processor is further configured to transmit a neighbor cell identification list.

16. The mobile device of claim 9 wherein the at least one processor is further configured to transmit at least one band combination value and a maximum number of supported beams associated with the at least one band combination value.

17. An apparatus, comprising:
means for determining beam identification information for one or more radio beams received by the apparatus, wherein the one or more radio beams are transmitted with beamforming;
means for transmitting the beam identification information and an indication of a maximum number of simultaneous beams supported by the apparatus to a network node;
means for receiving positioning reference signal beam information corresponding to a respective transmission angle relative to the network work for each of one or more positioning reference signals, wherein the positioning reference signal beam information is based at least in part on the beam identification information and the maximum number of simultaneous beams supported by the mobile device;
means for generating one or more receive beams, each with a respective receive angle relative to the mobile device, based on the positioning reference signal beam information;
means for obtaining at least one measurement from at least one of the one or more positioning reference signals; and
means for facilitating a location determination of the apparatus at a location-capable device based at least in part on the at least one measurement.

18. The apparatus of claim 17 wherein the means for determining the beam identification information includes means for determining a beam width value for at least one of the one or more radio beams.

19. The apparatus of claim 17 wherein the means for transmitting the beam identification information includes means for transmitting at least one band combination value and a maximum number of supported beams associated with the at least one band combination value.

20. A method for determining a location of a mobile device, comprising:
receiving, from the mobile device, one or more identification values associated with one or more radio beams transmitted by at least one base station with beamforming, wherein the one or more identification values include synchronization signal burst index values associated with one or more radio beams transmitted by at least one neighboring base station and received by the mobile device;
receiving, from the mobile device, an indication of a maximum number of simultaneous beams supported by the mobile device;
determining positioning reference signal information, indicative of one or more directions of one or more corresponding directional positioning reference signals, based on the one or more identification values and the maximum number of simultaneous beams supported by the mobile device; and
providing the positioning reference signal information to the mobile device.

21. The method of claim 20 wherein providing the positioning reference signal information includes providing angular data for each of the one or more radio beams.

22. The method of claim 20 wherein providing the positioning reference signal information includes providing a beam width value for at least one of the one or more radio beams.

23. The method of claim 20 wherein providing the positioning reference signal information includes providing a reference signal received power value or a reference signal received quality value for at least one of the one or more radio beams.

24. The method of claim 20 wherein providing the positioning reference signal information to the mobile device includes providing one or more synchronization signal burst index values specifying one or more radio beams to be used for measuring a time of arrival value.

25. The method of claim 20 wherein providing the positioning reference signal information to the mobile device includes providing a companion band list indicating a band list with which the mobile device may utilize concurrent beam forming for concurrently measuring time of arrival values.

26. The method of claim 25 wherein the companion band list includes tuples of beam combinations for every companion band that can be measured together by the mobile device.

27. The method of claim 25 wherein the companion band list indicates at least two bands.

28. The method of claim 20 further comprising:
receiving, from the mobile device, one or more positioning reference signal measurements associated with the positioning reference signal information; and
determining the location of the mobile device based on the one or more positioning reference signal measurements.

29. The method of claim 28 wherein the one or more positioning reference signal measurements include a time of arrival measurement.

30. The method of claim 28 wherein the one or more positioning reference signal measurements includes a plurality of time of arrival measurements for each of the at least one base station.

31. The method of claim 28 wherein the one or more positioning reference signal measurements includes a minimum time of arrival measurement for each of the at least one base station.

32. The method of claim 28 wherein the one or more positioning reference signal measurements includes an average time of arrival measurement for each of the at least one base station.

33. The method of claim 28 wherein the one or more positioning reference signal measurements includes a reference signal time difference measurement for each of the at least one base station.

34. The method of claim 28 wherein receiving the one or more positioning reference signal measurements associated with the positioning reference signal information includes receiving a plurality of positioning reference signal measurements from the one or more radio beams transmitted from a plurality of base stations, wherein the one or more radio beams are identified in the positioning reference signal information provided to the mobile device.

35. The method of claim 28 further comprising storing the one or more identification values associated with the one or more radio beams transmitted by the at least one base station in a codebook.

36. The method of claim 35 further comprising sending the codebook to a location server.

37. A base station, comprising:
a memory;
at least one external interface;
at least one processor operably coupled to the memory and the at least one external interface and configured to:
receive, from a mobile device, one or more identification values associated with one or more radio beams transmitted by at least one base station with beamforming, wherein the one or more identification values include synchronization signal burst index values associated with one or more radio beams transmitted by at least one neighboring base station and received by the mobile device;
receive, from the mobile device, an indication of a maximum number of simultaneous beams supported by the mobile device;
determine positioning reference signal information, indicative of one or more directions of one or more corresponding directional positioning reference signals, based on the one or more identification values and the maximum number of simultaneous beams supported by the mobile device; and
provide the positioning reference signal information to the mobile device.

38. The base station of claim 37 wherein the at least one processor is further configured to provide angular data for each of the one or more radio beams.

39. The base station of claim 37 wherein the at least one processor is further configured to provide a beam width value for at least one of the one or more radio beams.

40. The base station of claim 37 wherein the at least one processor is further configured to provide a reference signal received power value or a reference signal received quality value for at least one of the one or more radio beams.

41. The base station of claim 37 wherein the at least one processor is further configured to provide one or more synchronization signal burst index values specifying one or more radio beams to be used for measuring a time of arrival value.

42. The base station of claim 37 wherein the at least on processor is further configured to provide a companion band list indicating a band list with which the mobile device may utilize concurrent beam forming for concurrently measuring time of arrival values.

43. The base station of claim 42 wherein the companion band list includes tuples of beam combinations for every companion band that can be measured together by the mobile device.

44. The base station of claim 42 wherein the companion band list indicates at least two bands.

45. The base station of claim 37 wherein the at least one processor is further configured to:
receive, from the mobile device, one or more positioning reference signal measurements associated with the positioning reference signal information; and
determine a location of the mobile device based on the one or more positioning reference signal measurements.

46. The base station of claim 45 wherein the one or more positioning reference signal measurements include a time of arrival measurement.

47. The base station of claim 45 wherein the one or more positioning reference signal measurements includes a plurality of time of arrival measurements for each of the at least one base station.

48. The base station of claim 45 wherein the one or more positioning reference signal measurements includes a minimum time of arrival measurement for each of the at least one base station.

49. The base station of claim 45 wherein the one or more positioning reference signal measurements includes an average time of arrival measurement for each of the at least one base station.

50. The base station of claim 45 wherein the at least one processor is further configured to receive a plurality of positioning reference signal measurements from the one or more radio beams transmitted from a plurality of base stations, wherein the one or more radio beams are identified in the positioning reference signal information provided to the mobile device.

51. The base station of claim 45 wherein the at least one processor is further configured to store the one or more identification values associated with the one or more radio beams transmitted by the at least one base station in a codebook.

52. The base station of claim 51 wherein the at least one processor is further configured to send the codebook to a location server.

53. An apparatus for determining a location of a mobile device, comprising:
means for receiving, from the mobile device, one or more identification values associated with one or more radio beams transmitted by at least one base station with beamforming, wherein the one or more identification values include synchronization signal burst index values associated with one or more radio beams transmitted by at least one neighboring base station and received by the mobile device;
means for receiving, from the mobile device, an indication of a maximum number of simultaneous beams supported by the mobile device;
means for determining positioning reference signal information, indicative of one or more directions of one or more corresponding directional positioning reference signals, based on the one or more identification values and the maximum number of simultaneous beams supported by the mobile device; and
means for providing the positioning reference signal information to the mobile device.

54. The apparatus of claim 53 wherein the means for providing the positioning reference signal information includes means for providing angular data for each of the one or more radio beams.

55. The apparatus of claim 53 wherein the means for providing the positioning reference signal information includes means for providing a beam width value for at least one of the one or more radio beams.

56. The apparatus of claim 53 wherein the means providing the positioning reference signal information includes means for providing a reference signal received power value or a reference signal received quality value for at least one of the one or more radio beams.

57. The method of claim 20 further comprising receiving, from the mobile device, a band identification value associated with the maximum number of simultaneous beams supported by the mobile device.

\* \* \* \* \*